United States Patent
Asano

(10) Patent No.: US 7,340,054 B2
(45) Date of Patent: Mar. 4, 2008

(54) INFORMATION PROCESSING METHOD, DECRYPTING METHOD, INFORMATION PROCESSING APPARATUS, AND COMPUTER PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 11/222,638

(22) Filed: Sep. 9, 2005

(65) Prior Publication Data

US 2006/0059179 A1 Mar. 16, 2006

(30) Foreign Application Priority Data

Sep. 14, 2004 (JP) ............................ P2004-266477

(51) Int. Cl.
*H04K 1/00* (2006.01)
(52) U.S. Cl. ............................ 380/28; 380/30; 707/100
(58) Field of Classification Search ..................... None
See application file for complete search history.

(56) References Cited

FOREIGN PATENT DOCUMENTS

JP 2003-145653 5/2003

OTHER PUBLICATIONS

Halevy et al., "The LSD Broadcast Encryption Scheme," Advances in Cryptography-Crypto 2002, Lecture Notes in Computer Science 24421, Sprinter, 2002, pp. 47-60.
Naor et al., "Revocation and Tracing Schemes for Stateless Receivers," Advances in Cryptography-Crypto 2001, Lecture Notes in Computer Science 2139, Springer, 2001, pp. 41-62.
Ogata et al., "Efficient Tree Based Key Management Based on RSA Funciton," Proceedings of the Symposium on Cryptography and Information Security, 2004, pp. 195-199.
Ogata et al., "Efficient Tree Based Key Management Based on RSA Function," The 2004 Sympoalum on Cryptography and Information Security, 2004.
Nojima et al., "Efficient Tree-based Key Management Using Oneway Functions," The 2004 Sympoalum on Cryptography and Information Security, 2004.
Halevy et al., "The LSD Broadcast Encryption Scheme," CRYPTO 2002, pp. 47-60, 2002.
Naor et al., "Revocation and Tracing Schemes for Stateless Receivers," CRYPTO 2001, pp. 41-62, 2001.

*Primary Examiner*—Charles Rones
*Assistant Examiner*—Belix M Ortiz
(74) *Attorney, Agent, or Firm*—Bell, Boyd & Lloyd LLP

(57) ABSTRACT

An information processing method, decrypting method, information processing apparatus, and computer program are provided. An information processing method generates a hierarchical tree used to provide a ciphertext decryptable only by a specific selected device through broadcast encryption. The method includes the steps of generating a unidirectional hierarchical tree including nodes having respective node associated values, the node associated value of each of the nodes being calculatable by a function using the node associated value and a node attached variable of at least one lower node; setting an intermediate label allowing calculation of values of labels associated with a special subset selected from labels of subsets defined based on a subset difference method; generating labels of the special subset by a calculation based on the intermediate label, and generating labels not associated with the special subset by a calculation based on the labels generated; and determining labels to be provided to a receiver associated with a terminal node of the hierarchical tree.

36 Claims, 38 Drawing Sheets

INFORMATION PROCESSING METHOD, DECRYPTING METHOD, INFORMATION PROCESSING APPARATUS, AND COMPUTER PROGRAM

CROSS REFERENCES TO RELATED APPLICATIONS

The present application claims priority to Japanese Patent Application No. 2004-266477 filed in the Japan Patent Office on Sep. 14, 2004, the entire contents of which being incorporated herein by reference.

BACKGROUND

The present invention relates to information processing methods, decrypting methods, information processing apparatuses, and computer programs. More specifically, the present invention relates to an information processing method, a decrypting method, an information processing apparatus, and a computer program in which the subset difference (SD) method and the layered subset difference (LSD) method, which are currently known methods of broadcast encryption based on hierarchical tree structures, are improved using Rabin trees, so that the amount of secret information that each receiver has to hold securely, such as labels, is reduced, the amount of computation to be executed by each receiver is reduced, whereby efficient and secure information distribution is implemented.

Recently, various software data (hereinafter referred to as content), including audio data such as music, video data such as movies, game programs, and various application programs, is distributed via networks such as the Internet or via information recording media such as compact discs (CDs), digital versatile disks (DVDs), and mini disks (MDs). The content distributed is played back and used by various information processing apparatuses of users, such as personal computers (PCs), players, or game machines.

In many cases, the right to distributing content, such as music data or video data, is usually owned by the creator or seller of the content. Thus, when such content is distributed, certain usage restrictions are usually imposed so that only authorized users are allowed to use the content and unauthorized copying or the like is prevented.

Particularly, recording apparatuses or storage media for recording information digitally are becoming common recently. Such digital recording apparatuses and storage media allow repeated recording and playback without degrading content such as video or audio content. This has raised problems such as distribution of unauthorized copies of content over the Internet or unauthorized copying on recording media such as CD-Rs.

In a type of system that is intended to prevent such unauthorized use of content, content or a key for decrypting encrypted content is encrypted for distribution so that only specific authorized users or authorized devices can decrypt the data distributed. An example of such system is broadcast encryption based on a hierarchical tree structure.

Distribution of encrypted data, such as an encryption key, based on a hierarchical tree structure will be described with reference to drawings.

FIG. 1 shows a hierarchical tree structure that is a binary tree structure. The lowermost layer is referred to as leaves, and the root, branching points, and the leaves are referred to as nodes. The root is also referred to as the root node. In the binary hierarchical tree structure shown in FIG. 1, leaves are denoted by 8 to 15, nodes are denoted by 1 to 15, and the root is denoted by 1.

To the leaves 8 to 15 in the binary hierarchical tree structure, information processing apparatuses that use content, such as players or receivers, are assigned one by one.

Furthermore, node keys are assigned one by one to the respective nodes (including the leaves) of the tree. The node keys assigned to the leaves 8 to 15 are sometimes referred to as leaf keys.

To each information processing apparatus associated with a leaf, the node keys assigned to the nodes on the path from the leaf to the root are given. In the example shown in FIG. 1, eight information processing apparatuses are assigned respectively to the leaves 8 to 15, and node keys are assigned respectively to the nodes 1 to 15. For example, to an information processing apparatus 101 associated with the leaf 8, four node keys assigned to the nodes 1, 2, 4, and 8 are given. To an information processing apparatus 102 associated with the leaf 12, four node keys assigned to the nodes 1, 3, 6, and 12 are given. Each information processing apparatus securely holds these keys.

A method of sending information that can be obtained only by selected information processing apparatuses based on the above-described setting involving distribution of node keys will be described with reference to FIG. 2. As an example, a case will be considered where encrypted content generated by encrypting certain content such as music or video data is distributed by broadcasting or on recording media such as DVDs so that anybody can obtain the encrypted content, and a key for decrypting the encrypted content (content key Kc) is provided to specific users, i.e., users or information processing apparatuses authorized to use the content.

Let it be supposed that the information processing apparatus assigned to the leaf 14 is revoked as an unauthorized device, and other information processing apparatuses are authorized. In this case, ciphertexts are generated so that the information processing apparatus assigned to the leaf 14 cannot obtain the content key Kc while the other information processing apparatuses can obtain the content key Kc, and the ciphertexts are distributed via a network or as stored on recording media.

In this case, of the node keys other than the node key (represented by a cross sign in FIG. 2) of the information processing apparatus that is revoked, the content key is encrypted using some node keys shared by as many information processing apparatuses as possible, i.e., some node keys in an upper part of the tree.

In the example shown in FIG. 2, a set of ciphertexts generated by encrypting the content key Kc using the node keys of the nodes 2, 6, and 15 is provided. That is, ciphertexts $E(NK_2, Kc)$, $E(NK_6, Kc)$, and $E(NK_{15}, Kc)$ are generated and provided by network distribution or as stored on recording media. $E(A, B)$ denotes data generated by encrypting data B using a key A. $NK_n$ denotes the node key of the n-th node. Thus, the ciphertext set includes three ciphertexts, i.e., data $E(NK_2, Kc)$ generated by encrypting the content key Kc using the node key $NK_2$, data $E(NK_6, Kc)$ generated by encrypting the content key Kc using the node key $NK_6$, and data $E(NK_{15}, Kc)$ generated by encrypting the content key Kc using the node key $NK_{15}$.

By generating the three ciphertexts and sending the ciphertexts to all the information processing apparatuses, for example, via a broadcasting channel, each of the information processing apparatuses that are not revoked (the information processing apparatuses associated with the leaves 8 to 13 and the leave 15 in FIG. 2) can decrypt one of the ciphertexts using the one of the node keys it possesses and thereby obtain the content key Kc. On the other hand, the revoked information processing apparatus associated with the leave 14 possesses none of the three node keys $NK_2$, $NK_6$, and $NK_{15}$ used for generating the three ciphertexts. Thus, even when the ciphertexts are received, the information processing apparatus cannot decrypt the ciphertexts and obtain the content key Kc.

An example of broadcast encryption method that has been reported in symposiums or the like is the method described in Advances in Cryptography-Crypto 2001, Lecture Notes in Computer Science 2139, Springer, 2001, pp. 41-62, D. Naor, M. Naor, and J. Lotspiech, "Revocation and Tracing Schemes for Stateless Receivers". The broadcast encryption method described above is called the complete subtree (CS) method in the document.

However, when information is distributed using such a tree structure, messages that are to be broadcasted increase as the number of information processing apparatuses (user devices) associated with leaves increases. Furthermore, the amount of key information that has to be securely stored in each information processing apparatus (user device), such as node keys, also increases.

For example, in the CS method described above, when the total number of receivers (recipients) in the system is N and the number of revoked receivers, i.e., receivers that are not allowed to obtain broadcasted secret information, is r, the number of messages (ciphertexts) to be broadcasted is rlog(N/r), and the number of keys that each receiver has to hold in a secure memory is logN+1. In this specification, the base of logarithm is 2 except where otherwise stated.

In order to reduce manufacturing cost of receivers, it is desired to reduce the number of keys. Methods for reducing the number of keys have been proposed, for example, in January 2004, by Nojima et al, "Efficient Tree-based Key Management Using One-way Functions," Proceedings of the Symposium on Cryptography and Information Security 2004, pp. 189-194, and Ogata et al, "Efficient Tree Based Key Management Based on RSA Function," Proceedings of the Symposium on Cryptography and Information Security 2004, pp. 195-199.

According to the methods proposed in these documents, the number of keys that each receiver holds in the CS method is reduced to one based on the RSA cryptosystem. However, the use of the RSA cryptosystem leads to a large amount of computation, so that it is desired to reduce the amount of computation.

Methods that have been proposed to overcome these problems include the subset difference (SD) method and the layered subset difference (LSD) method, which is an improved version of the SD method. The SD method is described, for example, in Advances in Cryptography-Crypto 2001, Lecture Notes in Computer Science 2139, Springer, 2001, pp. 41-62, D. Naor, M. Naor, and J. Lotspiech, "Revocation and Tracing Schemes for Stateless Receivers". The LSD method is described, for example, in Advances in Cryptography-Crypto 2002, Lecture Notes in Computer Science 2442, Springer, 2002, pp. 47-60, D. Halevy and A. Shamir, "The LSD Broadcast Encryption Scheme".

In either method, when the total number of receivers (recipients) in the system is N and the number of revoked receivers, i.e., receivers that are not allowed to obtain broadcasted secret information, is r, the number of messages (ciphertexts) to be broadcasted is O(r). Advantageously, this value is smaller compared with the case of other methods such as the complete subtree method described earlier.

However, the number of keys (labels) that each receiver has to hold in a secure memory is $O(\log^2 N)$ in the SD method and $O(\log^{1+\epsilon} N)$ in the LSD method, where $\epsilon$ is an arbitrary positive integer. The number of keys is larger compared with the case of other methods such as the complete subtree method, so that it is desired to reduce the number of keys.

As described above, when information is distributed using a tree structure, the number of messages, and the amount of key information that each information processing apparatus (user device) has to store securely, such as node keys, increases as the number of information processing apparatuses associated with leaves increases. Furthermore, the load of computation needed for calculating keys by receivers also raises problems. For example, when the amount of information that is to be stored in each user device increases and the computational load increases, the secure memory area and the processing capability of the user device have to be increased. This causes increase in manufacturing cost of user devices. Furthermore, processing delays occur due to the increased computational load.

SUMMARY

It is desired to further improve, using Rabin trees, the efficiency of the subset difference (SD) method and the layered subset difference (LSD) method, which are considered as relatively efficient schemes of information distribution by broadcast encryption based on hierarchical tree structures, thereby providing an information processing method, a decrypting method, an information processing apparatus, and a computer program with which the amount of computation and the amount of secret information that is to be kept securely is reduced, whereby efficient and secure information distribution is implemented.

More preferably, it is desired that an information processing method, a decrypting method, an information processing apparatus, and a computer program are provided in which, by using Rabin trees in the SD method and LSD method, the number of keys that each receiver has to hold securely is reduced and the amount of computation by each receiver for calculating labels or the like is considerably reduced.

According to an embodiment of the present invention, there is provided an information processing method for generating a hierarchical tree that is used to provide a ciphertext that is decryptable only by a specific selected device through broadcast encryption based on a hierarchical-tree structure. The information processing method includes the steps of generating a unidirectional hierarchical tree including nodes forming a hierarchical tree, the nodes having respective node associated values, the node associated value of each of the nodes being calculatable by a function using the node associated value and a node attached variable of at least one lower node; setting an intermediate label as a node associated value, the intermediate label allowing calculation of values of labels associated with a special subset selected from labels respectively associated with subsets that are defined based on a subset difference method based on a hierarchical tree; generating labels associated with the special subset by a calculation based on the intermediate label, and generating labels not associated with the special subset by a calculation based on the labels generated; and determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

The unidirectional-tree generating step may generate a unidirectional tree in which it is possible to calculate a node associated value of an upper node through encryption according to the Rabin cryptosystem based on a node associated value of a lower node, and in which it is possible to generate a node associated value of a lower node through decryption according to the Rabin cryptosystem based on a node associated value of an upper node.

The information processing method may further include the step of selectively applying subset keys derived from the respective labels associated with the subset, generated in the label generating step, to generate ciphertexts, and providing the ciphertexts to the receiver.

The unidirectional-tree generating step may generate a unidirectional tree that is a binary hierarchical tree having N terminal nodes, in which node numbers 1 are assigned in a breadth-first order from upper nodes in the binary tree, where 1=2, 3, . . . , 2N−1, the node associated value $NV_1$ of each node 1 satisfying:

$$NV_{[1/2]} = (NV_1^2 + H(l\|salt_1)) \bmod M$$

where M is the product of two large prime numbers, and H is a mapping function that outputs an element of $Z_M$.

The unidirectional-tree generating step may accept input of the number N of leaves representing the number of terminal nodes in the binary hierarchical tree having N terminal nodes, and the size |M| of the modulus M, and generate a unidirectional tree by:

(1) determining two large prime numbers of a size |M|/2, and calculating the product M thereof;

(2) defining the mapping function H that outputs an element of $Z_M$;

(3) randomly selecting the node associated value $NV_1$ of the root node as the uppermost node of the binary tree so that $NV_1 \in Z^*_M$;

(4) performing (a) and (b) below while incrementing 1 as a counter from 2 by 2N−1;

(a) finding a least positive integer $salt_1$ with which $temp_l$ expressed by an equation below becomes a quadratic residue modulo M;

$$temp_l = (NV_{[1/2]} - H(l\|salt_1)) \bmod M$$

(b) calculating $temp_l^{1/2}$ mod m, and determines one of four solutions as the node associated value $NV_1$ of the node 1; and (5) outputting 2N−1 |M|-bit node associated values $NV_1$, $NV_2$, . . . , $NV_{2N-1}$ and 2N−2 node attached variables $salt_2$, $salt_3$, . . . , $salt_{2N-1}$, and setting these values as the node associated values and node attached variables of the respective nodes 1 of the binary tree, where 1=1 to 2N−1.

The label generating step may include the step of accepting input of a node associated value corresponding to an intermediate label and calculating values of labels associated with a special subset by applying a function.

The label generating step may include the step of generating other labels through random number generation based on the values of the labels associated with the special subset.

The special subset selected in the intermediate-label generating step may be at least either:

a first special subset in which a node i and a node j are parent and child directly linked in the hierarchical tree among subsets each defined as a set obtained by subtracting a subtree with a lower node j as a vertex thereof from a subtree with a node i as a vertex thereof; or a second special subset defined as a set of an entire tree with the root as a vertex, including all the leaves of the hierarchical tree.

The label-to-provide determining step may set an intermediate label that is provided to the receiver associated with the terminal node of the hierarchical tree as a node associated value associated with an intermediate label of a subset at a lowermost layer among subsets constituting the first special subset.

The intermediate-label generating step may set labels associated with a special subset, selected from labels associated with the respective labels defined by a basic layered subset difference method in which subsets are managed on a basis of individual layers separated by a special level set in the hierarchical tree, as values calculatable from an intermediate label associated with the special subset.

The intermediate-label generating step may set labels associated with a special subset, selected from labels associated with the respective labels defined by a basic layered subset difference method in which subsets are managed on a basis of individual layers separated by a plurality of special levels set in the hierarchical tree, as values calculatable from an intermediate label associated with the special subset.

According to another embodiment of the present invention, there is provided a decrypting method for decrypting ciphertexts generated using subset keys associated with respective subsets defined based on a subset difference method, which is a broadcast encryption method based on a hierarchical tree structure. The decrypting method includes the steps of selecting a ciphertext generated using a subset key that is derivable by random number generation based on a possessed label or based on a label that is calculatable based on a node associated value and a node attached variable as a possessed intermediate label; calculating, when the subset key used for encryption is not a subset key derivable by random number generation based on the possessed label, labels associated with a special subset by a calculation based on the node attached value and the node attached variable; generating a subset key by random number generation based on the possessed label or the calculated label; and decrypting the ciphertext using the subset key generated.

The ciphertext selecting step may search for a node number matching one of node numbers of nodes included in a path from a receiver to a root, from node numbers of node keys used for encryption in a hierarchical tree in which node numbers are assigned to respective nodes in a breadth-first order with node number 1 assigned to the root as an uppermost node of the hierarchical tree.

The label calculating step may calculate node associated values of nodes on a path from an own node to a root as an uppermost node among node numbers of respective nodes 1, where 1=2, 3, . . . , 2N−1, in a binary tree in which node numbers 1 are assigned in a breadth-first order from upper nodes, based on a possessed node associated value and node associated variable, according to an equation below:

$$NV_{[1/2]} = (NV_1^2 + H(l\|salt_1)) \bmod M$$

where M is the product of two large prime numbers, and H is a mapping function that outputs an element of $Z_M$.

The label calculating step may calculate a label by applying a mapping function on an intermediate label, based on an intermediate label as a possessed node associated value or an intermediate value as a node associated value of a node on a path from an own node to a root as an uppermost node, calculated based on the node associated value.

The subset key used for encryption may be a subset key calculatable by random number generation based on a label associated with either a first special subset in which a node i and a node j are parent and child directly linked in the hierarchical tree among subsets each defined as set obtained by subtracting a subtree with a lower node j as a vertex thereof from a subtree with a node i as a vertex thereof or a second special subset defined as a set of an entire tree with the root as a vertex, including all the leaves of the hierarchical tree, and when the label associated with the special subset is not possessed, the label calculating step may calculate a node associated value as a new intermediate label by a calculation based on the node associated value and the node attached variable as a possessed intermediate label.

According to another embodiment of the present invention, there is provided an information processing apparatus for generating a hierarchical tree that is used to provide a ciphertext that is decryptable only by a specific selected device through broadcast encryption based on a hierarchical-tree structure. The information processing apparatus includes unidirectional-tree generating means for generating a unidirectional hierarchical tree including nodes forming a hierarchical tree, the nodes having respective node associated values, the node associated value of each of the nodes being calculatable by a function using the node associated value and a node attached variable of at least one lower node; intermediate-label generating means for setting an intermediate label as a node associated value, the intermediate label allowing calculation of values of labels associated with a special subset selected from labels respectively associated with subsets that are defined based on a subset difference method based on a hierarchical tree; label generating means for generating labels associated with the special subset by a calculation based on the intermediate label, and generating labels not associated with the special subset by a calculation based on the labels generated; and information-to-provide determining means for determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

The unidirectional-tree generating means may generate a unidirectional tree in which it is possible to calculate a node associated value of an upper node through encryption according to the Rabin cryptosystem based on a node associated value of a lower node, and in which it is possible to generate a node associated value of a lower node through decryption according to the Rabin cryptosystem based on a node associated value of an upper node.

The information processing apparatus may further include ciphertext generating means for selectively applying subset keys derived from the respective labels associated with the subset, generated by the label generating means, to generate ciphertexts, and providing the ciphertexts to the receiver.

The unidirectional-tree generating means may generate a unidirectional tree that is a binary hierarchical tree having N terminal nodes, in which node numbers 1 are assigned in a breadth-first order from upper nodes in the binary tree, where $l=2, 3, \ldots, 2N-1$, the node associated value $NV_l$ of each node 1 satisfying:

$$NV_{\lfloor l/2 \rfloor} = (NV_l^2 + H(l \| \text{salt}_l)) \bmod M$$

where M is the product of two large prime numbers, and H is a mapping function that outputs an element of $Z_M$.

The unidirectional-tree generating means may accept input of the number N of leaves representing the number of terminal nodes in the binary hierarchical tree having N terminal nodes, and the size $|M|$ of the modulus M, and generate a unidirectional tree by:

(1) determining two large prime numbers of a size $|M|/2$, and calculating the product M thereof;

(2) defining the mapping function H that outputs an element of $Z_M$;

(3) randomly selecting the node associated value $NV_1$ of the root node as the uppermost node of the binary tree so that $NV_1 \in Z^*_M$;

(4) performing (a) and (b) below while incrementing l as a counter from 2 by 2N–1;

(a) finding a least positive integer $\text{salt}_l$ with which $\text{temp}_l$ expressed by an equation below becomes a quadratic residue modulo M;

$$\text{temp}_l = (NV_{\lfloor l/2 \rfloor} - H(l \| \text{salt}_l)) \bmod M$$

(b) calculating $\text{temp}_l^{1/2} \bmod m$, and determines one of four solutions as the node associated value $NV_l$ of the node 1; and (5) outputting 2N–1 $|M|$-bit node associated values $NV_1$, $NV_2, \ldots, NV_{2N-1}$ and 2N–2 node attached variables $\text{salt}_2$, $\text{salt}_3, \ldots, \text{salt}_{2N-1}$, and setting these values as the node associated values and node attached variables of the respective nodes 1 of the binary tree, where l=1 to 2N–1.

The label generating means may be configured to accept input of a node associated value corresponding to an intermediate label and calculate values of labels associated with a special subset by applying a function.

The label generating means may be configured to generate other labels through random number generation based on the values of the labels associated with the special subset.

The special subset selected by the intermediate-label generating means may be at least either:

a first special subset in which a node i and a node j are parent and child directly linked in the hierarchical tree among subsets each defined as set obtained by subtracting a subtree with a lower node j as a vertex thereof from a subtree with a node i as a vertex thereof; or a second special subset defined as a set of an entire tree with the root as a vertex, including all the leaves of the hierarchical tree.

The label-to-provide determining means may be configured to set an intermediate label that is provided to the receiver associated with the terminal node of the hierarchical tree as a node associated value associated with an intermediate label of a subset at a lowermost layer among subsets constituting the first special subset.

The intermediate-label generating means may be configured to set labels associated with a special subset, selected from labels associated with the respective labels defined by a basic layered subset difference method in which subsets are managed on a basis of individual layers separated by a special level set in the hierarchical tree, as values calculatable from an intermediate label associated with the special subset.

The intermediate-label generating means may be configured to set labels associated with a special subset, selected from labels associated with the respective labels defined by a basic layered subset difference method in which subsets are managed on a basis of individual layers separated by a plurality of special levels set in the hierarchical tree, as values calculatable from an intermediate label associated with the special subset.

According to another embodiment of the present invention, there is provided an information processing apparatus for decrypting ciphertexts generated using subset keys associated with respective subsets defined based on a subset difference method, which is a broadcast encryption method based on a hierarchical tree structure. The information processing apparatus includes ciphertext selecting means for selecting a ciphertext generated using a subset key that is derivable by random number generation based on a possessed label or based on a label that is calculatable based on a node associated value and a node attached variable as a possessed intermediate label; label calculating means for calculating, when the subset key used for encryption is not a subset key derivable by random number generation based on the possessed label, labels associated with a special subset by a calculation based on the node attached value and the node attached variable; subset-key generating means for generating a subset key by random number generation based on the possessed label or the calculated label; and decrypting means for decrypting the ciphertext using the subset key generated.

The ciphertext selecting means may be configured to search for a node number matching one of node numbers of nodes included in a path from a receiver to a root, from node numbers of node keys used for encryption in a hierarchical tree in which node numbers are assigned to respective nodes in a breadth-first order with node number 1 assigned to the root as an uppermost node of the hierarchical tree.

The label calculating means may be configured to calculate node associated values of nodes on a path from an own node to a root as an uppermost node among node numbers of respective nodes 1, where 1=2, 3, . . . , 2N−1, in a binary tree in which node numbers 1 are assigned in a breadth-first order from upper nodes, based on a possessed node associated value and node associated variable, according to an equation below:

$$NV_{\lfloor 1/2 \rfloor}=(NV_1^2+H(l\|salt_1))\bmod M$$

where M is the product of two large prime numbers, and H is a mapping function that outputs an element of $Z_M$.

The label calculating means may be configured to calculate a label by applying a mapping function on an intermediate label, based on an intermediate label as a possessed node associated value or an intermediate value as a node associated value of a node on a path from an own node to a root as an uppermost node, calculated based on the node associated value.

The subset key used for encryption may be a subset key calculatable by random number generation based on a label associated with either a first special subset in which a node i and a node j are parent and child directly linked in the hierarchical tree among subsets each defined as a set obtained by subtracting a subtree with a lower node j as a vertex thereof from a subtree with a node i as a vertex thereof or a second special subset defined as a set of an entire tree with the root as a vertex, including all the leaves of the hierarchical tree, and the label calculating means may be configured to calculate, when the label associated with the special subset is not possessed, a node associated value as a new intermediate label by a calculation based on the node associated value and the node attached variable as a possessed intermediate label.

According to another embodiment of the present invention, there is provided a computer program for generating a hierarchical tree that is used to provide a ciphertext that is decryptable only by a specific selected device through broadcast encryption based on a hierarchical-tree structure. The computer program includes the steps of generating a unidirectional hierarchical tree including nodes forming a hierarchical tree, the nodes having respective node associated values, the node associated value of each of the nodes being calculatable by a function using the node associated value and a node attached variable of at least one lower node; setting an intermediate label as a node associated value, the intermediate label allowing calculation of values of labels associated with a special subset selected from labels respectively associated with subsets that are defined based on a subset difference method based on a hierarchical tree; generating labels associated with the special subset by a calculation based on the intermediate label, and generating labels not associated with the special subset by a calculation based on the labels generated; and determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

According to another embodiment of the present invention, there is provided a computer program for decrypting ciphertexts generated using subset keys associated with respective subsets defined based on a subset difference method, which is a broadcast encryption method based on a hierarchical tree structure. The computer program includes the steps of selecting a ciphertext generated using a subset key that is derivable by random number generation based on a possessed label or based on a label that is calculatable based on a node associated value and a node attached variable as a possessed intermediate label; calculating, when the subset key used for encryption is not a subset key derivable by random number generation based on the possessed label, labels associated with a special subset by a calculation based on the node attached value and the node attached variable; generating a subset key by random number generation based on the possessed label or the calculated label; and decrypting the ciphertext using the subset key generated.

The computer programs according to these embodiments can be provided, for example, to computer systems capable of executing various program codes via in computer-readable forms via storage media or communication media, for example, via recording media such as CDs, FDs, or MOs, or via networks. With the programs provided in computer-readable forms, the computer systems are allowed to execute processing according to the programs.

Other features will become more apparent from the following description of embodiments taken in conjunction with the accompanying drawings. In this specification, a system refers to a logical combination of a plurality of apparatuses, regardless of whether the apparatuses exist within a single case.

According to these embodiments, in the efficiency of the subset difference (SD) method and the layered subset difference (LSD) method, which are considered as relatively efficient schemes of information distribution by broadcast encryption based on hierarchical tree structures, a Rabin tree constructed as described below is used, which is a unidirectional tree in which node associated values are defined for the respective nodes of the hierarchical tree. Accordingly, the amount of secret information that is to be kept securely by each receiver is reduced, and the amount of computation for calculating a subset key is reduced.

More specifically, it is possible to calculate a node associated value by a function based on a node associated value and a node attached variable of at least one lower node. This node associated value serves as an intermediate label that allows calculation of values of labels associated with a special subset selected from labels associated with respective subsets defined based on the SD method. The information that each receiver has to hold securely is only special-subset non-associated labels not associated with a special subset, and a node associated value and node attached variable corresponding to an intermediate label. Thus, the amount of information that each receiver has to hold securely is reduced. The node attached variable need not be kept securely, and the size thereof can be as small as two bits on average. Thus, the amount of information that each receiver has to hold securely is considerably reduced. Furthermore, compared with the method based on the RSA cryptosystem, since a modulo exponentiation operation, which causes a large load in terms of the amount of computation by a receiver, can be executed with a single squaring operation, so that the amount of computation can be reduced to approximately $\frac{1}{17}$. As described above, according to the embodiments of the present invention, the amount of information that has to be kept securely by each receiver is reduced, and the amount of computation by each receiver for deriving a subset key is reduced. Accordingly, ciphertext distribution and decryption can be implemented efficiently.

Additional features and advantages are described herein, and will be apparent from, the following Detailed Description and the figures.

DETAILED DESCRIPTION

Figure 1:
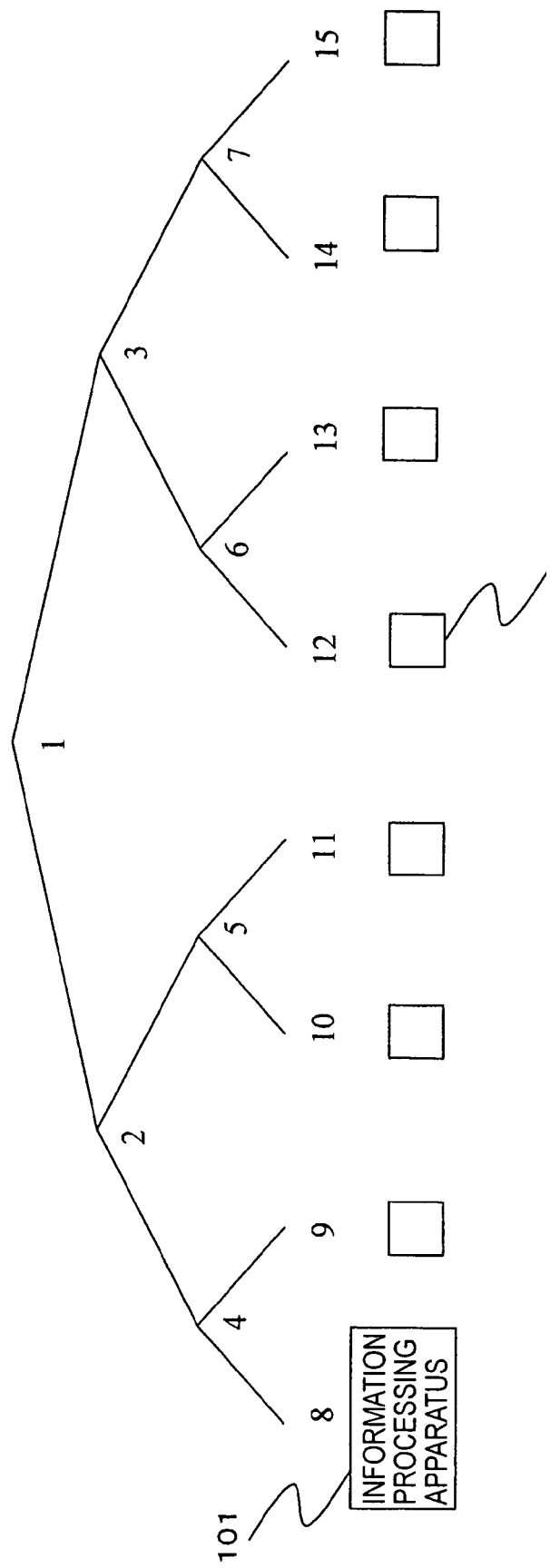
FIG. 1 is a diagram showing a binary hierarchical tree structure.
Figure 2:
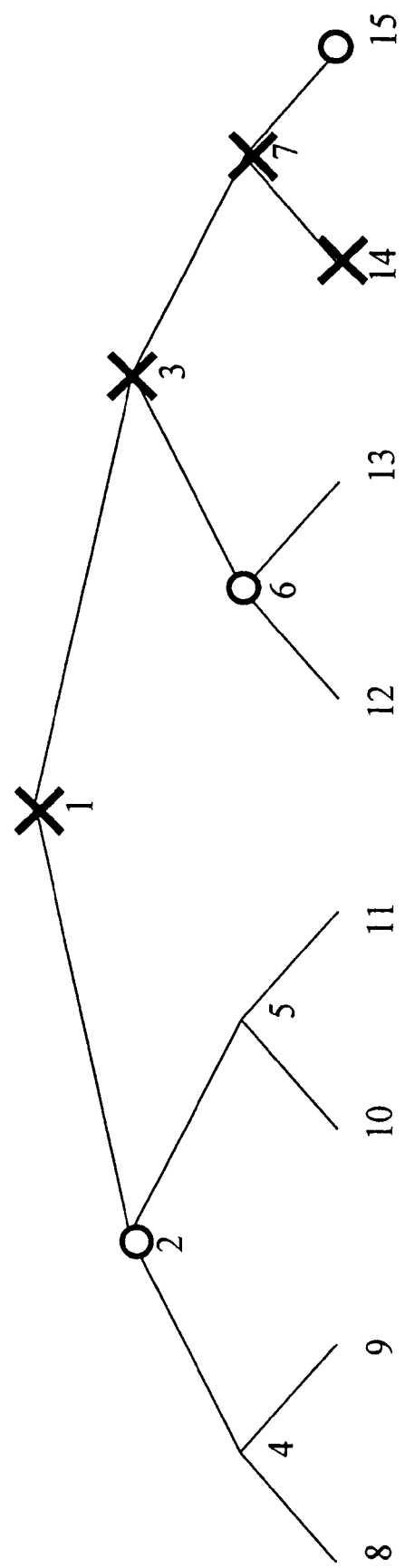
FIG. 2 is a diagram for explaining a method of sending information that can be obtained only by selected information processing apparatuses in the binary hierarchical structure.

Now, information processing methods, decrypting methods, information processing apparatuses, and computer programs according to embodiments of the present invention will be described in detail with reference to the drawings.

The description will be given in the following order:
1. Overview of the Complete Subtree (CS) Method
2. Scheme of the CS Method Employing Rabin Tree
3. Ciphertext Distribution and Decryption by the CS Method Employing Rabin Tree
4. Examination on Reduction of the Amount of Computation in the Scheme of Ciphertext Distribution by the CS Method Employing Rabin Tree
5. Overview of the Subset Difference (SD) Method
6. Scheme of Reducing the Number of Labels in the SD Method
7. Scheme of Reducing the Number of Labels in the SD Method Employing Rabin Tree
8. Ciphertext Distribution and Decryption by the SD Method Employing Rabin Tree
9. Overview of the Basic Layered Subset Difference (Basic LSD) Method
10. Scheme of Reducing the Number of Labels in the Basic LSD Method Employing Rabin Tree
11. Overview of the General Layered Subset Difference (General LSD) Method
12. Scheme of Reducing the Number of Labels in the General LSD Method Employing Rabin Tree
13. Examination of Reduction of the Amount of Computation in the Scheme of Ciphertext Distribution by the SD Method Employing Rabin Tree 1. Overview of the Complete Subtree (CS) Method First, an overview of the complete subtree (CS) method, which is known as a method of broadcast encryption based on an existing hierarchical tree structure, will be described.

In the following description, for simplicity, it is assumed that the total number N of information processing apparatuses (receivers) that are associated with the leaves of the hierarchical tree structure is a power of 2. It is also assumed in the following description that the base of logarithm is always 2. It is possible to associate various types of information processing apparatuses with the leaves of the hierarchical structure, such as personal computers or portable terminals, as long as such apparatuses are capable of decrypting secret information as described below. Such apparatuses will be generally referred to as receivers in the following description. Furthermore, it is assumed that a ciphertext distribution process in this embodiment covers a process of providing ciphertexts recorded on recording media a well as a process of providing ciphertexts via a communication network.

1.1 Overview of the Complete Subtree (CS) Method

Now, an overview of the complete subtree (CS) method will be described with reference to FIG. 3 and subsequent figures.

In the complete subtree (CS) method described in Advances in Cryptography-Crypto 2001, Lecture Notes in Computer Science 2139, Springer, 2001, pp. 41-62, D. Naor, M. Naor, and J. Lotspiech, "Revocation and Tracing Schemes for Stateless Receivers", which has been mentioned earlier, a binary tree is used as a hierarchical tree structure, in which each node branches into two, as shown in FIG. 3. FIG. 3 shows an example where the number of receivers N=16. The receivers are respectively assigned to the leaves of the binary tree (i.e., u1 to u16 in FIG. 3). Furthermore, each node of the tree is used to represent "a set of receivers assigned to the leaves of a subtree with that node as the vertex thereof". For example, a node i 201 in FIG. 3 represents a set of the receivers u5 and u6.

Figure 3:
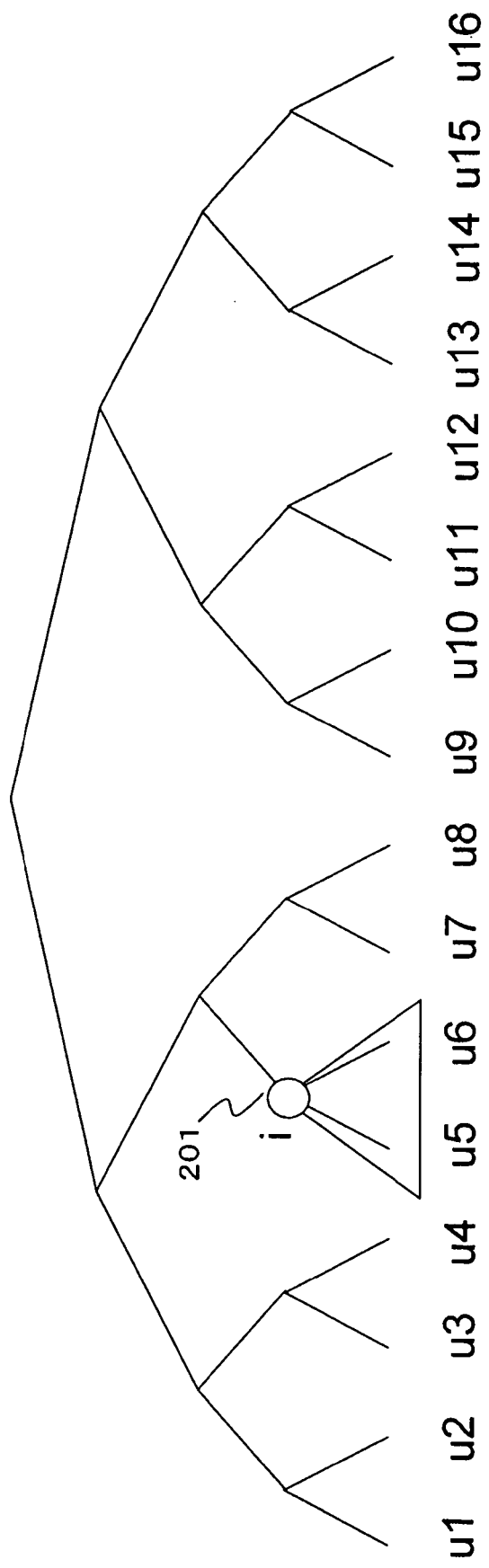
FIG. 3 is a diagram showing a hierarchical tree structure in which each nodes branches into two, which is used in the complete subtree (CS) method.

Furthermore, node keys are respectively defined for the nodes of the binary tree shown in FIG. 3. Each of the receivers, in a secure memory thereof, holds node keys assigned to the nodes on the path from the leaf to which the receiver is assigned to the root of the tree. The definition of the tree, the definition of the node keys, the assignment of the receivers, the distribution of the node keys, and so forth are managed by a trusted management center, which will hereinafter be referred to as a trusted center (TC).

Figure 4:
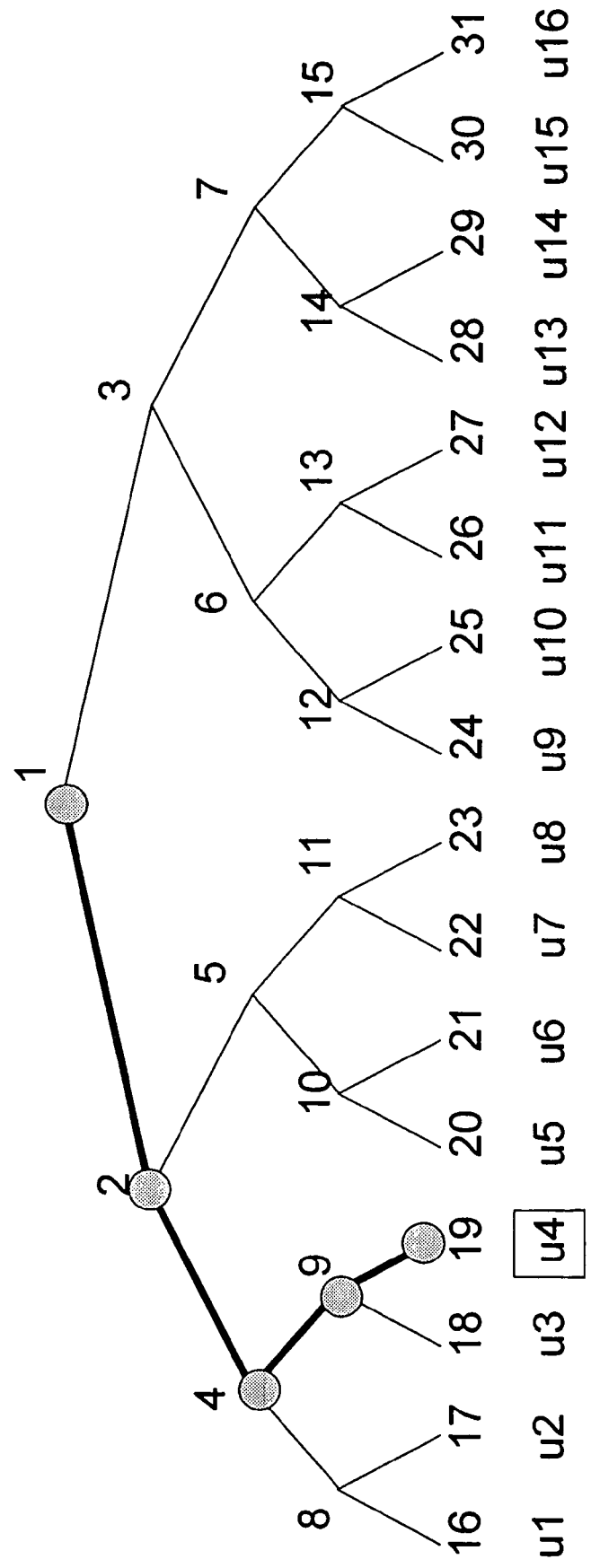
FIG. 4 is a diagram for explaining node keys of receivers associated with leaves in the CS method.

As shown in FIG. 4, 16 receivers u1 to u16 are assigned to the hierarchical tree, and 31 nodes 1 to 31 exist. To the receiver u4, five node keys assigned to the nodes 1, 2, 4, 9, and 19 are given. That is, each of the receivers holds logN+1 node keys, where N denotes the total number of the receivers.

Figure 5:
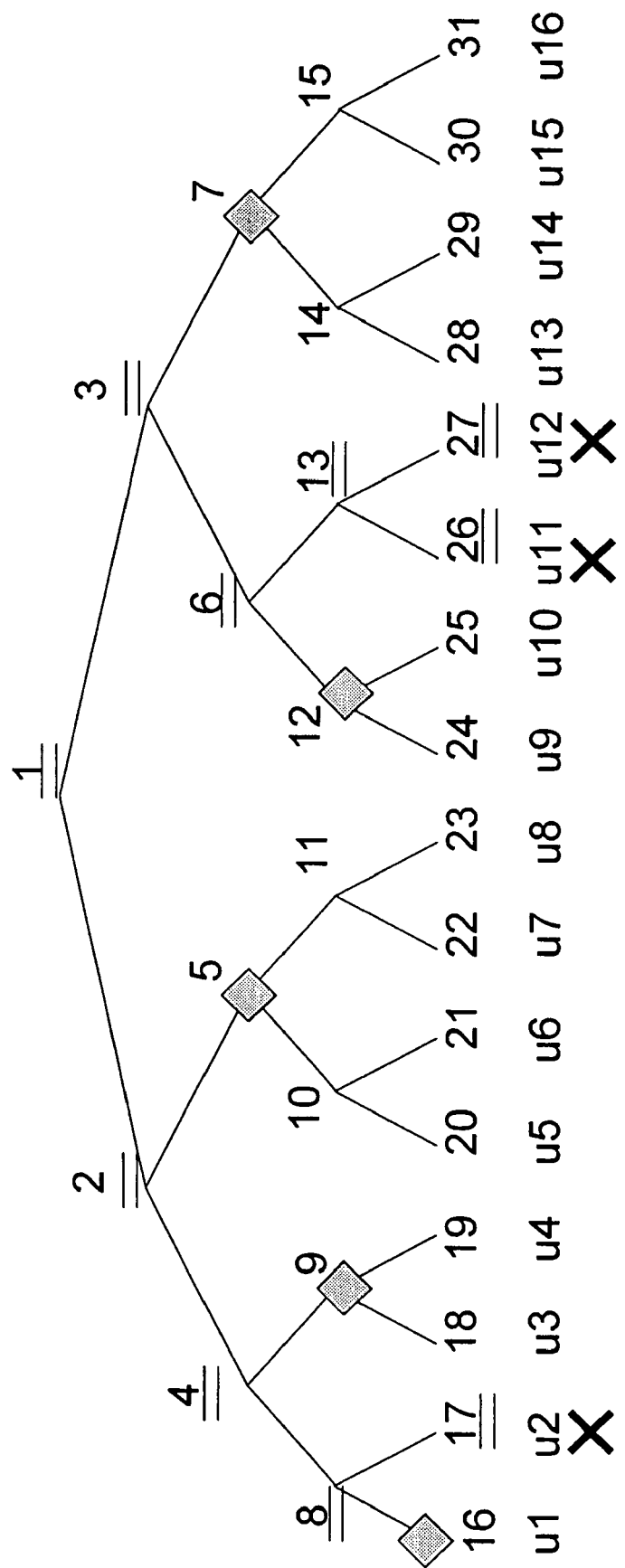
FIG. 5 is a diagram for explaining a scheme where secret information is provided selectively to unrevoked receivers in the CS method.

Referring now to FIG. 5, how secret information (e.g., a content key for decrypting encrypted content) is transmitted to unrevoked receivers based on the setting described above will be described. It is assumed herein that the trusted center (TC) acts as the sender of secret information. Now, let it be supposed that the receivers u2, u11, and u12 are revoked as unauthorized devices. That is, only the receivers other than the receivers u2, u11, and u12 are allowed to securely receive information, i.e., to carry out decryption based on broadcasted ciphertexts.

When sending secret information, the trusted center generates and broadcasts a ciphertext set without using, as encryption keys, the node keys assigned to the nodes on the paths from the respective leaves to which the revoked receivers u2, u11, and u12 are assigned to the root of the tree.

If the node keys assigned to the leaves or nodes on the paths from the respective leaves to which the revoked receivers u2, u11, and u12 are assigned to the root of the tree were used, since the node keys are possessed by the receivers to be revoked, the receivers to be revoked are allowed to obtain the secret information. Thus, a ciphertext set is generated and broadcasted without using the node keys.

When the nodes and paths on the paths from the respective leaves to which the revoked receivers u2, u11, and u12 are assigned to the root of the tree are removed from the tree, one or more subtrees remain, such as a subtree with the node 5 as the vertex thereof and a subtree with the node 12 as the vertex thereof.

The sender of the secret information sends a ciphertext set including ciphertexts generated by encrypting the secret information using the node keys assigned to the nodes that are closest to the vertexes of the respective subtrees, i.e., the node keys assigned to the nodes 5, 7, 9, 12, and 16 in the example shown in FIG. 5. For example, when the secret information that is sent is a content key Kc used for decrypting encrypted content and the node keys assigned to the nodes 5, 7, 9, 12, and 16 are denoted by NK5, NK7, NK9, NK12, and NK16, the sender of the secret information generates a ciphertext set including E(NK5, Kc), E(NK7, Kc), E(NK9, Kc), E(NK12, Kc), and E(NK16, Kc), and provides the ciphertext set by distributing it via a network or as stored on recording media. E(A, B) denotes data generated by encrypting data B using a key A.

The ciphertext set prohibits decryption by the revoked receivers u2, u11, and u12 while permitting decryption by all the other receivers. By generating and sending a ciphertext set in the manner described above, secret information can be transmitted efficiently and securely.

Each unrevoked receiver can obtain the secret information by decrypting a ciphertext that can be decrypted by the receiver, i.e., a ciphertext encrypted using the node key associated with a node on the path from the leaf to which the receiver is assigned to the root. In the above example, for example, the receiver u4 holds the node key of the node 9, so that the receiver u4 can decrypt the ciphertext E(NK9, Kc) using the node key of the node 9. Similarly, for each unrevoked receiver, the ciphertext set received includes a single ciphertext that can be decrypted by that unrevoked receiver.

1.2 Reduction of the Number of Keys in the CS Method

Observation of the CS method described above reveals that, in the CS method, the leaves of a subtree with a given node as the vertex thereof are also leaves of a subtree whose root is an ancestor node of that node.

Figure 6:
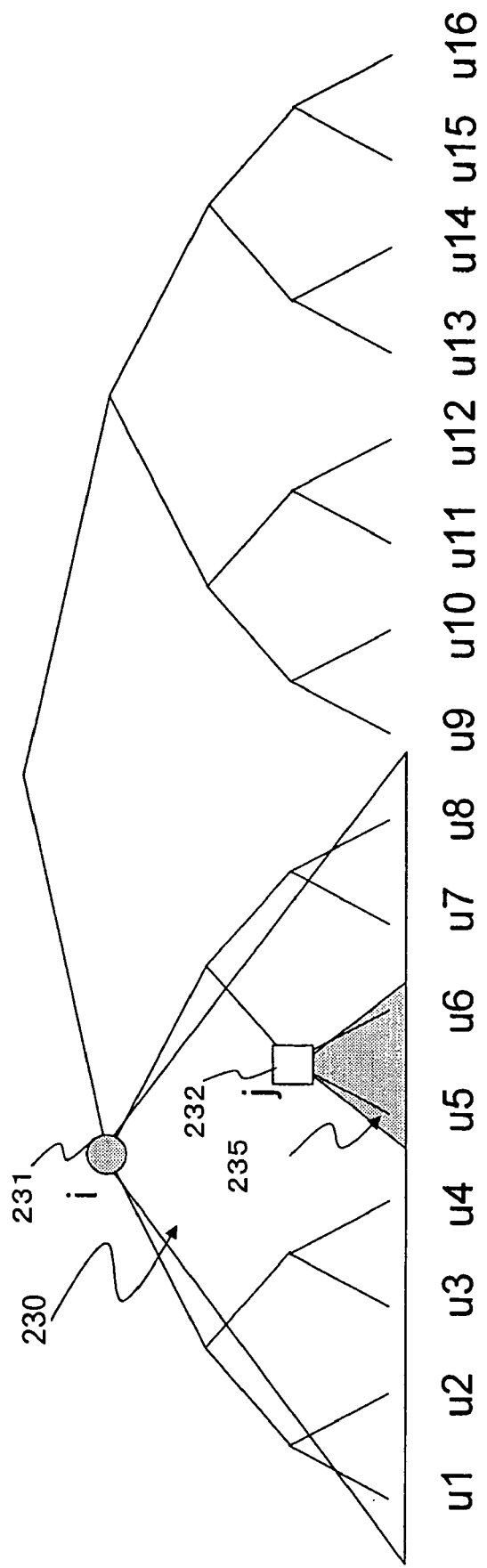
FIG. 6 is a diagram for explaining distinct subtrees in a tree structure.

For example, as shown in FIG. 6, leaves u5 and u6 of a subtree P 235 whose root is a node j 232 are also leaves of a subtree A 230 whose root is a node i, which is an ancestor node of the node j 232.

Thus, a receiver that holds the node key of a certain node also holds the node key of an ancestor of that node. For example, as shown in FIG. 6, when the node i 231 is an ancestor of the node j 232, each of the receivers having the node key of the node j 232 (u5 and u6) also has the node key of the node i 231. However, the opposite is not necessarily true.

Because of the properties described above, for example, by defining node keys so that it is possible to calculate the node key of an ancestor node from the node key of a given node of the tree, the number of keys, i.e., the memories of the receivers, can be reduced compared with a case where a plurality of node keys is possessed independently.

However, it should be inhibited to calculate the node key of a descendant node from the node key of an upper node. For example, as shown in FIG. 6, when he node i231 is an ancestor of the node j232, the receivers having the node key of the node j232 (u5 and u6) also has the node key of the node i231. In contrast, the receivers having the node key of the node i231 (u1 to u8) do not necessarily have the node key of the node j232. In the hierarchy shown in FIG. 6, among the receivers u1 to u8, only the receivers u5 and u6 are allowed to have the node key of the node j232. The other receivers u1 to u4 and u7 to u8 are not allowed to have the node key of the node j232, since these receivers are not allowed to calculate the node key of the node j232 from the node key of the node i231.

Thus, in the tree structure according to this embodiment, node keys are defined for the respective nodes using a one-way function y=F(x), i.e., a function with which it is easy to calculate y from x while the inverse operation is prohibited.

1.3 Reduction of the Number of Keys Using the RSA Cryptosystem

Figure 7:
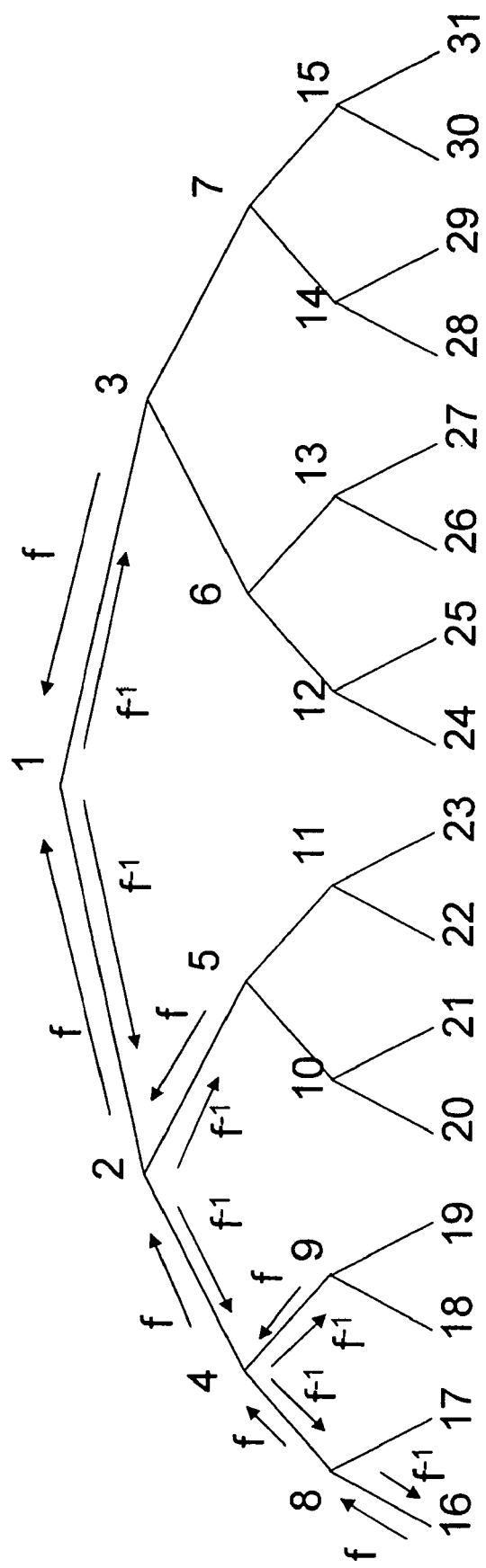
FIG. 7 is a diagram for explaining a tree structure that is defined by forward permutation and inverse permutation of the RSA cryptosystem.

Now, a method based on the RSA cryptosystem, proposed by Nojima et al and Ogata et al in "Proceedings of the Symposium on Cryptography and Information Security 2004, pp. 189-194" and "Proceedings of the Symposium on Cryptography and Information Security 2004, pp. 195-199", will be described. In this method, as shown in FIG. 7, the forward permutation (f) and the inverse permutation (f$^{-1}$) of the RSA cryptosystem are used. Letting the modulus of the RSA cryptosystem be denoted by M, the public exponent by e, and the private exponent by d, the forward permutation (f) is permitted with the knowledge of the modulus M and the public exponent e while the inverse permutation (f$^{-1}$) is prohibited without the knowledge of the private exponent d.

The RSA cryptosystem is described, for example, in A. J. Menezes, P. C. van Oorschot and S. A. Vanstone, "Handbook of Applied Cryptography", CRC Press, 1996.

In the method based on the RSA cryptosystem, only the trusted center privately holds the private exponent d, and the modulus M and the public exponent e are made public to the receivers. The trusted center defines a secret value K such that $K \in Z^*_M$, and uses it as a root key $NK_1$, i.e., $NK_1 = K$. $K \in Z^*_M$ indicates that K is an element of a group $Z^*_M$ (i.e., a group of elements having inverse elements among a group $Z_M = \{0, 1, \ldots, M-1\}$.

The key of a node 1 that is not the root node is calculated from the key of its parent node expressed below and the node number 1:

$$NK_{\lfloor 1/2 \rfloor}$$

where $\lfloor i \rfloor$ denotes the greatest integer not greater than i according to the equation below:

$$NK_1 = (NK_{\lfloor 1/2 \rfloor} \oplus H(l))^d \bmod M$$

where $\oplus$ denotes the XOR operation

In the above equation, H denotes a public function that maps input of an arbitrary size to an element of $Z_M$.

As described above, only the trusted center with the knowledge of the private exponent d is allowed to derive the key of a child node from the key of a parent node. In contrast, according to the equation below:

$$NK_{\lfloor 1/2 \rfloor} = (NK_1^e \oplus H(l)) \bmod M$$

a receiver with the knowledge of the key $NK_1$ of the child node can derive the node key of the parent node expressed below:

$$NK_{\lfloor 1/2 \rfloor}$$

using the modulus M, the public exponent e, and the public function H that are made public.

2. Scheme of the CS Method Employing Rabin Tree 2.1 Example Construction of Rabin Tree In this embodiment, a unidirectional Rabin tree is used. A "Rabin tree" is not a commonly used term, and it is a term used for the description of this embodiment. In a complete binary tree having N leaves, nodes are numbered in a width-first manner, i.e., the root node is numbered as 1, and the subsequent nodes are numbered as 2, 3, . . . , 2N-1 from the upper left, and a Rabin tree is formed in the manner described below.

Similarly to the case of the RSA cryptosystem, a trusted center determines and makes public a product M of two large prime numbers. The trusted center determines a secret value Y such that $Y \in Z^*_M$, and uses it as a value $NV_1$ associated with the root (node 1). $Y \in Z^*_M$ indicates that Y is an element of a group $Z^*_M$.

A value $NV_1$ associated with a node 1 (1=2, 3, . . . , 2N-1) that is not the root is calculated using the node number 1 and the node associated value of the parent node of the node 1, expressed by:

$$NV_{\lfloor 1/2 \rfloor}$$

First, $temp_l$ is defined by the equation below:

$$temp_l = (NV_{\lfloor 1/2 \rfloor} - H(l \| salt_l)) \bmod M$$

A least positive integer $salt_l$ with which the value $temp_l$ defined by the above equation becomes a quadratic residue modulo the product M of the two large prime numbers is determined. The value $salt_1$ is a node attached variable associated with the node 1.

In the above equation, $1\|salt_1$ denotes the concatenation of 1 and $salt_1$, and H denotes a public function that maps inputs of arbitrary sizes to a group $Z_M$ defined by the product M of the two large prime numbers. For example, SHA-1 hash function that yields a 160-bit output in relation to input of an arbitrary length is used, so that $|M|$-160 bits of 0 and an output yielded by inputting $1\|salt_1$ to SHA-1 are concatenated and the resulting $|M|$-bit value is used as $H(1\|salt_1)$. The hash function SHA-1 is described, for example, in A. J. Menezes, P. C. van Oorschot and S. A. Vanstone, "Handbook of Applied Cryptography," CRC Press, 1996.

When a number K is a quadratic residue modulo M, a number a that satisfies $a^2 \equiv K \pmod{M}$ exists. This is expressed as $K \in QR_M$. With the knowledge of the prime factors p and q of M, it is possible to determine whether a number K satisfies $QR_M$ according to whether the following equations are satisfied:

$$\left(\frac{a}{p}\right) = a^{(p-1)/2} \equiv 1 \pmod{p}$$

and $$\left(\frac{a}{q}\right) = a^{(q-1)/2} \equiv 1 \pmod{q}$$

where (a/p) is a Legendre symbol. That is, K satisfies $K \in QR_M$ if and only if the above equations are both satisfied.

Furthermore, one with the knowledge of the prime factors p and q of M can calculate such a value a that $a^2 \equiv K \pmod{M}$. The method of calculation is described, for example, in Tatsuaki Okamoto and Hiroshi Yamamoto, "Gendai Angou", Sangyo Tosho, p. 114. When $K \in QR_M$, four values of a satisfy $a^2 \equiv K \pmod{M}$.

Conversely, when $K \in QR_M$, it is prohibited for one without the knowledge of the prime factors p and q of M to calculate such a value a that satisfies $a^2 \equiv K \pmod{M}$. Actually, it has been verified that this problem is equivalent to factorization of M.

When a lest positive integer $salt_l$ that satisfies $temp_l \in QR_M$ has been found, $temp_l^{1/2}$ mod M is calculated, and one of four values obtained as solutions is chosen as a value associated with a node 1, i.e., the node associated value $NV_1$ of the node 1.

In this manner, node associated values $NV_2$ and $NV_3$ of child nodes 2 and 3 are determined from the node associated value $NV_1$ of the root node, and this process is repeated until node associated values for all the nodes up to the node $NV_{2N-1}$ are determined.

The node associated values $NV_l$ (l=2, 3, . . . , 2N−1) of the respective nodes 1, determined in the manner described above, satisfy the relationship expressed by:

$$NV_{\lfloor l/2 \rfloor} = (NV_l^2 + H(l\|salt_l)) \bmod M \qquad (1)$$

That is, since the function H and the modulus M are made public, from the node associated value $NV_1$ and node attached variable $salt_1$ of a given node, the node associated value of the parent node, expressed below, can be readily calculated:

$$NV_{\lfloor l/2 \rfloor}$$

An example of algorithm for constructing a binary Rabin tree having N leaves will be described below. The input of this algorithm is as follows:

Input:
N: The number of leaves of the binary tree
$|M|$: The size of the modulus M
The output of this algorithm is as follows:
Output:
M
H: The mapping function for outputting an element of $Z_M$
$NV_1, NV_2, NV_{2N-1}$: 2N−1 $|M|$-bit node associated values
$salt_2, salt_3, \ldots, salt_{2N-1}$: 2N−2 node attached variables
The algorithm for obtaining the output based on the input is as follows:

1. Determine two large prime numbers of the size $|M|/2$, and calculate the product thereof.
2. Determine a function H that maps input of an arbitrary size to an element of $Z_M$.
3. Randomly choose a value $NV_1 \in Z^*_M$ as the node associated value of the root node.
4. Execute processes a and b described below while incrementing l as a counter from 2 by 2N−1.
   a. Find a least positive integer $salt_l$ with which $temp_l$ expressed below is a quadratic residue modulo M:

$$temp_l = (NV_{\lfloor l/2 \rfloor} - H(l\|salt_l)) \bmod M \qquad (2)$$

b. Calculate $temp_l^{1/2}$ mod M, and choose one of the four solutions as the node associated value $NV_1$ of the node 1.
5. Output M, H, 2N−1 $|M|$-bit node associated values $NV_1$, $NV_2, \ldots, NV_{2N-1}$, and 2N−2 node attached variables $salt_2$, $salt_3, \ldots, salt_{2N-1}$, and exit the process.

The output value $NV_1$ serves as the node associated value of the node 1 of the Rabin tree. The total number of nodes of a complete binary tree having N leaves is 2N−1, and the output includes the node associated values of all the nodes.

Figure 8:
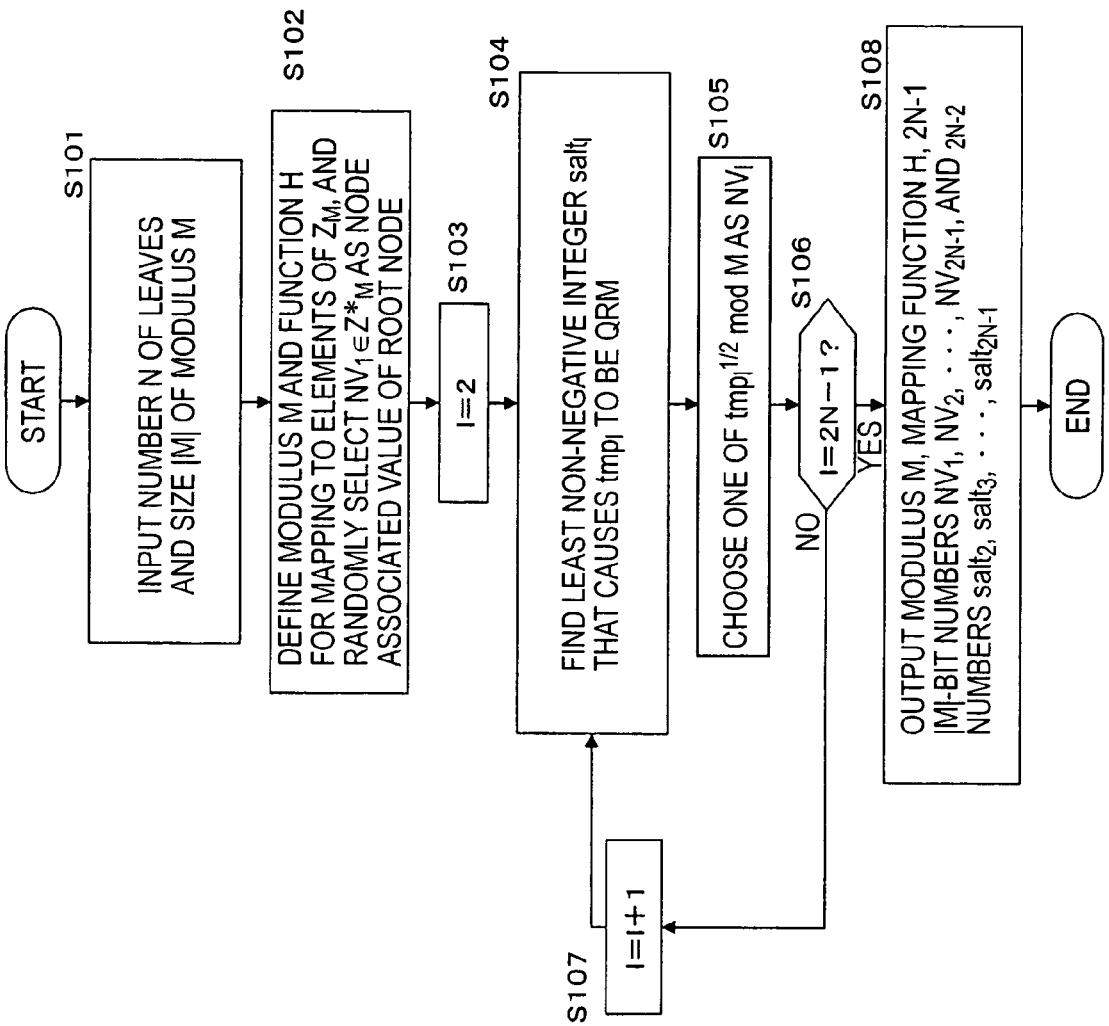
FIG. 8 is a flowchart showing a process for generating a Rabin tree as a unidirectional permutation tree and for calculating node associated values and node attached variables according to an embodiment of the present invention.

FIG. 8 shows the flow of the algorithm. Now, the steps of the flow will be described. In step S101, the number N of leaves of the binary tree and the size $|M|$ of the modulus M are input.

In step S102, after determining the modulus M and a mapping function H, the node associated value $NV1 \in Z^*_M$ of the root node is randomly chosen. In step S103, l is initially set so that l=2.

In step S104, a least positive integer $salt_l$ with which $temp_l$ defined by equation (2) becomes a quadratic residue modulo M is chosen as a node attached variable.

In step S105, $temp_l^{1/2}$ mod M is calculated, and one of the four solutions is chosen as the node associated value $NV_1$ of the node 1.

In step S106, it is checked whether l=2N−1. When l≠2N−1, the process proceeds to step S107, in which l is incremented by 1. Then, steps S104 and S105 are executed. Steps S104 and S105 are repeated until it is determined in step S107 that l=2N−1. When it is determined in step S107 that l=2N−1, the process proceeds to step S108. In step S108, the modulus M, the mapping function H, 2N−1 $|M|$-bit node associated values $NV_1, NV_2, \ldots, NV_{2N-1}$, and 2N−2 node attached variables $salt_2, salt_3, \ldots,$ and $salt_{2N-1}$. The process is then exited.

Figure 9:
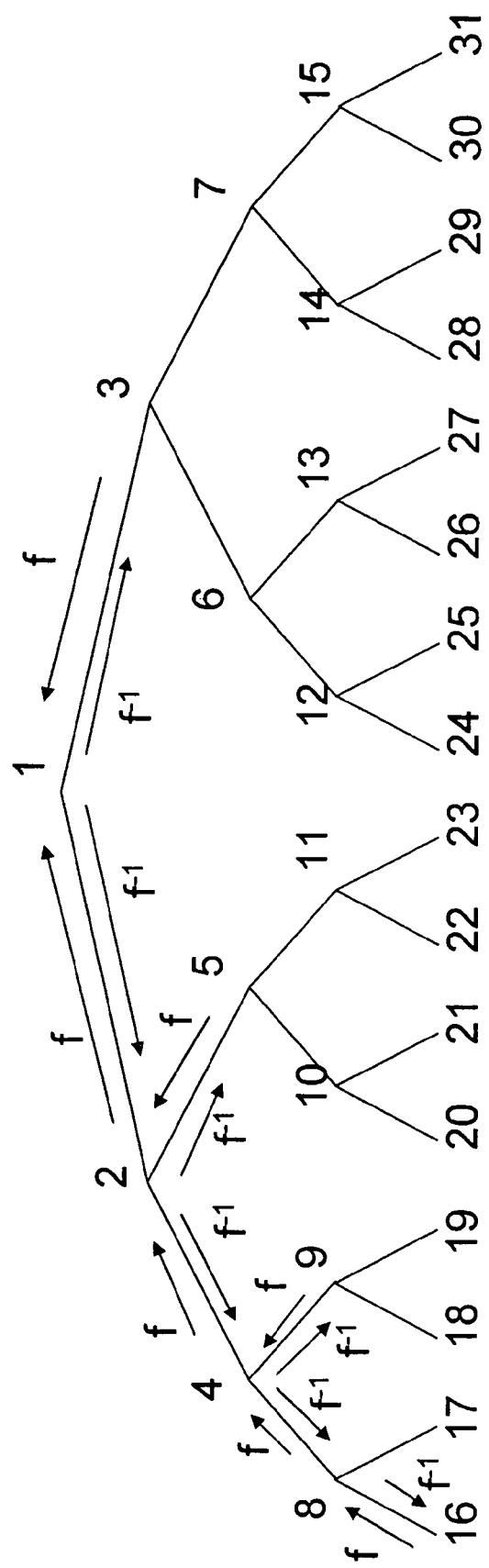
FIG. 9 is a diagram showing the structure of the Rabin tree as a unidirectional permutation tree used in the embodiment.

FIG. 9 shows the structure of a Rabin tree in which the node associated values $NV_1$ of the respective nodes are determined by the process described above. Regarding the tree composed of the nodes having the node associated values $NV_1$ determined by the process described above, the node associated value of the parent node, expressed below, from the node associated value $NV_1$ and the node attached variable $salt_1$ of a given node; however, the inverse operation is prohibited:

$$NV_{\lfloor l/2 \rfloor}$$

In FIG. 9, each linear arrow shown along the function f indicates that the node associated value of an upper node can be calculated by applying the function f with the node associated value $NV_1$ of a lower node. The function f is based on the forward operation (squaring mod M) F. The node associated value of the parent node of a given child node can be calculated from the node associated value $NV_1$ and the node attached variable $salt_1$ of the child node according to equation (1) given earlier, using the public function H and the modulus M.

In FIG. 9, each linear arrow shown along the function $f^{-1}$ indicates that the node associated value of a lower node can be calculated by applying the function $f^{-1}$ with the node associated value of an upper node as input. The function $f^{-1}$ is based on the inverse operation (½ exponentiation mod M) $F^{-1}$. In order to calculate the node associated value of the child node from the node associated value of the upper node, the knowledge of the secret information p and q (prime factors of M) is needed. This is possible only for the trusted center.

As described above, the unidirectional tree generated is such that regarding the direction from lower to upper, node associated values NV can be calculated according to equation (1) given earlier, using the public function H and the modulus M, while the inverse operation is prohibited. A unidirectional tree composed of nodes having node associated values $NV_1$ as described above is referred to as a Rabin tree. This is because the Rabin cryptosystem uses squaring mod M for encryption (forward operation) and root (half exponentiation) over mod M for decryption (inverse operation).

That is, node associated values that are assigned to the nodes of a Rabin tree as a unidirectional tree have the following characteristics. The node associated value of an upper node is calculated through encryption (forward operation) by the Rabin cryptosystem based on the node associated value of a lower node, and the node associated value of a lower node is calculated through decryption (inverse operation) by the Rabin cryptosystem based on the node associated value of the lower node. Accordingly, the node associated value of an upper node can be calculated from the node associated value of a lower node according to expression (1) described earlier using the public function H and the modulus M. However, it is prohibited to calculate the node associated value of a lower node from the node associated value of an upper node with the public function H and the modulus M alone, and the calculation is possible only for the trusted center with the knowledge of the secret information p and q (prime factors of M). The Rabin cryptosystem is described in detail, for example, in A. J. Menezes, P. C. van Oorschot and S. A. Vanstone, "Handbook of Applied Cryptography", CRC Press, 1996, pp. 292-294. The addition "+" in expression (1) and the subtraction "−" in expression (2) may be replaced by exclusive-OR (XOR) operations.

2.2 Scheme for Reducing the Number of Keys using Rabin Tree

In the Rabin tree constructed as described above, node keys $NK_1$ for the respective nodes are defined similarly to the case of the CS method. The node keys $NK_1$ are values that can be calculated using the node associated values $NV_1$ defined in the manner described above. More specifically, the node key $NK_1$ of a node 1 is such that $NK_1=Hc(NV_1)$. The function Hc is a hash function that maps a value of the size |M| to a random value of a size C. For example, when C is 160 bits, SHA-1 can be used as a function that outputs a 160-bit value with an input of an arbitrary size. When C is 128 bits, MD5 can be used as a function that outputs a 128-bit value with an input of an arbitrary size. MD5 is also described in detail in A. J. Menezes, P. C. van Oorschot and S. A. Vanstone, "Handbook of Applied Cryptography", CRC Press, 1996.

The node keys are used for encryption of information to be sent to receivers, such as session keys. Thus, the size C is chosen to be the size of a key of an encryption algorithm used for this purpose. For example, when AES (Advanced Encryption Standard, FIPS 197), which uses a 128-bit key, is used as the encryption algorithm, C is chosen to be 128 bit. When the size of a key used for an encryption function is |M|, the node keys may be chosen so that $NK_1=NV_1$. That is, Hc may be an identity function.

The N leaves of the Rabin tree are numbered from the left as $leaf_1$, $leaf_2$, ..., $leaf_N$ (i.e., since the node number of the leftmost $leaf_1$ is N, the node number of $leaf_i$ is N−1+i), and receivers ui are assigned to $leaf_i$. To the receiver ui, the node associated value $NV_{N-1+i}$ of the leaf node $leaf_i$, and logN node attached variables $salt_1$ of the nodes on the path from leafs to the root are assigned. When the receivers are assigned as shown in FIG. 10, to the receiver u4 assigned to the leaf node 19, the node associated value $NV_{19}$ of the node 19, and the node attached variables $salt_{19}$, $salt_9$, $salt_4$, and $salt_2$ of the nodes on the path from the node 19 to the root, are assigned.

With this setting, the receiver u4 can calculate the node associated values of all the nodes on the path from the node 19 to the root using the node associated value $NV_{19}$ and the node attached variables $salt_{19}$, $salt_9$, $salt_4$, and $salt_2$ of the nodes on the path from the node 19 to the root. The node keys $NK_1$ of the respective nodes can be calculated from the node associated values $NV_1$ according to $NK_1=Hc(NV_1)$, as described earlier.

Figure 10:
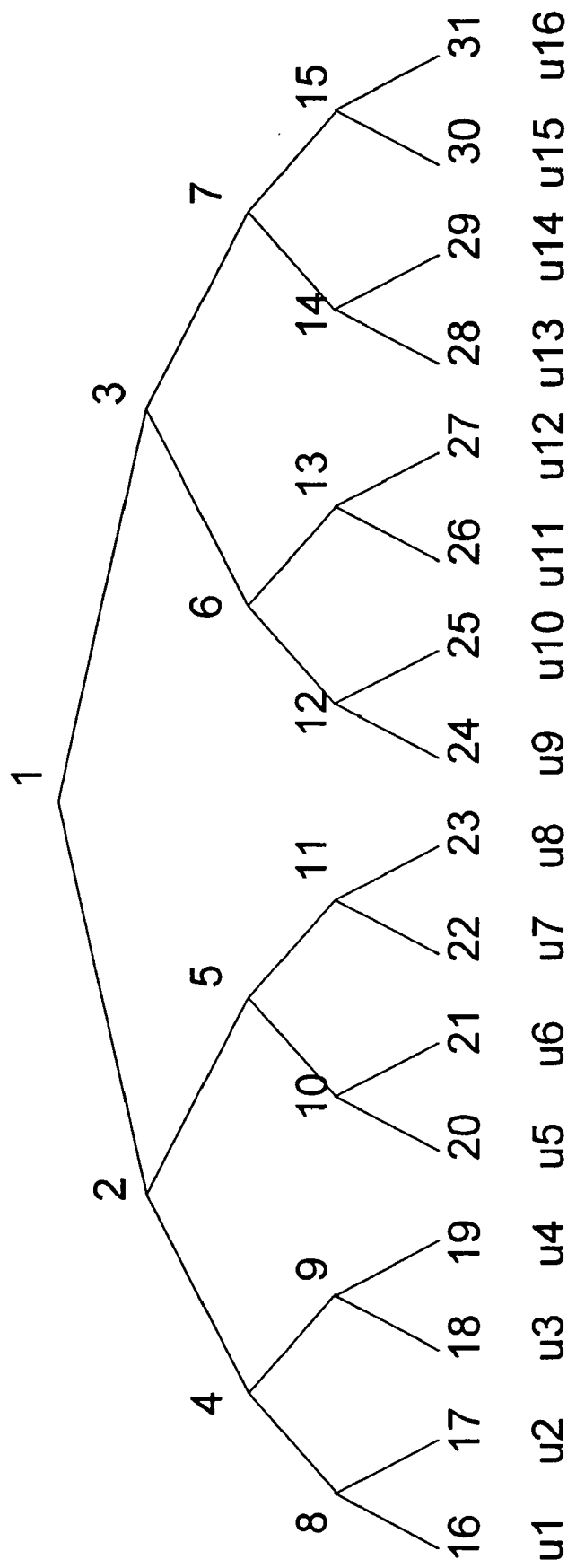
FIG. 10 is a diagram for explaining data that is given to a receiver in the CS method employing a Rabin tree.

In the receiver assignment shown in FIG. 10, to the receiver u4 assigned to the leaf node 19, the node associated value $NV_{19}$ of the node 19, and the node attached variables $salt_{19}$, $salt_9$, $salt_4$, and $salt_2$ of the nodes on the path from the node 19 to the root, are assigned. The node associated values NV and the node keys NK of the upper nodes of the receiver u4 (with node numbers of 1, 2, 4, and 9) are calculated by the following process.

(a1) The node associated value $NV_9$ of the upper node 9 is calculated from the node associated value $NV_{19}$ of the node 19 by $NV_9=((NV_{19})^2+H(19\|salt_{19}))\bmod M$ (a2) The node associated value $NV_4$ of the upper node 4 is calculated from the node associated value $NV_9$ of the node 9 by $NV_4=((NV_9)^2+H(9\|salt_9))\bmod M$ (a3) The node associated value $NV_2$ of the upper node 2 is calculated from the node associated value $NV_4$ of the node 4 by $NV_2=((NV_4)^2+H(4\|salt_4))\bmod M$ (a4) The node associated value $NV_1$ of the upper node 1 is calculated from the node associated value $NV_2$ of the node 2 by $NV_1=((NV_2)^2+H(2\|salt_2))\bmod M$ The node associated values of upper nodes are calculated from the node associated values of lower nodes according to the equations given above.

Furthermore, node keys can be calculated from the node associated values of the respective nodes according to the following equations:

(b1) The node key $NK_{19}$ of the node 19 is calculated from the node associated value $NV_{19}$ of the node 19 by $NK_{19}=Hc(NV_{19})$ (b2) The node key $NK_9$ of the node 9 is calculated from the node associated value $NV_9$ of the node 9 by $NK_9=Hc(NV_9)$ (b3) The node key $NK_4$ of the node 4 is calculated from the node associated value $NV_4$ of the node 4 by $NK_4$=Hc($NV_4$)

(b4) The node key $NK_2$ of the node 2 is calculated from the node associated value $NV_2$ of the node 2 by $NK_2$=Hc($NV_2$)

(b5) The node key $NK_1$ of the node 1 is calculated from the node associated value $NV_1$ of the node 1 by $NK_1$=Hc($NV_1$)

The receiver u4 needs to keep the node associated value $NV_{19}$ secret, but need not keep the node attached variables salt secret. Thus, the arrangement may be such that all the receivers have all the node attached variables $salt_1$.

Now, the size of each node attached variable salt will be considered. The probability of a given number being a quadratic residue modulo M is approximately ¼. Thus, when four values are tried as $salt_1$, it is expected that on average one value causes $temp_1$ to be a quadratic residue. Thus, it is expected that the size needed for representing a node attached variable $salt_1$ is 2 bits.

In some cases, none of the four values results in a quadratic residue. For example, when L values are tried as a node attached variable $salt_1$, the probability of no $temp_1$ being a quadratic residue is $3^L/4^L$. Thus, when L=4, it occurs with a probability of $3^4/4^4 \approx 42.2\%$ that no $temp_1$ is a quadratic residue. However, when the node attached variable $salt_1$ is an 8-bit value and 256 values are tried, the probability of no $temp_1$ being a quadratic residue is considerably reduced to $3^{256}/4^{256} \approx 1.0 \times 10^{-32}$. Thus, even when the number N of leaves is large, e.g., $2^{30} \approx 10^9$ or $2^{40} \approx 10^{12}$, the probability of failure to find a node attached variable $salt_1$ with which $temp_1$ becomes a quadratic residue becomes negligibly small.

3. Ciphertext Distribution and Decryption by CS Method Employing Rabin Tree

Next, based on a Rabin tree in which the node associated values $NV_1$ associated with the respective node of the binary tree are assigned by the process described above, a ciphertext distribution process and a ciphertext decryption process will be described. The description will be given in the following order:

3-1. Setup process
3-2. Information distribution process
3-3. Information reception and decryption process 3-1. Setup process The setup process is executed only once at the time of activation of the system. The subsequent information distribution process and information reception and decryption process are executed each time information to send occurs, for example, when an information recording medium such as a DVD storing new content is distributed or when new information is distributed via a network. The setup process may be executed by a trusted center (TC) that is independent of an entity that actually distributes ciphertext, or by the entity that distributes ciphertext. The following description will be given in the context of an example where the setup process is executed by a trusted center (TC).

a. Step 1

Figure 31:
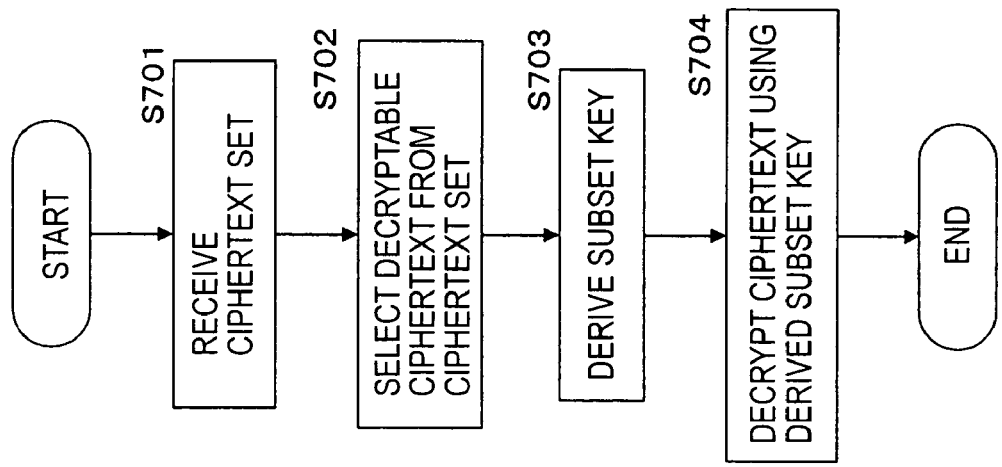
FIG. 31 is a flowchart of a process from receipt of ciphertexts to obtaining of a subset key and decryption by a receiver.

The trusted center (TC) defines a binary tree having N leaves, and assigns node numbers k (j=1, 2, . . . , 2N−1) to the respective nodes in the tree. The root node, i.e., the uppermost node in the binary tree, is designated as a node 1, and subsequent nodes are numbered in the breadth-first order. That is, for example, node numbers 1 to 31 are assigned as shown in FIG. 31. Thus, node numbers 1 to 2N−1 are assigned to the respective nodes in the binary tree. Furthermore, receivers um (m=1, 2, . . . , N) are assigned to the respective leaves of the tree.

b. Step 2

The trusted center (TC) first determined the size |M| of the modulus M.

Then, with the number N of the leaves of the tree and the size |M| of the modulus M as input, a binary Rabin tree having N leaves is created according to the algorithm described with reference to the flowchart shown in FIG. 8. First, the modulus M and the mapping function H that maps values of arbitrary sizes to random elements of $Z_M$ are defined, the node associated value $NV1 \in Z^*_M$ of the root node is randomly chosen, and then 2N−1 |M|-bit node associated values $NV_1, NV_2, \ldots, NV_{2N-1}$ of the nodes 1 to 2N−1, and 2N−2 node attached variables $salt_2, salt_3, \ldots, salt_{2N-1}$ of the nodes 2 to 2N−1, are defined. Since the salt values are not secret, the trusted center (TC) may make the salt values public. Furthermore, the trusted center makes the modulus M and the mapping function H public. Furthermore, the trusted center (TC) defines a function Hc that maps values of the size |M| to random values of a size C, and makes the function Hc public.

The structure Rabin tree in which the node associated values $NV_1$ of the respective nodes are defined by the process described above is shown in FIG. 9. Regarding the tree in which the node associated values $NV_1$ are defined by the above process, it is readily possible to calculate the node associated value of a parent node from the node associated value $NV_1$ and the node attached variable $salt_1$ of a given node; however, the inverse operation is prohibited.

Furthermore, the trusted center (TC) calculates the node key $NK_1$ of a node 1 of the tree from the node associated value $NV_1$ thereof by $NK_1$=HC($NV_1$).

c. Step 3

The trusted center (TC) assigns node keys to receivers um (m=1, 2, . . . , N) assigned to the leaves at the terminals of the tree, according to the following rule. As shown in FIG. 10, the receivers are assigned to the leaves of the tree with node numbers 16 to 31. In the example shown in FIG. 10, 16 receivers u1 to u16 are assigned to the nodes with node numbers 16 to 31.

The path from the leave to which a receiver um is assigned to the root will be denoted as a path m[path-m]. The set of nodes on the path m [path-m] will be denoted as path nodes m [PathNodes-m].

In the example shown in FIG. 10,
PathNodes-1={1, 2, 4, 8, 16}
PathNodes-4={1,2, 4, 9, 19}
PathNodes-11={1, 3, 6, 13, 26}

The line connecting the nodes 1, 2, 4, 8, and 16 in FIG. 10 represents the path 1 [path-1] of the receiver u1, which is composed of PathNodes-1={1, 2, 4, 8, 16}. The line connecting the nodes 1, 2, 4, 9, and 19 in FIG. 10 represents the path 4 [path-4] of the receiver u4, which is composed of PathNodes-4={1, 2, 4, 9, 19}.

The trusted center (TC) assigns the following items to each receiver um:

(a) Node associated value $NV_1$ of the leaf node to which the receiver um is assigned (b) salt values of the path nodes on the path of the receiver um except for the root node In the structure shown in FIG. 10, to the receiver assigned to the leaf node 19, the node associated value $NV_{19}$ of the node 19, and the node attached variables $salt_{19}$, $salt_9$, $salt_4$, and $salt_2$ of the nodes on the path from the node 19 to the root, are assigned.

That is, to a receiver ui, the node associated value $NV_{N-1+i}$ of the leaf node $leaf_i$, and logN node attached variables $salt_1$ of the nodes on the path from the leaf node $leaf_i$ to the root, are assigned.

The receivers keep the node associated values secret to prevent leakage. The node attached variables may be made public, and need not be kept secret.

Figure 11:
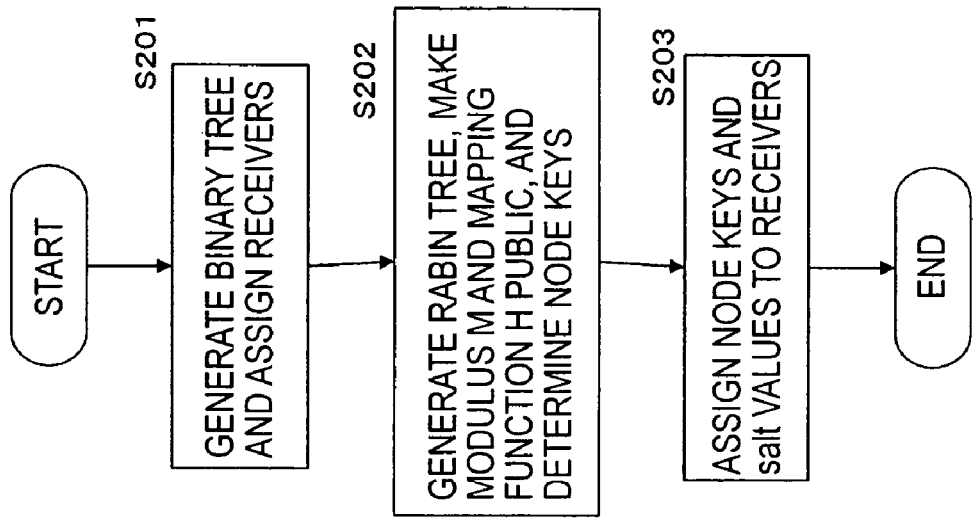
FIG. 11 is a diagram showing the flow of a setup process.

FIG. 11 shows the flow of the setup process. Now, the steps of the flow shown in FIG. 11 will be described.

In step S201, the trusted center (TC) defines a binary tree having N leaves, and assigns numbers to the nodes with the root node, i.e., the uppermost node in the binary tree, as 1 and subsequent nodes in the breadth-first order. That is, node numbers 1 to 31 are assigned as shown in FIGS. 9 and 10. Furthermore, the trusted center (TC) assigns the receivers um (m=1, 2, ..., N) to the respective leaves of the tree.

Then, in step S202, the trusted center (TC) defines the size |M| of the modulus M. Then, using the number N of the leaves of the tree and the size |M| of the modulus M as input, the trusted center (TC) defines the modulus M and the function H that maps values of arbitrary sizes to random elements of $Z_M$, and creates a binary Rabin tree having N leaves according to the algorithm described with reference to the flow shown in FIG. 8. First, the trusted center (TC) randomly selects a node associated value $NV1 \in Z^*_M$, and then defines 2N-1 |M|-bit node associated values $NV_1$, $NV_2$, ..., $NV_{2N-1}$ of the nodes 1 to 2N-1, and 2N-2 node attached variables $salt_2$, $salt_3$, ..., $salt_{2N-1}$ of the nodes 2 to 2N-1. Furthermore, the trusted center (TC) makes the modulus M and the mapping function H public. Furthermore, the trusted center (TC) defines a function Hc that maps values of the size |M| to random values of a size C, and makes the function Hc public.

Furthermore, the trusted center (TC) calculates the node key $NK_1$ of each node 1 of the tree from the node associated value $NV_1$ thereof by $NK_1=HC(NV_1)$, thereby determining the node keys $NK_1$ of the respective nodes 1.

In step S203, to the receivers um (m=1, 2, ..., N) assigned to the leaf nodes at the terminals of the tree, the trusted center (TC) gives the following items described earlier:

(a) Node associated value $NV_1$ of the leaf node to which the receiver um is assigned (b) salt values of the path nodes on the path of the receiver um except for the root node 3-2. Information Distribution Process Information distribution, i.e., transmission of secret information, is achieved by the trusted center (TC) broadcasting one or more ciphertexts. Each of the ciphertexts is generated by encrypting secret information using one of the node keys. The node key used for encryption is selected in the same manner as in the case of the complete subtree (CS) method.

In the example shown in FIG. 5, five ciphertexts are transmitted. In the example shown in FIG. 5, the receivers u2, u11, and u12 are revoked receivers. That is, the receivers u2, u11, and u12 are revoked as unauthorized devices, and only the other receivers are allowed to securely receive information, i.e., to carry out decryption based on broadcasted ciphertexts.

When information is transmitted, a ciphertext set is generated and broadcasted without using node keys of the nodes on the paths from the leaves to which the revoked receivers u2, u11, and u12 are assigned to the root of the tree. When the paths from the leaves to which the revoked receivers u2, u11, and u12 are assigned to the root of the tree, and the nodes on the paths, are removed from the tree, one or more subtrees remain, such as the subtree with the node 5 as the root and the subtree with the node 12 as the root.

The sender of secret information sends a set of ciphertexts generated by encrypting the secret information using the node keys assigned to the nodes closest to the roots of the respective subtrees, i.e., the nodes 5, 7, 9, 12, and 16 in the example shown in FIG. 5. For example, when secret information to send is a content key Kc used for decrypting encrypted content and the node keys assigned to the nodes 5, 7, 9, 12, and 16 are denoted by $NK_5$, $NK_7$, $NK_9$, $NK_{12}$, and $NK_{16}$, the sender of the secret information generates a ciphertext set including five ciphertexts $E(NK_5, Kc)$, $E(NK_7, Kc)$, $E(NK_9, Kc)$, $E(NK_{12}, Kc)$, $E(NK_{16}, Kc)$, and provides the ciphertext set through network distribution or as stored on a recording medium. $E(A, B)$ denotes a ciphertext generated by encrypting data B using a key A.

The ciphertext set does not allow decryption by the revoked receivers u2, u11, and u12, while allowing decryption by the other receivers. By generating and sending such a ciphertext, secret information can be transmitted efficiently and securely.

The node keys used for such encryption can be found, for example, in the same manner as in the complete subtree (CS) method, or by using a representational tree.

Figure 12:
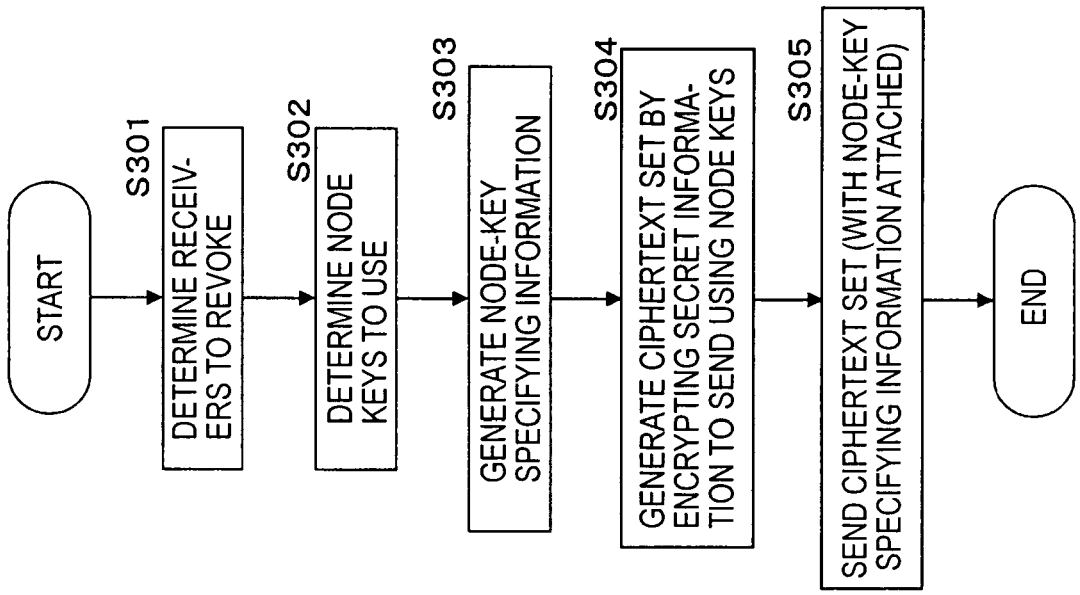
FIG. 12 is a flow diagram of an information distribution process.

The information distribution process will be described with reference to the flow shown in FIG. 12. In step S301, the trusted center (TC) selects receivers to be revoked in information distribution.

In step S302, the trusted center (TC) selects node keys used for generating ciphertexts, i.e., for encryption of secret information to send. In step S303, the trusted center (TC) generates node-key-to-use specifying information that serves as index data for the receivers that receive ciphertexts to select a decryptable ciphertext. The node-key-to-use specifying information is tag information or representational code representing which node key has been selected.

In step S304, the trusted center (TC) encrypts secret information to send using the node keys selected. In step S305, the trusted center (TC) sends the encrypted information together with the node-key-to-use specifying information via a broadcasting channel or as stored on an information recording medium. The steps described above need not necessarily be executed in the order described.

The node keys used for encryption may be node keys created and maintained by the trusted center (TC) in the setup phase. Alternatively, it is possible to create and maintain only the node associated values $NV_1$ of the respective leaves and salt values of the respective nodes in the setup phase and to derive the node keys from these values.

When no receiver is to be revoked, the node key $NK_1$ of the root node is used for encryption of secret information. In this case, all the receivers is allowed to decrypt information transmitted.

3-3. Information Distribution and Decryption Process

Next, the reception process and the decryption process for the ciphertexts described above will be described. The ciphertexts described above are provided to the receivers by broadcasting or as stored on information recording media. The ciphertexts can be received by all the receivers regardless of whether revoked or not. However, revoked receivers do not receive node keys for decrypting the ciphertexts so that the revoked receivers are not allowed to decrypt information received.

Each receivers that is not revoked selects a ciphertext that it can decrypt from the ciphertext set received. The node keys used for encryption of the ciphertexts included in the ciphertext set received include the node associated value $NV_1$ that it directly holds and node keys that can be derived from salt values.

Each receiver that is not revoked can obtain secret information by deriving the node associated value $NV_k$ associated with the node key $NK_k$ used for encryption from the node associated value $NV_1$ and salt values, deriving the node key $NK_k$ from the node associated value $NV_k$, and decrypting the ciphertext using the node key derived. The ciphertext to be decrypted by the receiver can be found using the node-key specifying information described earlier.

In extracting the ciphertext, the receiver um extracts the node numbers k of the node keys used for encryption, and finds nodes having matching node numbers from the path nodes m [PathNodes-m] associated with the receiver um.

The receiver um has the node associated value $NV_1$ of the leaf node 1 to which it is assigned. Thus, the receiver um calculates the node associated value of the parent node of the node 1, expressed by:

$$NV_{\lfloor 1/2 \rfloor}$$

from the node attached variable $salt_1$ that it also holds, according to the following equation:

$$NV_{\lfloor 1/2 \rfloor} = (NV_1^2 + H(l \| salt_1)) \bmod M$$

The receiver um repeats this operation to derive the node associated values $NV_k$ of the nodes k on the path from the node 1 to the root. Then, the receiver um derives the node keys $NK_k$ of the nodes k from the node associated values $NV_k$ of the nodes k by $NK_k = Hc(NV_k)$. The receiver um decrypts the ciphertext using the node keys derived.

Figure 13:
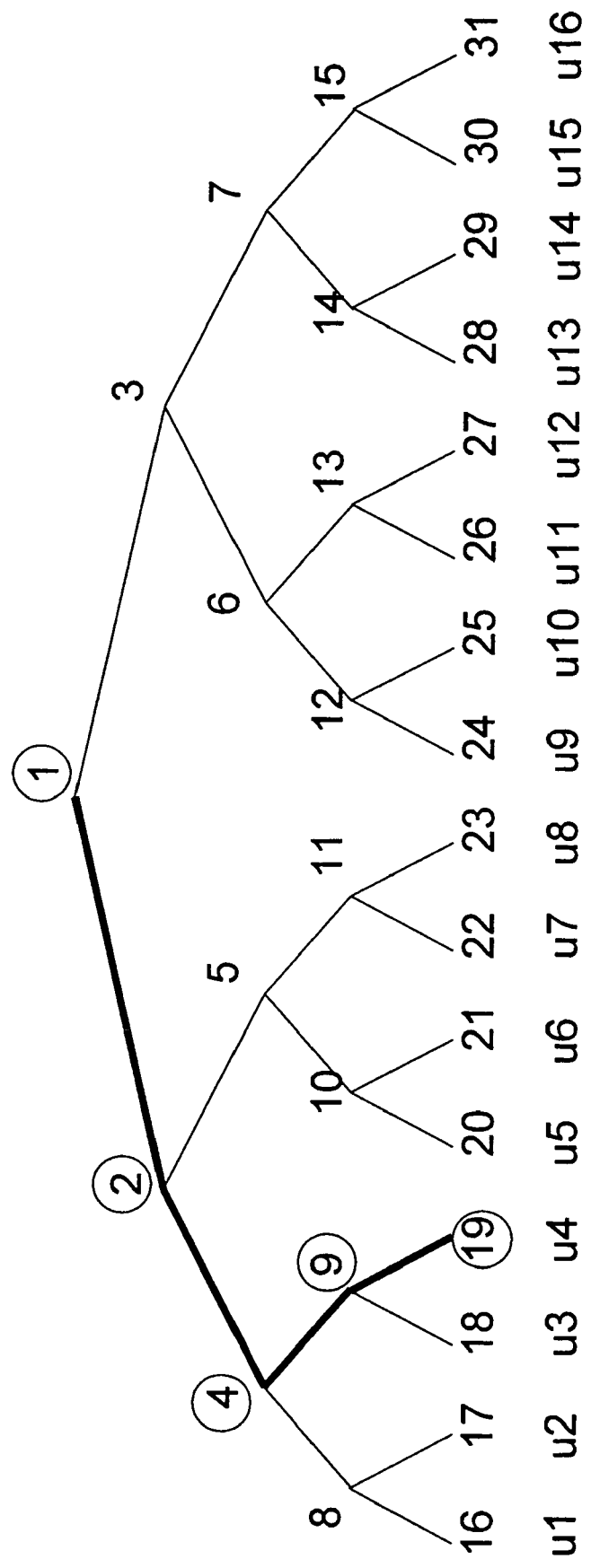
FIG. 13 is a diagram for explaining data that is given to a receiver in the CS method employing a Rabin tree.

Now, a specific example will be described with reference to FIG. 13. Assuming that the receiver u4 (with a node number 19) is not revoked, processing executed by the receiver u4 will be described. When the receiver u4 (with a node number 19) is not revoked, the node keys used for encryption include a node key associated with a node number matching one of the node numbers included in the path nodes 4 [PathNodes-4]={1, 2, 4, 9, 19} associated with the receiver u4.

That is, a ciphertext set including one of $E(NK_1, Kc)$, $E(NK_2, Kc)$, $E(NK_4, Kc)$, $E(NK_9, Kc)$, and $E(NK_{19}, Kc)$ is provided by network distribution or as stored on a recording medium, where [Kc] denotes secret information. $E(A, B)$ denotes data generated by encrypting data B using a key A. The receiver u4 detects from the ciphertext set received a ciphertext associated with a node number matching one of the node numbers included in the path nodes 4 [PathNodes-4]={1, 2, 4, 9, 19}.

After determining which of the node keys $NK_1$, $NK_2$, $NK_4$, $NK_9$, and $NK_{19}$ has been used for encrypting the ciphertext, in order to calculate the node key determined, the receiver u4 calculates the node associated value of the upper nodes using the node associated value $NV_4$ that it holds and the node attached variables $salt_2$, $salt_4$, $salt_9$, and $salt_{19}$, and further calculates the node keys from the node associated values calculated. As described earlier, the node associated values of upper nodes are calculated from the node associated values of lower nodes according to the following equations:

$$NV_9 = ((NV_{19})^2 + H(19 \| salt_{19})) \bmod M$$

$$NV_4 = ((NV_9)^2 + H(9 \| salt_9)) \bmod M$$

$$NV_2 = ((NV_4)^2 + H(4 \| salt_4)) \bmod M$$

$$NV_1 = ((NV_2)^2 + H(2 \| salt_2)) \bmod M$$

Furthermore, the node keys are calculated from the node associated values of the respective nodes according to the following equations:

$$NK_{19} = Hc(NV_{19})$$

$$NK_9 = Hc(NV_9)$$

$$NK_4 = Hc(NV_4)$$

$$NK_2 = Hc(NV_2)$$

$$NK_1 = Hc(NV_1)$$

The receiver u4 can obtain the secret information [Kc] by decrypting a ciphertext included in the ciphertext set using one of the node keys $NK_{19}$, $NK_9$, $NK_4$, $NK_2$, and $NK_1$ of the nodes included in the path nodes 4 [PathNodes-4]={1, 2, 4, 9, 19}.

Figure 14:
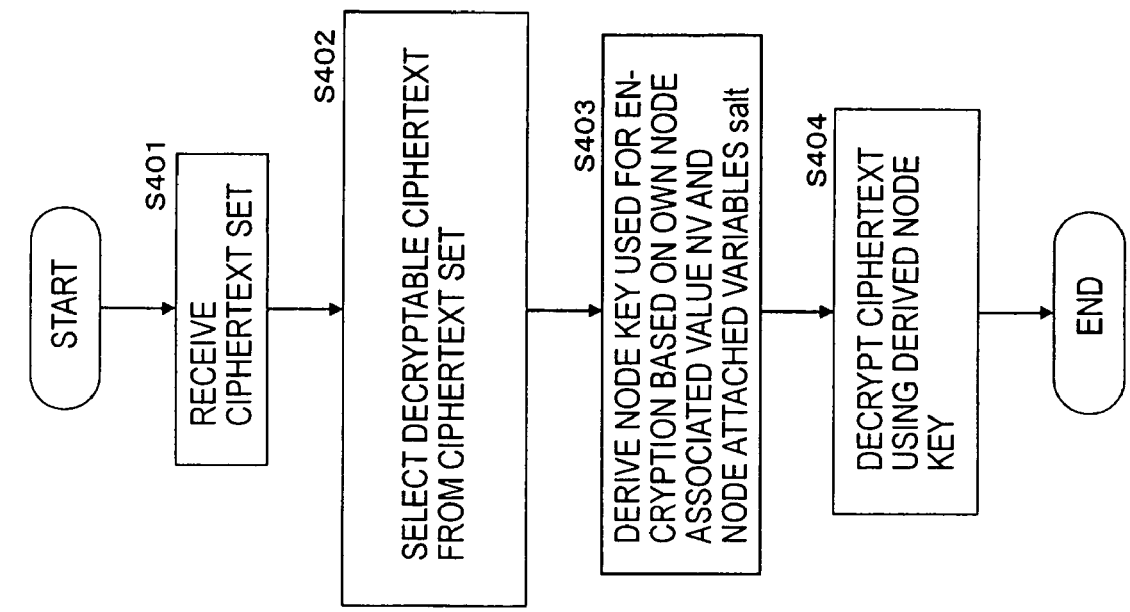
FIG. 14 is a flow diagram of a process of decrypting a ciphertext at a receiver.

The processing executed by a receiver um will be described with reference to the flow shown in FIG. 14. In step S401, the receiver um receives a ciphertext set. The ciphertext set is received via a network or an information recording medium.

In step S402, the receiver um extracts from the ciphertext set received a ciphertext that has been encrypted using a node key that can be calculated based on a node associated value that can be derived from a node associated value NV and node attached variables salt that it directly holds, among the node keys used for encryption of the ciphertexts included in the ciphertext set. This corresponds to the receiver um detecting a node number matching one of the node numbers included in the path nodes m [PathNodes-m] associated with the receiver um. Failure to determine a ciphertext that is to be decrypted by a receiver indicates that the receiver is revoked.

In step S403, the receiver um calculates the node key used for encryption using the node associated value NV and node attached variables salt that it holds. More specifically, the node associated values of upper nodes are calculated according to equation (1) given earlier, and the node keys $NK_k$ are calculated based on the node associated values according to $NK_k = Hc(NV_k)$.

After calculating the node key used for encryption, in step S404, the receiver um decrypts the ciphertext using the node key calculated to obtain secret information.

The secret information is, for example, a content key for decrypting encrypted content of a television broadcasting system. In this case, the receiver receives the encrypted content, decrypts the encrypted content using the content key, and outputs the decrypted content. The processing described above need not necessarily be executed in the order described.

Figure 15:
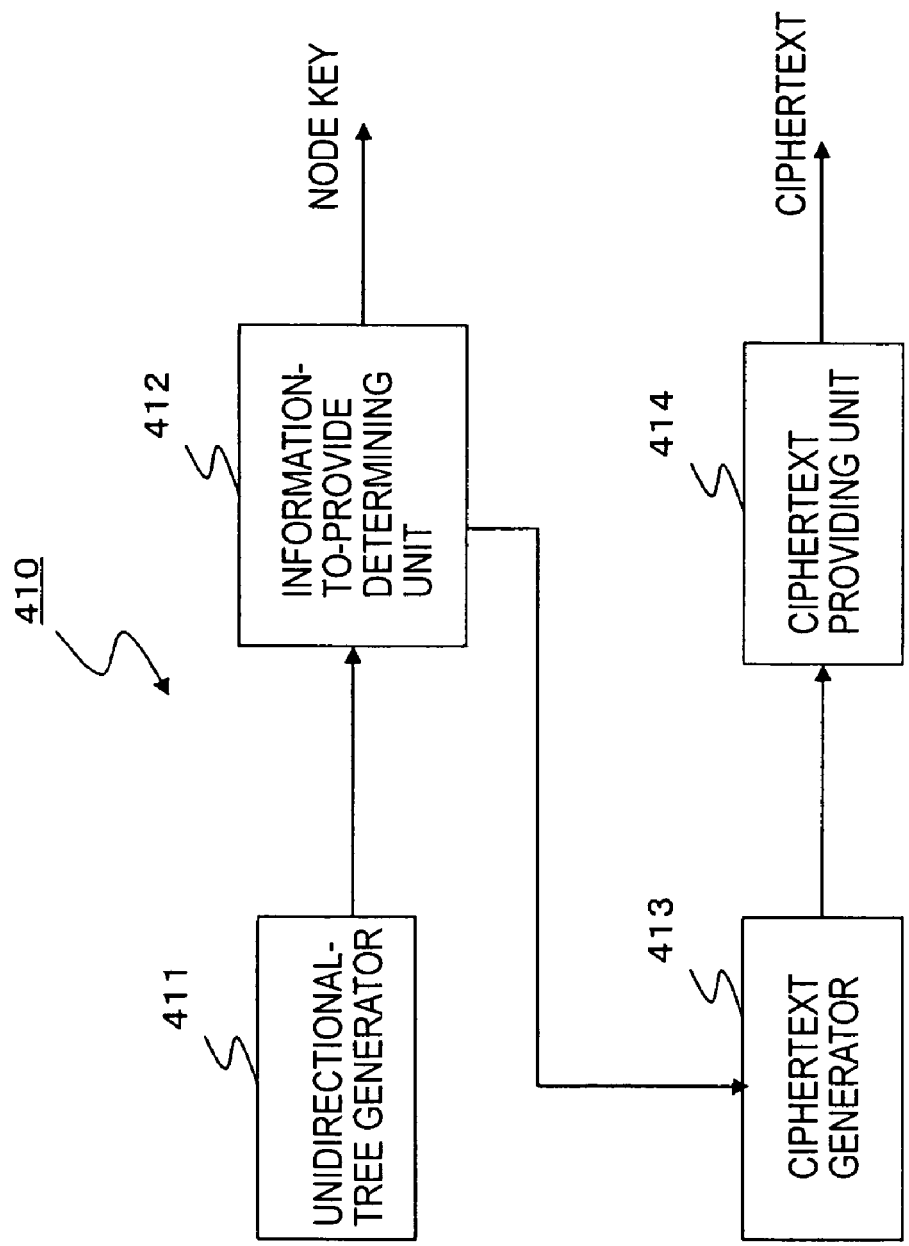
FIG. 15 is a diagram showing the configuration of an information processing apparatus that determines node keys and generates ciphertexts in the CS method.
Figure 16:
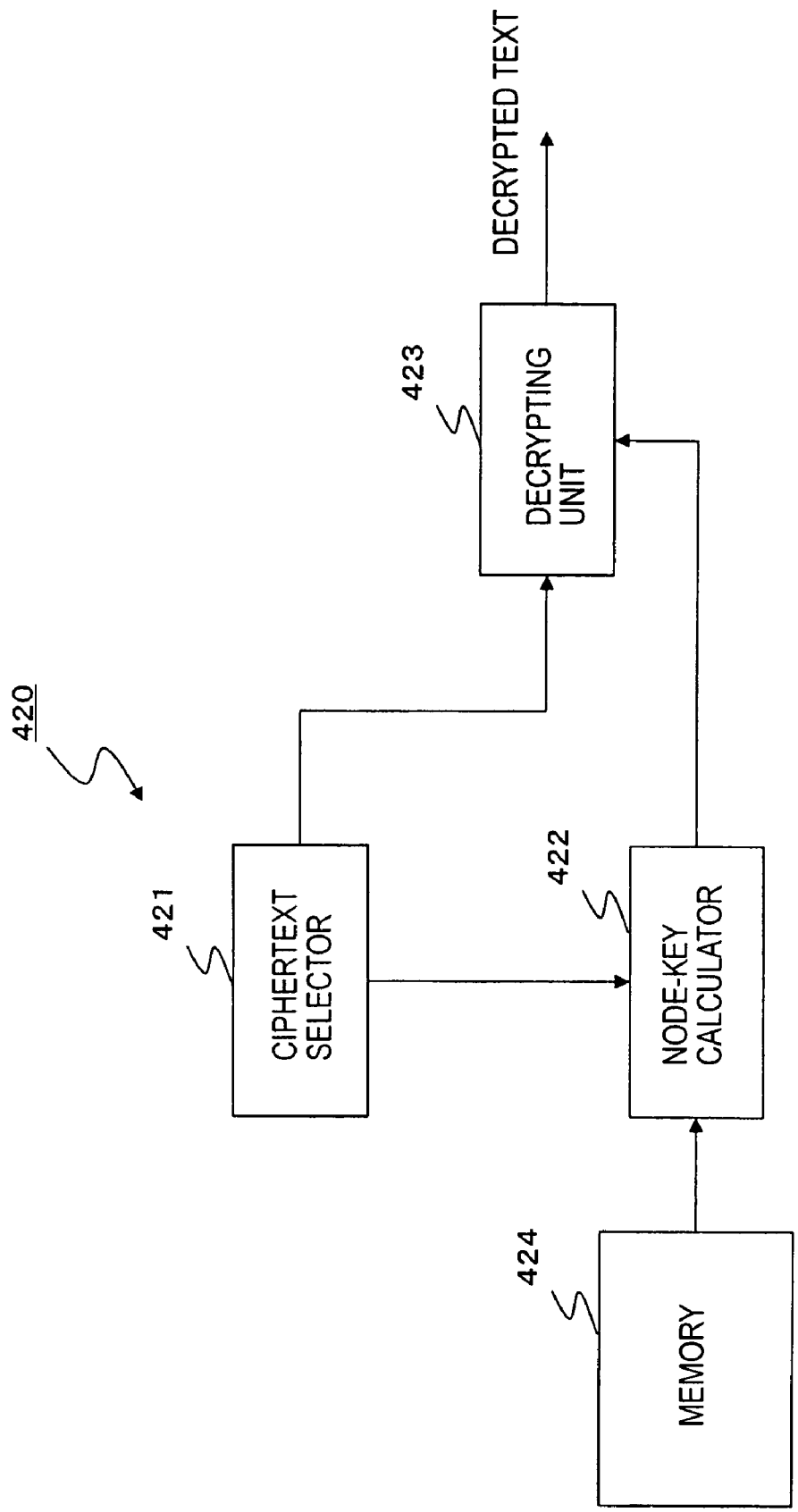
FIG. 16 is a diagram showing the functional configuration of an information processing apparatus that acts as a receiver that decrypts a ciphertext in the CS method.

Next, the functional configuration of an information processing apparatus that provides ciphertexts, and the functional configuration of an information processing apparatus that receives and decrypts ciphertexts, will be described with reference to FIGS. 15 and 16. The information processing apparatus that provides ciphertexts executes a process for determining node keys for generating ciphertexts and a process for generating ciphertexts. The receiver that decrypts ciphertexts executes a process for generating node keys and a process for decrypting ciphertexts using the node keys.

First, the configuration of the information processing apparatus that provides ciphertexts will be described with reference to FIG. 15. An information processing apparatus 410 includes a unidirectional-tree (Rabin-tree) generator 411, a node-key generator 412, an information-to-provide (node associated values NV and node attached variables salt) determining unit 413, a ciphertext generator 414, and a ciphertext providing unit 415.

The information processing apparatus 410 employs broadcast encryption based on a hierarchical tree to provide ciphertexts that can be decrypted by specific selected devices not including revoked devices. The unidirectional-tree generator 411 generates a Rabin tree, in which the node associated value NV of each node of the hierarchical tree can be calculated according to equation (1) using the node associated value NV and node attached variable salt of at least one lower node.

The node-key generator 412 calculates the node key NK of each node by NK=Hc(NV) based on the node associated value NV.

The information-to-provide determining unit 413 provides each receiver associated with a terminal node of the hierarchical tree with the node associated value $NV_1$ of the node associated with the receiver and node attached variables salt of the nodes included in the path from the node associated with the receiver to the uppermost root as the root node.

The ciphertext generator 414 generates ciphertexts through encryption by selectively using the node keys NK generated by the node key generator 412 based on the node associated values NV associated with the respective nodes of the Rabin tree generated by the unidirectional-tree (Rabin tree) generator 411. The ciphertext providing unit 415 provides the ciphertexts generated in the manner described above, via a network or as stored on recording media.

Next, the functional configuration of the information processing apparatus as a receiver that executes a process for decrypting ciphertexts will be described with reference to FIG. 16.

An information processing apparatus 420 as a receiver that executes a process for decrypting ciphertexts includes a ciphertext selector 421, a node-key calculator 422, a decrypting unit 423, and a memory 424.

The ciphertext selector 421 selects from a ciphertext set to be processed a ciphertext generated using an upper node key that can be calculated from the node associated value $NV_1$ and node attached variables salt held in its memory 424. More specifically, as described earlier, the ciphertext selector 421 calculates the node associated value of the upper node according to equation (1) given earlier using the node associated value NV and the node attached variables salt that it holds, and calculates the node key $NK_k$ used for encryption based on the node associated value according to $NK_k$=Hc $(NV_k)$.

The decrypting unit 423 decrypts the ciphertext based on the node key calculated by the node-key calculator 422.

4. Examination on the Reduction of the Amount of Computation in the Scheme of Ciphertext Distribution by the CS Method Employing Rabin Tree Compared with the reduction of the number of keys by the CS method based on the RSA cryptosystem described earlier, the scheme of ciphertext distribution by the CS method according to this embodiment has an advantage that the amount of computation executed by receivers is small.

In the reduction of the number of keys in the CS method based on the RSA cryptosystem, from the node key $NK_1$ of a given node, a receiver derives the node key of the parent node thereof, expressed by:

$NK_{[1/2]}$ according to:

$$NK_{[1/2]}=(NK_1^e \oplus H(l)) \bmod M$$

Since the XOR operation and the hash function H are much less computationally intensive than the modulo exponentiation operation, the modulo exponentiation operation $NK_1^e \bmod M$ is dominant in the equation above.

In the system based on the RSA cryptosystem, in order to reduce the amount of computation, it is desired that the public exponent and the Hamming weight of e are minimized. However, for example, e=3 is too small to ensure security, so that e=$2^{16}$+1 is generally recommended.

When the value $2^{16}$+1 is used as the public exponent e, a given value x to the power of e can be calculated by several methods. When the "square-and-multiply" algorithm (refer to A. J. Menezes, P. C. van Oorschot and S. A. Vanstone, "Handbook of Applied Cryptography", CRC Press, 1996, p. 614) is used, 16 squaring operations and one multiplying operation are needed. Since squaring is a special case of multiplication and the amount of computation can be reduced compared with multiplication, the amount of computation is larger than that for 17 squaring operations. Furthermore, even when a value of 3 is used as the public exponent e in the method based on the RSA cryptosystem, the calculation of $NK_1^e \bmod M$ requires one multiplying operation and one squaring operation. Thus, the amount of computation in this embodiment is reduced to less than one half.

On the other hand, in the scheme of ciphertext distribution by the CS method employing a Rabin tree according to this embodiment, the receiver performs calculation according to equation (1) given earlier based on the node associated value $NV_1$ and node attached variables salt that it holds, i.e.,:

$$NV_{[1/2]}=(NV_1^2+H(l\|salt_1)) \bmod M$$

Also in this case, the modulo exponentiation operation is dominant. However, the modulo exponentiation operation in the above equation is $NV_1^2 \bmod M$, so that only one squaring operation suffices. Thus, according to this embodiment, the amount of computation can be reduced to approximately 1/17 compared with the method based on the RSA cryptosystem.

As described above, in the CS method that has been used, each receiver has to securely hold logN+1 node keys. In the scheme of ciphertext distribution by the CS method employing a Rabin tree according to this embodiment, the number of keys that each receiver has to hold securely is reduced to 1 (i.e., the node associated value NV of a leaf node). As opposed to the node keys in the CS method, according to this embodiment, node attached variables salt need not be held securely. Furthermore, compared with the CS method, in which the node keys are used as encryption keys so that the individual keys have lengths of several ten to several hundred bits, the node attached variables salt are as small as two bits on average.

Furthermore, compared with the method based on the RSA cryptosystem where the number of keys that each receiver has to hold securely is reduced to one similarly to this embodiment, according to this embodiment, the modulo exponentiation operation, which tends to cause a large load regarding the amount of computation executed by the receiver, can be executed by one squaring operation, so that the amount of computation can be considerably reduced to approximately 1/17.

As described above, according to this embodiment, the amount of information that has to be held securely by each receiver is reduced, so that the amount of computation needed for calculating node keys by each receiver can be reduced. This serves to achieve efficient ciphertext distribution and decryption.

5. Subset Difference (SD) Method

The processing described above is an example where a Rabin tree is used in the complete subtree (CS) method. Next, an example of processing where a Rabin tree is used in the subset difference (SD) method, which is different from the complete subtree (CS) method, will be described.

As described earlier, in the complete subtree (CS) method, "a set of receivers associated to the leaves of a subtree with a node as the vertex thereof" is represented using each node of the hierarchical tree. In contrast, in the subset difference (SD) method, "a set obtained by subtracting a set of leaves of a subtree with a node j as the vertex thereof from a set of leaves of a subtree with a node i as the vertex thereof" is representing using two nodes i and j of the hierarchical tree (where the node i is an ancestor of the node j).

In the following description, the following symbols are used:

P(i): The parent node of the node i and the node number thereof

Figure 17:
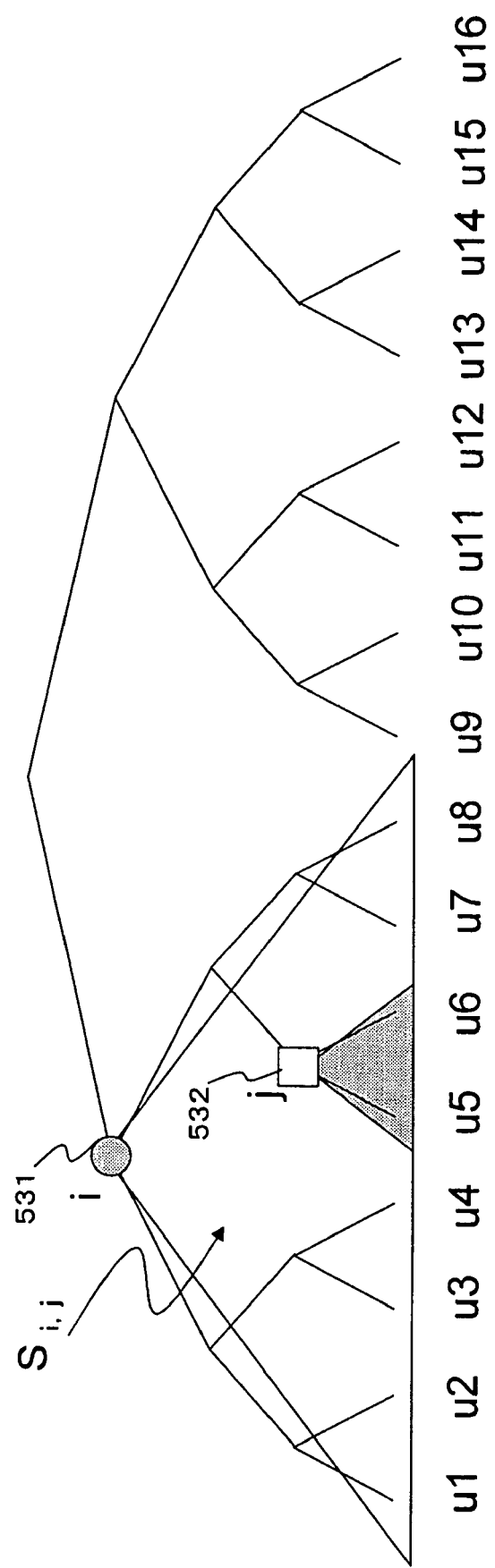
FIG. 17 is a diagram for explaining definition of subsets in the subset difference (SD) method.

S(i): The sibling node of the node i (i.e., the node different from the node i but having the same parent as the node i) and the node number thereof LC(i): The left child node of the node i and the node number thereof RC(i): The right child node of the node i and the node number thereof For example, a set $S_{i,j}$ defined by a node i 531 and a node j 532 in FIG. 17 is a set obtained by subtracting u5 and u6 from a set of receivers u1 to u8, i.e., $S_{i,j}=\{u1, u2, u3, u4, u7, u8\}$. Similar sets are defined for the respective node sets where a node i is an ancestor of a node k (i.e., the node j is different from the node i and the node i exists on the path from the node j to the root).

A subset key $SK_{i,j}$ is set as a key associated with the subset $S_{i,j}$. A subset key $SK_{i,j}$ is defined as a key that is commonly possessed by the subset $S_{i,j}=\{u1, u2, u3, u4, u7, u8\}$ obtained by subtracting u5 and u6 from the set of u1 to u8. By sending secret information encrypted using the subset key $SK_{i,j}$, decryption is allowed only for the subset $S_{i,j}=\{u1, u2, u3, u4, u7, u8\}$, and u5 and u6 are revoked.

Under this setting, the number of sets to which a receiver belongs is O(N) according to the following equation:

$$\sum_{k=1}^{\log N} (2^k - k) = O(N)$$

Thus, if subset keys are assigned independently to the individual subsets, each receiver has to securely hold O(N) subset keys. However, O(N) dramatically increases as the number of receivers N increases. Thus, it is practically infeasible for each device to securely hold such a large amount of information.

Thus, in the subset difference (SD) method, the following scheme is employed. Similarly to the case of the complete subtree (CS) method described earlier, it is assumed that the trusted center (TC) is in charge of defining a hierarchical tree, subsets, keys, and distributing keys.

Figure 18A:
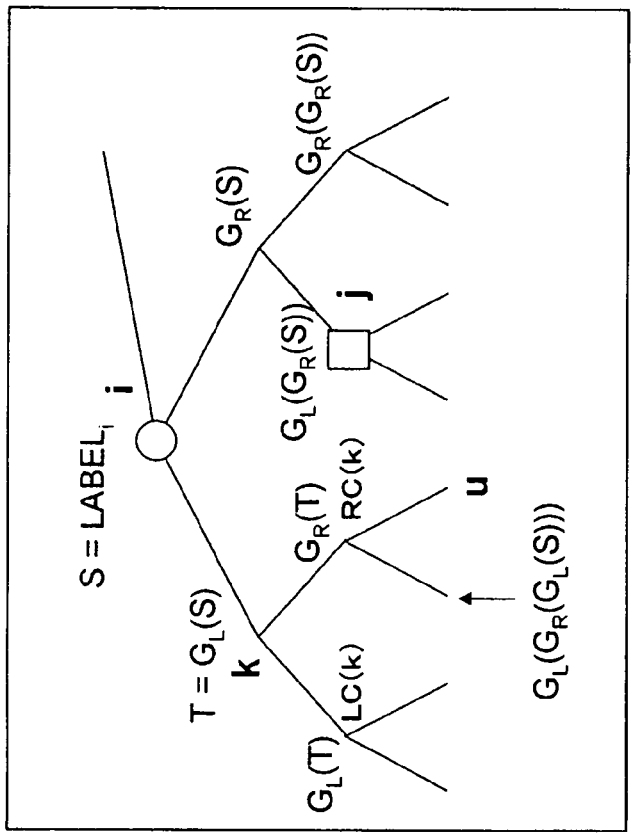
FIGS. 18A and 18B are diagrams for explaining setting and configuration of labels in the SD method.

First, as shown in FIG. 18A, the trusted center (TC) selects an intermediate node (i.e., a non-leaf node) i, and randomly selects a value S of C bits with the label of the node i as LABELi.

Figure 18B:
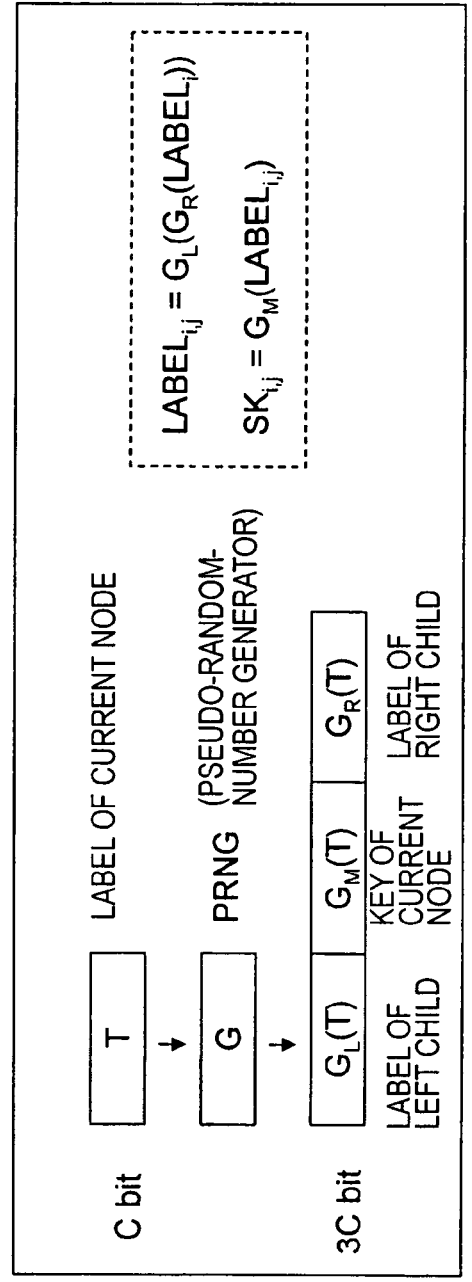

Next, as shown in FIG. 18, LABELi=S is input to a pseudo-random-number generator G of C-bit input and 3C-bit output. The output is segmented by C bits from the left (from the most significant bit), and the resulting segments are denoted by $G_L(S)$, $G_M(S)$, and $G_R(S)$. $G_L(S)$ and $G_R(S)$ are used as the labels of the left child node and the right child node of the node i shown in FIG. 18A.

By the processing described above, regarding the left child node k of the node i shown in FIG. 18A, the label $LABEL_{i,k}$ of the node k with respect to the node i is $LABEL_{i,k}= G_L(S)$, which will be denoted by T. Then, $LABEL_{i,k}=G_L(S)=T$ is input to the pseudo-random-number generator G shown in FIG. 18B, and the output thereof is segmented by C bits from the left, and the resulting segments $G_L(T)$, $G_M(T)$, and $G_R(T)$ are defined as follows:

$G_L(T)$: Label $LABEL_{i,LC(k)}$ of the left child node LC(k) of the node k with respect to the node i $G_M(T)$: Key of the node k with respect to the node i (the subset key $SK_{i,k}$ associated with the set $S_{i,k}$)

$G_R(T)$: Label $LABEL_{i,RC(k)}$ of the right child node RC(k) of the node k with respect to the node i By repeating this process, labels associated with all the descendant nodes of the node i are crated. According to the above definition, the set $S_{i,i}$ is an empty set, and when the node is the starting node, a key of the node is not needed. Thus, $G_M(S)$, which is the middle part of the output generated by the pseudo-random-number generator G with input of $LABEL_i$ is not used.

In the example shown in FIG. 18A, the label S of the starting node i is defined, $G_R(S)$ represents the label of the right child node of the starting node i, and $G_L(G_R(S))$ obtained by inputting $G_R(S)$ to the pseudo-random generator G represents the label $LABEL_{i,j}$ of the node j with the node i as the starting node. For each intermediate node i, labels associated with all the descendant nodes of the node i are created.

This process is executed by the trusted center (TC) at the time of setup of the system. The pseudo-random-number generator (or pseudo-random-number generating function) G is defined and made public by the trusted center (TC). Using the pseudo-random-number generator (or pseudo-random-number generating function) G, with the node i as the starting node, a receiver to which $LABEL_{i,j}$ is given can calculate the labels LABELi,n of all the descendant nodes n of the node j and the subset key $SK_{i,n}$ of the node j and its descendant nodes n.

Figure 19B:
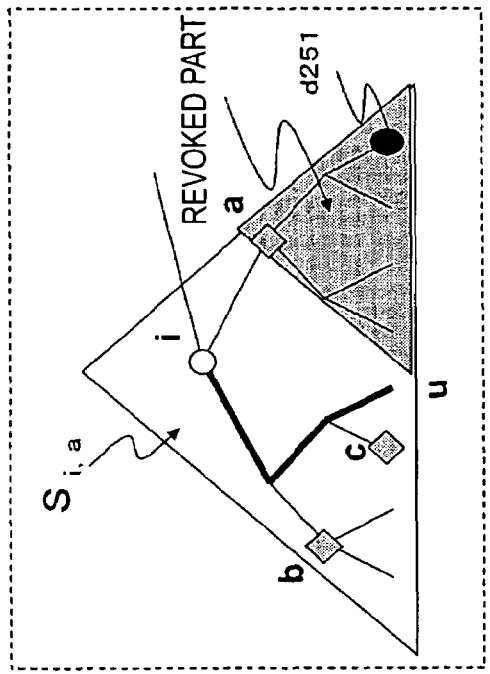
FIGS. 19A to 19D are diagrams for explaining setting of subsets in the SD method.
Figure 19D:
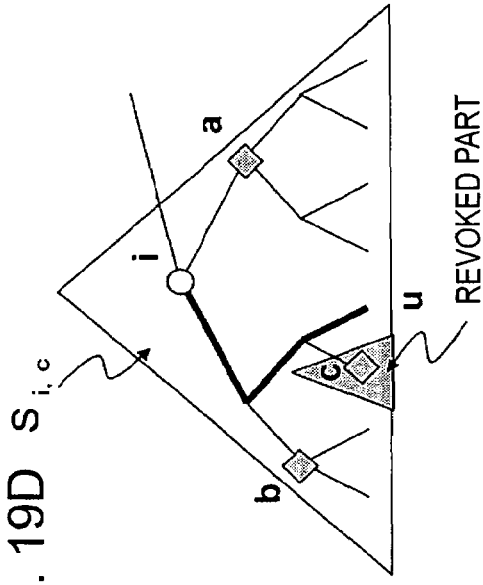
Figure 19A:
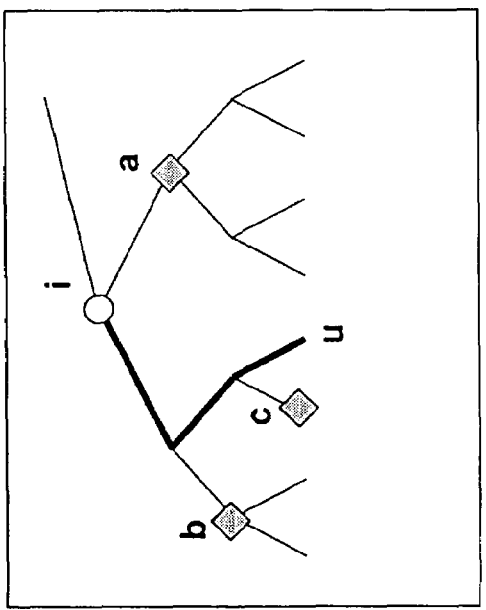

With this setting, as shown in FIG. 19A, a receiver u, with regard to each intermediate node on the path from the leaf to which the receiver is assigned to the root of the tree, suffices to hold labels of the nodes a, b, and c that directly branches from the path from the leaf to the starting node i.

A subset key for these nodes a, b, and c and descendant nodes thereof with the node i as the starting node can be generated. In FIG. 19A, with regard to the node i, three nodes a, b, and c directly branches from the path from u to i, so that the receiver u holds the three labels received from the trusted center (TC) at the time of setup of the system.

Through processing by the pseudo-random-number generator G based on the label $LABEL_{i,a}$ of the node a, the leaf u can calculate a subset key $SK_{i,a}$ associated with the subset $S_{i,a}$, i.e., $G_M(LABEL_{i,a})=SK_{i,a}$.

As shown in FIG. 19B, the subset $S_{i,a}$ is a subset in which leaves of a subtree with the node a as the root are selected as revoked devices. That is, in the subset $S_{i,a}$, of the leaves of the subtree with the node i as the vertex thereof, information is distributed to leaves other than the leaves of the subtree with the node a as the vertex thereof.

Furthermore, through processing by the pseudo-random-number generator G, the leaf u can calculate the subset key $SK_{i,b}$ associated with the subset $S_{i,b}$, i.e., $G_M(LABEL_{i,b})=SK_{i,b}$.

Figure 19C:
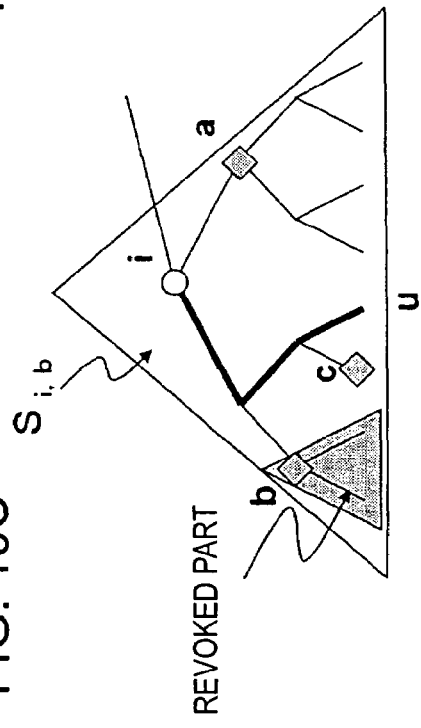

As shown in FIG. 19C, the subset $S_{i,b}$ is a subset in which leaves of a subtree with the node b as the root are selected as revoked devices. That is, in the subset $S_{i,b}$, of the leaves of the subtree with the node i as the vertex thereof, information is distributed to leaves other than the leaves of the subtree with the node b as the vertex thereof.

Furthermore, through processing by the pseudo-random-number generator G, the leaf u can calculate the subset key $SK_{i,c}$ associated with the subset $S_{i,c}$, i.e., $G_M(LABEL_{i,c})=SK_{i,c}$.

As shown in FIG. 19D, the subset $S_{i,c}$ is a subset in which leaves of a subtree with the node c as the root are selected as revoked devices. That is, in the subset $S_{i,c}$, of the leaves of the subtree with the node i as the vertex thereof, information is distributed to leaves other than the leaf c.

In a hierarchical tree with the node i as the starting node, it is possible to revoke leaves other than the leaf u by various other setting other than the three examples give above. For example, when only the leaf d 251 in FIG. 19B is to be revoked, a subset $S_{i,d}$ is set to apply a subset key $SK_{i,d}$. However, keys associated with nodes or leaves, i.e., subset keys, can be generated by pseudo-random-number generation based on upper labels. Thus, the leaf u can generate the subset key $SK_{i,d}$ for revoking the leaf d 251 based on the label $LABEL_{i,a}$ of the node a that the leaf u possesses.

Similarly for the other subset configurations, as shown in FIG. 19A, a receiver u, with regard to each intermediate node on the path from the leaf to which the receiver is assigned to the root of the tree, suffices to hold labels of the nodes a, b, and c that directly branches from the path from the leaf to the starting node i.

Figure 20:
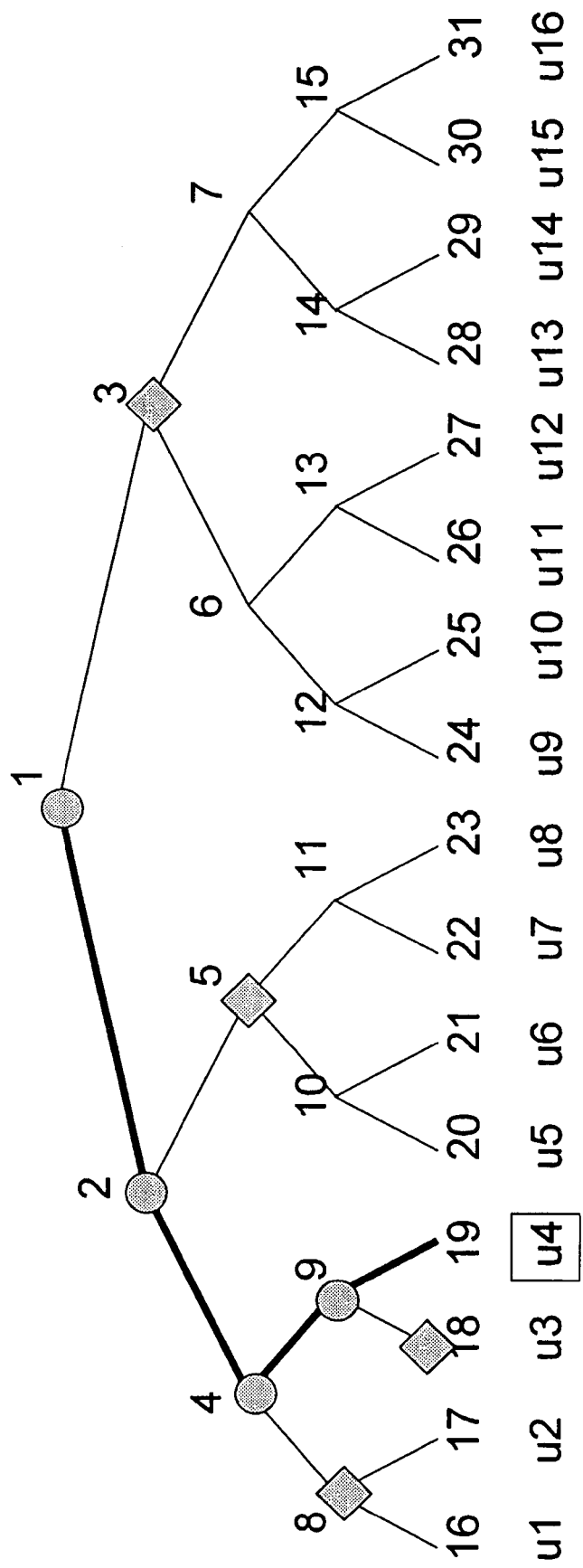
FIG. 20 is a diagram showing labels that each receiver is to hold when the total number of receivers N=16 in the SD method.

FIG. 20 shows labels to be held by the receivers when the number of receivers N=16. With regard to the receiver u4, the intermediate nodes 1, 2, 4, and 9 on the path to the root node 1 from the leaf node 19 to which the receiver u4 is assigned serve as starting nodes i. When the node 1 is the starting node, four nodes, namely, nodes 3, 5, 8, and 18 directly branch from the path from the node 19 to the node 1, so that the receiver u4 holds the following four labels:

$LABEL_{1,3}$
$LABEL_{1,5}$
$LABEL_{1,8}$
$LABEL_{1,18}$

Similarly, when the node 2 is the starting node, the receiver u4 holds the following three labels:

$LABEL_{2,5}$
$LABEL_{2,8}$
$LABEL_{2,18}$

When the node 4 is the starting node, the receiver u4 holds the following two labels:

$LABEL_{4,8}$
$LABEL_{4,18}$

When the node 9 is the starting node, the receiver u4 holds the following one label:

$LABEL_{9,18}$

Furthermore, the receiver u4 holds the following one label associated with a set including all the receivers (referred to as a subset $S_{1,\phi}$) that is used when no receiver is to be revoked:

$LABEL_{1,\phi}$

That is, in the example shown in FIG. 20, the receiver u4 holds the following 11 labels in total:

For i=1, four labels with j=3, 5, 8, 18
For i=2, three labels with j=5, 8, 18
For i=4, two labels with j=8, 18
For i=9, one label with j=18
One label for the case where no receiver is to be revoked Although the label associated with the subset $S_{1,\phi}$ is used for coherency of description, the receiver u4 may directly hold a subset key associated with the subset $S_{1,\phi}$.

As described above, each receiver, for each intermediate node on the path from the associated leaf to the root, has to hold labels corresponding to the height of the intermediate node and one special label. Thus, when the number of receivers is N, the number of labels that each receiver holds can be calculated by the following equation:

$$1 + \sum_{k=1}^{\log N} k = \frac{1}{2}\log^2 N + \frac{1}{2}\log N + 1$$

Each receiver holds the number of labels according to the above equation, and can generate subset keys needed by using the pseudo-random-number generator G that is made public. Each receiver has to securely hold the labels.

6. Scheme for Reducing the Number of Labels in the SD Method

Now, the scheme for reducing the number of labels in the Subset Difference (SD) method will be described. Examination of the Subset Difference (SD) method described above reveals the following.

A label $LABEL_{i,j}$ is either:

(A) Directly given to the receiver from the trusted center (TC)
(B) Derived by the receiver from other labels using the pseudo-random-number generator G When the node i and the node j are parent and child (with a distance of 1, i.e., residing on adjacent levels), the case (B) does not occur, and all cases belong to (A) directly given to the receiver from the trusted center (TC).

The reason is as follows. When a receiver generates $LABEL_{i,j}$ using the pseudo-random-number generator G, $LABEL_{i,k}$ associated with a node k that is an ancestor of the node j is needed. However, since the nodes i and j are parent and child, such a node k that is an ancestor of the node j and descendant of the node i does not exits, and $LABEL_j$ is assigned to no receiver.

Figure 21:
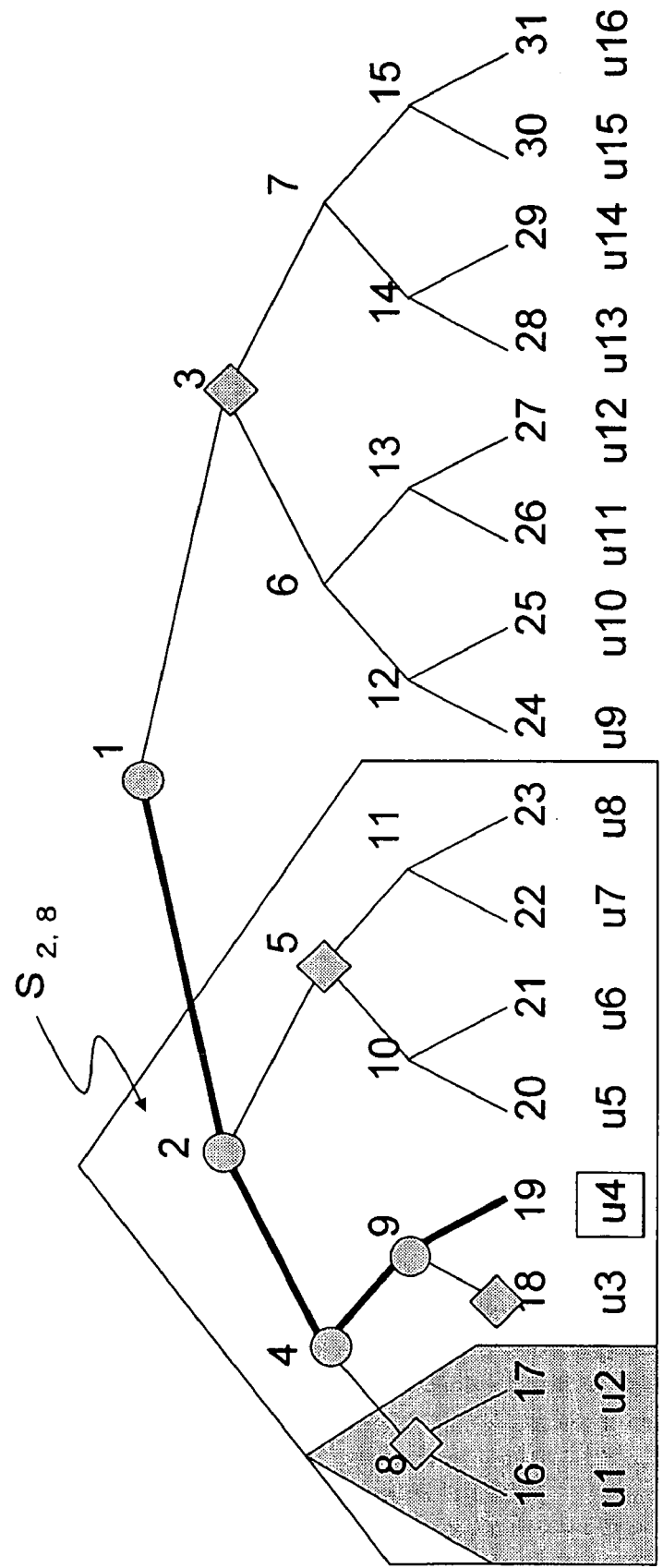
FIG. 21 is a diagram for explaining labels that each receiver is to hold in the SD method.

This will be described in the context of an example shown in FIG. 21. $LABEL_{2,8}$ is given to the receiver u4 directly from the trusted center (TC). However, $LABEL_{2,8}$ is not directly given to the receiver u5, and the receiver u5 derives $LABEL_{2,8}$ by calculating $G_L(LABEL_{2,4})$ using the pseudo-random-number generator G from $LABEL_{2,4}$ given from the trusted center (TC).

Figure 22:
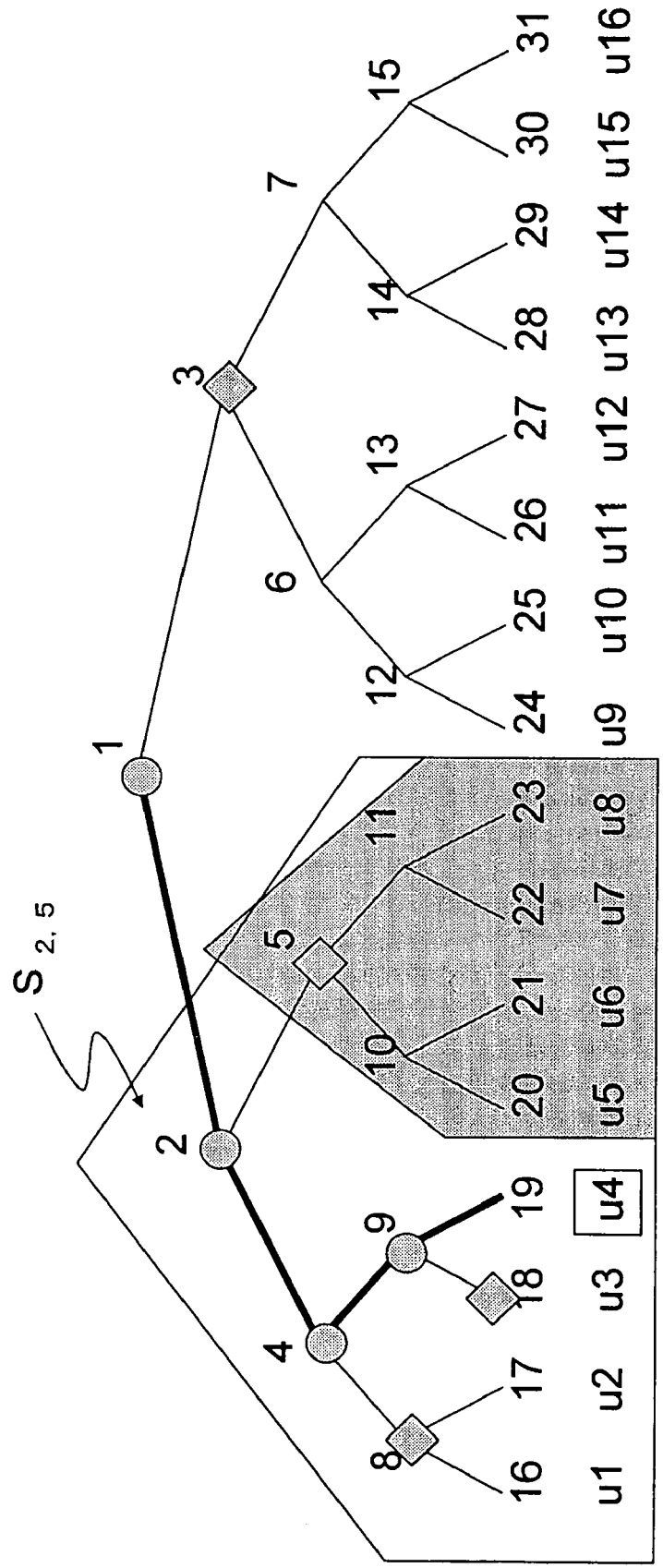
FIG. 22 is a diagram for explaining labels that each receiver is to hold in the SD method.

On the other hand, as shown in FIG. 22, $LABEL_{2,5}$ associated with the node 2 and the node 5 as parent and child are directly given to the receivers u1, u2, u3, and u4 belonging to the subset $S_{2,5}$. It is not possible for other receivers not belonging to the subset $S_{2,5}$ to calculate $LABEL_{2,5}$. That is, such labels are only given to receivers directly from the trusted center (TC), and it is not possible to derive such labels using the pseudo-random-number generator G.

Furthermore, in the SD method, when a node i is the parent node of two distinct nodes j and k and the node j is the parent node of another node n, a receiver belonging to the subset $S_{j,n}$ belongs to the subset $S_{i,k}$.

Figure 23:
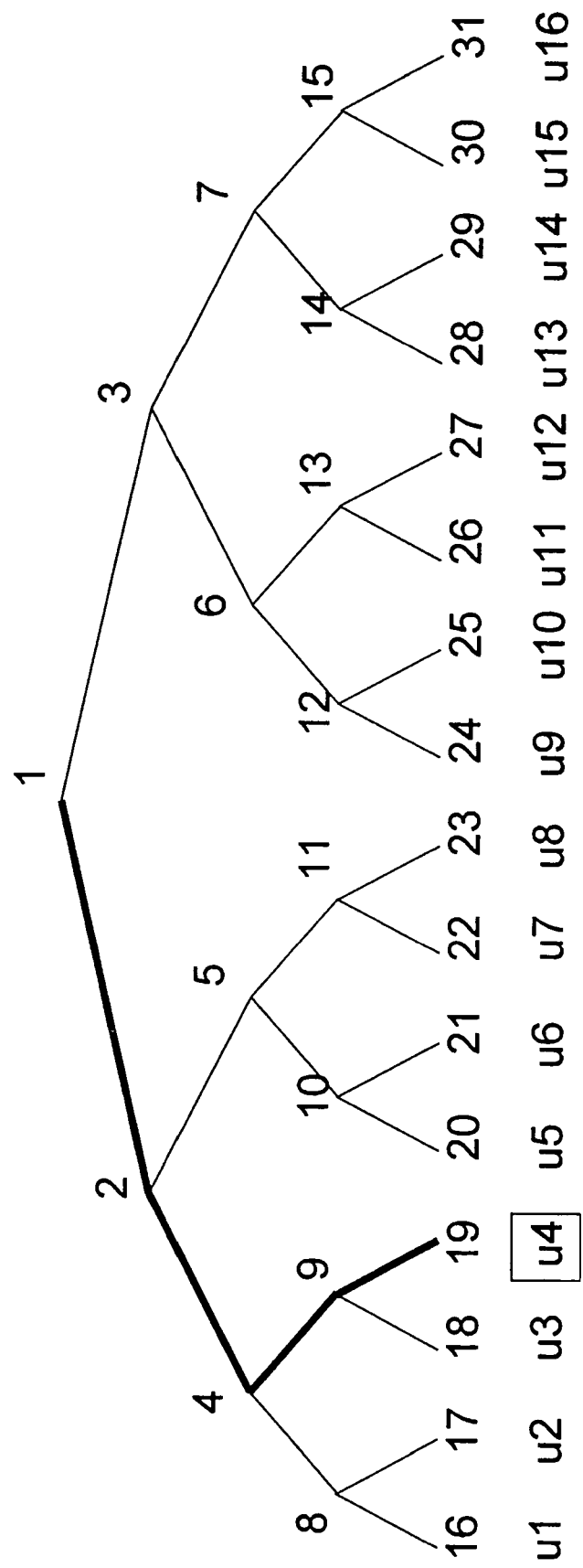
FIG. 23 is a diagram showing details of subsets to which a specific receiver u4 belongs in the SD method.

For example, as shown in FIG. 23, the receiver u4 belonging to the subset $S_{9,18}$ also belongs to the subset $S_{4,8}$, the subset $S_{2,5}$, and the subset $S_{1,3}$.

$S_{9,18}=\{u4\}$
$S_{4,8}=\{u3, u4\}$
$S_{2,5}=\{u1, u2, u3, u4\}$
$S_{1,3}=\{u1, u2, u3, u4, u5, u6, u7, u8\}$

Furthermore, the receiver u3, which is a receiver belonging to the subset $S_{4,8}$ other than the receiver u4, belongs to both the subset $S_{2,5}$ and the subset $S_{1,3}$.

In this embodiment, a Rabin tree is used for labels $LABEL_{i,j}$ with a node i and a node j as parent and child and $LABEL_{1,\phi}$ associated with the subset $S_{1,\phi}$ including all the receivers, which is used when no receiver is to be revoked, thereby reducing the number of labels.

In the subset difference (SD) method described earlier, each receiver holds log N labels in total, i.e., $LABEL_{i,j}$ with a node i and a node j as parent and child, one by one for the respective intermediate nodes on the path from the leaf to which the receiver is assigned to the root of the tree. In this embodiment, logN+1 labels in total, i.e., the above labels and $LABEL_{1,\phi}$ associated with the subset $S_{1,\phi}$ including all the receivers, which is used when no receiver is to be revoked, can be derived from a single value, so that the number of labels that are to be held by each receiver is reduced.

By using the Rabin tree, it is possible to construct a forward transformation y=F(x) and an inverse transformation $x=F^{-1}(y)$ so that y can be readily calculated (forward operation) and so that the inverse operation can be readily performed only by those with the knowledge of a certain secret (trapdoor) while the inverse operation by others is prohibited.

In the original SD method, as described with reference to FIG. 20, the receiver u4 has to securely hold the following 11 labels in total:

For i=1, four labels with j=3, 5, 8, 18
$LABEL_{1,3}$
$LABEL_{1,5}$
$LABEL_{1,8}$
$LABEL_{1,18}$
For i=2, three labels with j=5, 8, 18
$LABEL_{2,5}$
$LABEL_{2,8}$
$LABEL_{2,18}$
For i=4, two labels with j=8, 18
$LABEL_{4,8}$
$LABEL_{4,18}$
For i=9, one label with j=18
$LABEL_{9,18}$
For the case where no receiver is to be revoked
$LABEL_{1,\phi}$ According to this embodiment, the receiver has to hold labels with a node i and a node j as parent and child:
$LABEL_{1,3}$
$LABEL_{2,5}$
$LABEL_{4,8}$
$LABEL_{9,18}$
and a label for the case where no receiver is to be revoked:
$LABEL_{1,\phi}$ According to this embodiment, by using a Rabin tree, logN+1 labels in total, i.e., the above labels and $LABEL_{1,\phi}$ associated with the subset $S_{1,\phi}$ including all the receivers, which is used when no receiver is to be revoked, can be derived from a single value, so that the number of labels that are to be held by each receiver is reduced.

7. Scheme for Reducing the Number of Labels in the SD Method Employing Rabin Tree Now, the scheme for reducing the number of labels in the SD method employing a Rabin tree will be described in detail. The Rabin tree used in this case is the same Rabin tree used in the case of the CS method described earlier, i.e., a Rabin tree generated according to the algorithm described with reference to the flow shown in FIG. 8 in "2.1 Example method of constructing Rabin tree" in "2. Scheme of the CS Method Employing Rabin Tree".

That is, as described with reference to FIGS. 8 to 10, the Rabin tree is a binary tree having N leaves in which 2N−1 |M|-bit node associated values $NV_1$, $NV_2$, ... $NV_{2N-1}$ and 2N−2 node attached variables $salt_2$, $salt_3$, ..., $salt_{2N-1}$ are defined. It is readily possible to calculate the node associated value of the parent node from the node associated value $NV_1$ and node attached variable $salt_1$ of a given node; however, the inverse operation is prohibited. In FIG. 9, each linear arrow shown along the function f indicates that the node associated value of an upper node can be calculated by applying the function f with the node associated value $NV_1$ of a lower node as input. The function f is based on the forward operation (squaring mod M) F. The node associated value of the parent node of a given child node can be calculated from the node associated value $NV_1$ and the node attached variable $salt_1$ of the child node according to equation (1) given earlier, using the public function H and the modulus M.

In FIG. 9, each linear arrow shown along the function $f^{-1}$ indicates that the node associated value of a lower node can be calculated by applying the function $f^{-1}$ with the node associated value of an upper node as input. The function $f^{-1}$ is based on the inverse operation (½ exponentiation mod M) $F^{-1}$. In order to calculate the node associated value of the child node from the node associated value of the upper node, the knowledge of the secret information p and q (prime factors of M) is needed. This is possible only for the trusted center.

A unidirectional tree composed of nodes having node associated values $NV_1$ as described above is referred to as a Rabin tree. This is because the Rabin cryptosystem uses squaring mod M for encryption (forward operation) and root (half exponentiation) over mod M for decryption (inverse operation). The Rabin cryptosystem is described in detail, for example, in A. J. Menezes, P. C. van Oorschot and S. A. Vanstone, "Handbook of Applied Cryptography", CRC Press, 1996, pp. 292-294.

Now, the scheme for reducing the number of labels in the SD method employing a Rabin tree will be described in detail.

In this embodiment, a Rabin tree is used for labels $LABEL_{i,j}$ associated with subsets with a node i and a node j as parent and child (with a distance of 1, i.e., residing on adjacent levels) and $LABEL_{1,\phi}$ associated with the subset $S_{1,\phi}$ including all the receivers, which is used when no receiver is to be revoked, thereby reducing the number of labels.

Of all the subsets $S_{i,j}$ defined in the hierarchical tree, a subset defined by a node i and a node j as parent and child (with a distance of 1, i.e., residing on adjacent levels) will be denoted as a first special subset $SS_{i,j}$. Each node of the tree other than the root has a single parent node, so that each value of j=2, 3, ..., 2N−1 is used only once in j of $S_{i,j}$.

Furthermore, a subset $S_{1,\phi}$ defined as a set of nodes of the entire tree including all the leaves of the hierarchical tree will be denoted as a second special subset $SS_{1,\phi}$.

Furthermore, for the labels $LABEL_{i,j}=2, 3, \ldots, 2N-1$) associated with the first special subset $SS_{i,j}$, intermediate labels $IL_{i,j}$ are defined, and for the second special subset $SS_{1,\phi}$, intermediate labels $IL_{1,\phi}$ are defined.

Furthermore, these intermediate labels are associated with the node associated values $NV_j$ of the Rabin tree. That is, the intermediate labels $IL_{1,\phi}$ associated with the second special subset $SS_{1,\phi}$ are set so that $IL_{1,\phi}=NV_1$, and the intermediate labels $IL_{i,j}$ associated with the first special subset $SS_{i,j}$ (j=2, 3, ..., 2N-1) are defined as follows.

$NV_j$ (j=2, 3, ..., 2N-1) that are set as node associated values of the nodes 1 to 2N-1 are used as intermediate labels $IL_{P(j),S(j)}$ associated with the first special subset $SS_{i,j}$ defined by the sibling node and parent node of the node j, i.e., $IL_{P(j),S(j)}=NV_j$, where j=2, 3, ..., 2N-1. P(j) denotes the parent node of the node j, and S(j) denotes the sibling node of the node j.

To put the above process in a different way, the association between the node associated values NV and the intermediate labels IL of the Rabin tree is defined as follows:

$IL_{1,\phi}=NV_1$

For j=1, 2, ..., N-1, $IL_{j,2j}=NV_{2j+1}$ $IL_{j,2j+1}=NV_{2j}$

Furthermore, the relationship between the labels $LABEL_{i,j}$ and the intermediate labels $IL_{i,j}$ is defined as $LABEL_{i,j}=Hc(IL_{i,j})$.

The function Hc is a hash function that maps a value of the size |M| to a random value of a size C. For example, when C is 160 bits, SHA-1 can be used as a function that outputs a 160-bit value with an input of an arbitrary size. When C is 128 bits, MD5 can be used as a function that outputs a 128-bit value with an input of an arbitrary size. MD5 is also described in detail in A. J. Menezes, P. C. van Oorschot and S. A. Vanstone, "Handbook of Applied Cryptography", CRC Press, 1996.

The node keys are used for encryption of information to be sent to receivers, such as session keys. Thus, the size C is chosen to be the size of a key of an encryption algorithm used for this purpose. For example, when AES (Advanced Encryption Standard, FIPS 197), which uses a 128-bit key, is used as the encryption algorithm, C is chosen to be 128 bit.

Figure 24:
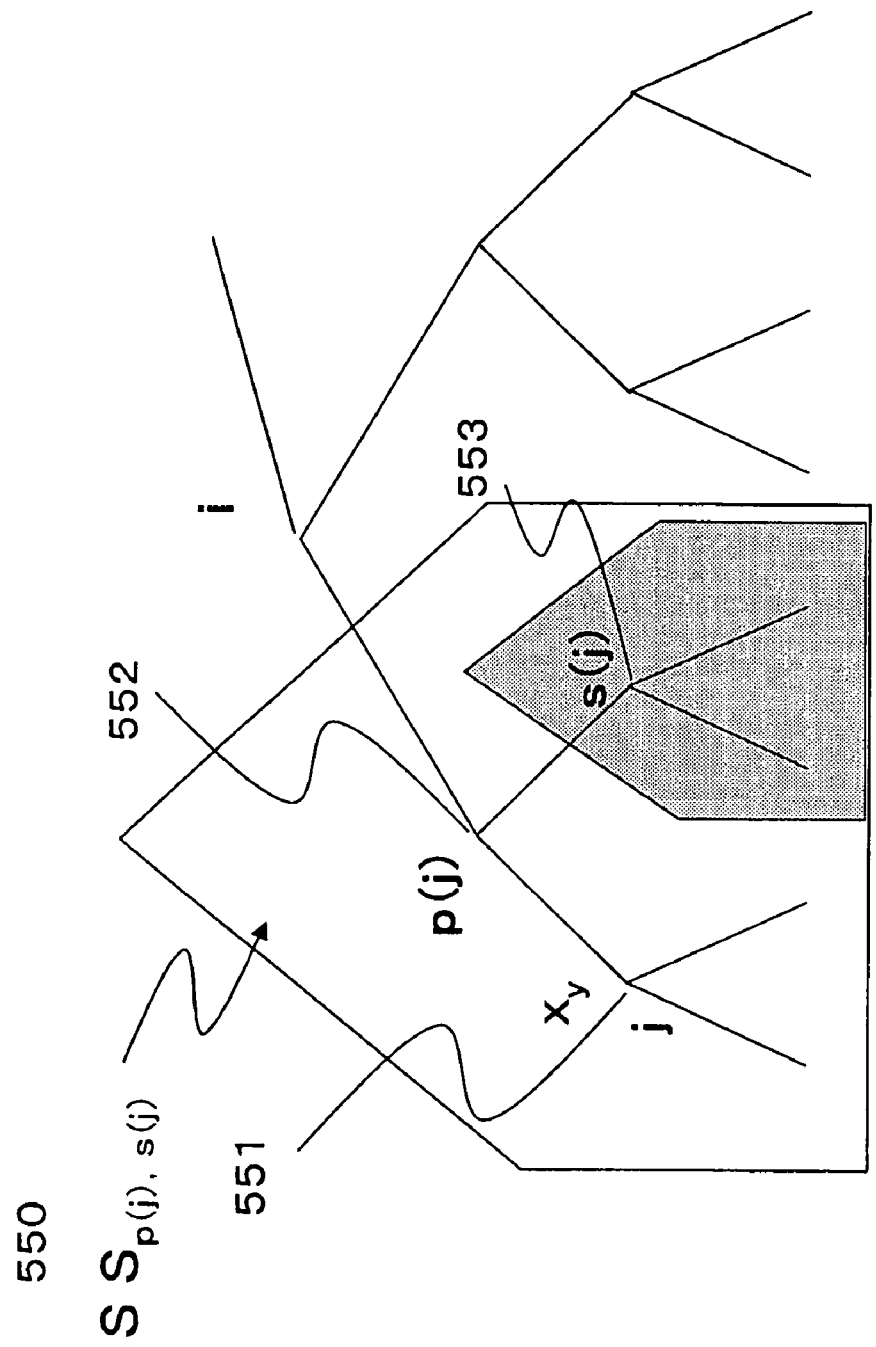
FIG. 24 is a diagram showing an example of a first special subset in which nodes are parent and child.

FIG. 24 shows a specific example. In the example shown in FIG. 24, a node associated value $NV_j$ is assigned to a node j 551.

The parent node of the node j 551 is P(j) 552, and the sibling node of the node j 551 is S(j) 553. The first special subset $SS_{P(j),S(j)}$ defined by the sibling node S(j) 553 and parent node P(j) 552 of the node j 551 is a subset $SS_{P(j),S(j)}$ 550 shown in FIG. 24.

In this case, the label associated with the subset $SS_{P(j),S(j)}$ 550 is $LABEL_{P(j),S(j)}$, which is calculated based on the intermediate label $IL_{P(j),S(j)}$ (equal to the node associated value $NV_j$ of the node j 551). That is, $LABEL_{P(j),S(j)}=HC(IL_{P(j),S(j)})$, which is equivalent to $LABEL_{P(j),S(j)}=HC(NV_j)$.

Figure 25:
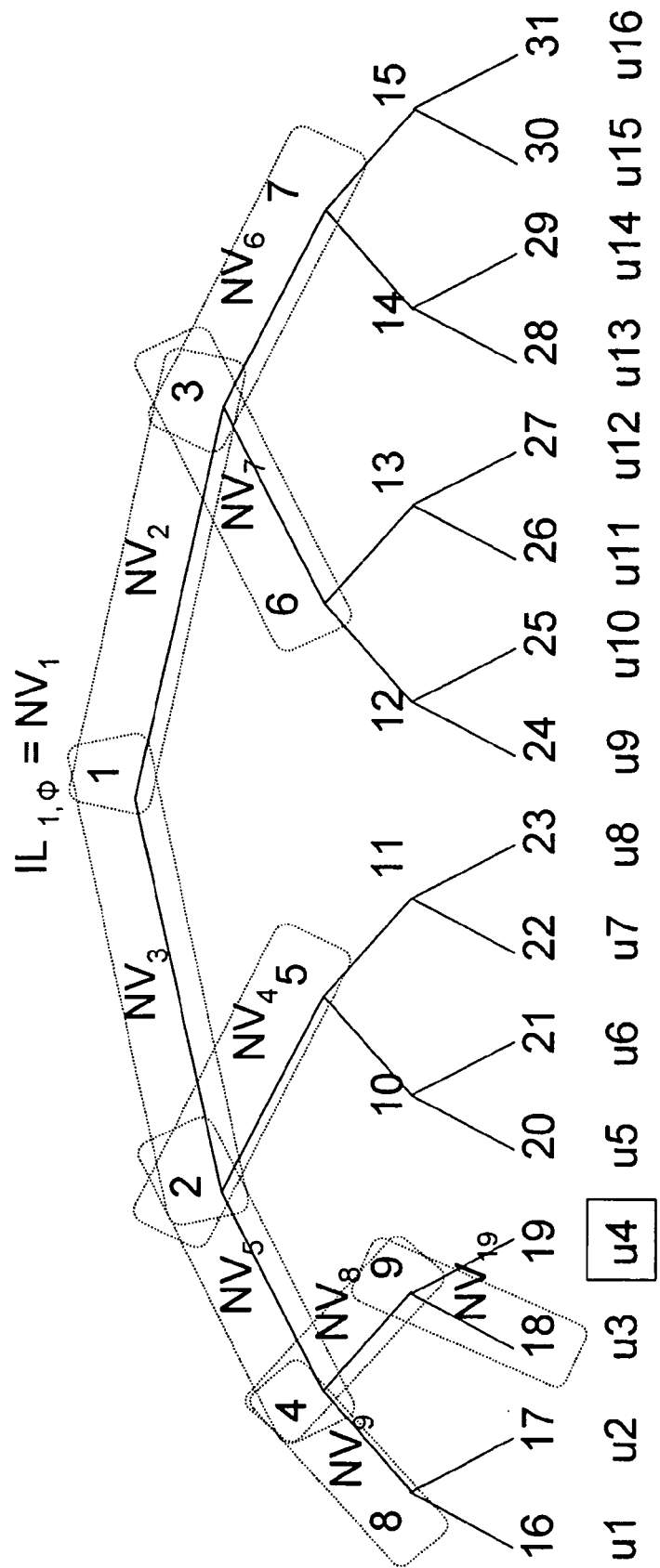
FIG. 25 is a diagram showing relationship between labels associated with special subsets and 2N−1 intermediate labels calculated according to the algorithm described with reference to FIG. 8 and used as intermediate labels.

FIG. 25 shows an example setting of the node associated values $NV_j$ as intermediate labels (ILs) from which (a) the label $LABEL_{1,\phi}$ of the second special subset $SS_{1,\phi}$ associated with the entire tree including all the receivers, which is used when no receiver is to be revoked, and (b) the labels $LABEL_{i,j}$ associated with the first special subset $SS_{i,j}$ with a node i and a node j as parent and child (j=2, 3, ..., 2N-1) are calculated.

In FIG. 25, [i $NV_k$ j] indicates $NV_k=IL_{i,j}$, where i denotes an ancestor of j. For example, [1 $NV_3$ 2] indicates $NV_3=IL_{1,2}$.

As described above, the node associated values $NV_j$ are set as values associated with intermediate labels that allow calculation of the labels of the first special subset $SS_{i,j}$ and the second special subset $SS_{1,\phi}$.

The N leaves of the Rabin tree shown in FIG. 25 are numbered from the left as $leaf_1, leaf_2, \ldots, leaf_N$ (i.e., since the node number of the leftmost $leaf_1$ is N, the node number of $leaf_i$ is N−1+i), and receivers ui are assigned to $leaf_i$. To the receiver ui, the node associated value $NV_{N-1+i}$ of the leaf node $leaf_i$, and logN node attached variables $salt_l$ of the nodes on the path from leafs to the root are assigned. The node associated values are equal to the intermediate labels. When the receivers are assigned as shown in FIG. 25, to the receiver u4 assigned to the leaf node 19, the node associated value $NV_{19}$ of the node 19, and the node attached variables $salt_{19}, salt_9, salt_4$, and $salt_2$ of the nodes on the path from the node 19 to the root, are given. The node associated value $NV_{19}$ corresponds to the intermediate label $IL_{9,18}$.

With this setting, the receiver u4 can calculate the node associated values (i.e., intermediate labels IL) of all the nodes on the path from the node 19 to the root using the node associated value $NV_{19}$ (i.e., intermediate label $IL_{9,18}$) and the node attached variables $salt_{19}, salt_9, salt_4$, and $salt_2$ of the nodes on the path from the node 19 to the root. The association between the node associated values NV of the nodes on the path from the node 19 to the root with the intermediate labels IL is as follows:

$NV_{19}=IL_{9,18}$ $NV_9=IL_{4,8}$ $NV_4=IL_{2,5}$ $NV_2=IL_{1,3}$ $NV_1=IL_{1,\phi}$ The node associated values NV (intermediate labels) of the upper nodes of the receiver u4 (with node numbers of 1, 2, 4, and 9) are calculated by the following procedure.

(a1) The node associated value $NV_9$ (i.e., intermediate label $IL_{4,8}$) of the upper node 9 is calculated from the node associated value $NV_{19}$ (i.e., intermediate label $IL_{9,18}$) of the node 19 by $NV_9$ (i.e., intermediate label $IL_{4,8})=((NV_{19})^2+H(19\|salt_{19}))\bmod M$ (a2) The node associated value $NV_4$ (i.e., intermediate label $IL_{2,5}$) of the upper node 4 is calculated from the node associated value $NV_9$ (i.e., intermediate label $IL_{4,8}$) of the node 9 by $NV_4$ (i.e., intermediate label $IL_{2,5})=((NV_9)^2+H(9\|salt_9))\bmod M$ (a3) The node associated value $NV_2$ (i.e., intermediate label $IL_{1,3}$) of the upper node 2 is calculated from the node associated value $NV_4$ (i.e., intermediate label $IL_{2,5}$) of the node 4 by $NV_2$ (i.e., intermediate label $IL_{1,3})=((NV_4)^2+H(4\|salt_4))\bmod M$ (a4) The node associated value $NV_1$ (i.e., intermediate label $IL_{1,\phi}$) of the upper node 1 is calculated from the node associated value $NV_2$ (i.e., intermediate label $IL_{1,3}$) of the node 2 by $NV_1$ (i.e., intermediate label $IL_{1,\phi})=((NV_2)^2+H(2\|salt_2))\bmod M$ The node associated values of upper nodes are calculated from the node associated values of lower nodes according to the equations given above.

Furthermore, labels can be calculated from the node associated values (intermediate labels) of the respective nodes according to the following equations:

(b1) The label ($LABEL_{9,18}$) of the node 19 is calculated from the node associated value $NV_{19}$ (intermediate label $IL_{9,18}$) of the node 19 by $LABEL_{9,18}=Hc(IL_{9,18})$ (b2) The label ($LABEL_{4,8}$) of the node 9 is calculated from the node associated value $NV_9$ (intermediate label $IL_{4,8}$) of the node 9 by $LABEL_{4,8}=Hc(IL_{4,8})$ (b3) The label ($LABEL_{1,3}$) of the node 2 is calculated from the node associated value $NV_2$ (intermediate label $IL_{1,3}$) of the node 2 by $LABEL_{1,3}=Hc(IL_{1,3})$ (b4) The label ($LABEL_{2,5}$) of the node 4 is calculated from the node associated value $NV_4$ (intermediate label $IL_{2,5}$) of the node 4 by $LABEL_{2,5}=Hc(IL_{2,5})$ (b5) The label ($LABEL_{1,\phi}$) of the node 1 is calculated from the node associated value $NV_1$ (intermediate label $IL_{1,\phi}$) of the node 1 by $LABEL_{1,\phi}=Hc(IL_{1,\phi})$ The receiver u4 needs to keep the node associated value $NV_{19}$ secret, but need not keep the node attached variables salt secret. Thus, the arrangement may be such that all the receivers have all the node attached variables $salt_1$.

According to the scheme described above, in the binary tree structure having N leaves, each receiver associated with a leaf, of the labels $LABEL_{i,j}$ that the receiver is supposed to hold in the SD method according to the related art, can generate, based on a single intermediate label, logN labels $LABEL_{i,j}$ with a node i and a node j as parent and child, and the label $LABEL_{1,\phi}$ associated with the subset $S_{1,\phi}$ including all the receivers, which is used when no receiver is to be revoked. Thus, the number of keys that each receiver has to hold securely is reduced by logN.

Now, the size of each node attached variable salt will be considered. The probability of a given number being a quadratic residue modulo M is approximately ¼. Thus, when four values are tried as $salt_1$, it is expected that on average one value causes $temp_1$ to be a quadratic residue. Thus, it is expected that the size needed for representing a node attached variable $salt_1$ is 2 bits.

In some cases, none of the four values results in a quadratic residue. For example, when L values are tried as a node attached variable $salt_1$, the probability of no $temp_1$ being a quadratic residue is $3^L/4^L$. Thus, when L=4, it occurs with a probability of $3^4/4^4 \approx 42.2\%$ that no $temp_1$ is a quadratic residue. However, when the node attached variable $salt_1$ is an 8-bit value and 256 values are tried, the probability of no $temp_1$ being a quadratic residue is considerably reduced to $3^{256}/4^{256} \approx 1.0 \times 10^{-32}$. Thus, even when the number N of leaves is large, e.g., $2^{30} \approx 10^9$ or $2^{40} \approx 10^{12}$, the probability of failure to find a node attached variable $salt_1$ with which $temp_1$ becomes a quadratic residue becomes negligibly small.

8. Ciphertext Distribution and Decryption by the SD Method Employing Rabin Tree

Next, an example of ciphertext distribution and decryption by the SD method employing a Rabin tree will be described. The following processes will be described in order:

8-1. Setup process 8-2. Information distribution process 8-3: Reception and decryption process 8-1. Setup process The setup process is executed only once at the time of activation of the system. The subsequent information distribution process and information reception and decryption process are executed each time information to send occurs, for example, when an information recording medium such as a DVD storing new content is distributed or when new information is distributed via the Internet.

The setup process includes the following four steps, which will be described in order.

a. Step 1

The trusted center (TC) defines a binary hierarchical tree having N leaves. This hierarchical tree is different from the unidirectional permutation tree described earlier. The trusted center (TC) assigns node numbers k (j=1, 2, . . . , 2N–1) to the respective nodes in the hierarchical tree as identifiers. The root node is designated as a node 1, and subsequent nodes are numbered in the breadth-first order to assign identifiers. That is, for example, node numbers 1 to 31 are assigned as shown in FIG. 31. Thus, node numbers y=1 to 2N–1 are assigned to the respective nodes in the binary tree, as shown in FIG. 23.

Furthermore, the trusted center (TC) assigns receivers um (m=1, 2, . . . , N) are assigned to the respective leaves of the tree. In the example shown in FIG. 23, 16 receivers u1 to u16 are assigned to the nodes with node numbers y=16 to 31.

Then, for each intermediate node i (i=1, 2, . . . , N–1), the trusted center (TC) defines a subset $S_{i,j}$ associated with a node j that is a descendant of a node i. Furthermore, of all the subsets $S_{i,j}$ defined as described above, each subset with the node i and node j as parent and child will be denoted as the first special subset $SS_{i,j}$. Each node except for the root of the tree has only a single parent node, so that each value of j=2, 3, . . . , 2N–1 is used only once for j in $SS_{i,j}$. Furthermore, the trusted center (TC) defines the second special subset $SS_{1,\phi}$ including all the receivers, which is used when no receiver is to be revoked.

b. Step 2

The trusted center (TC) first determined the size |M| of the modulus M (e.g., 1,024 bits).

Furthermore, the trusted center (TC) defines the pseudo-random-number generator G and makes it public. The pseudo-random-number generator G is the pseudo-random-number generator G described earlier with reference to FIG. 18. The pseudo-random-number generator G outputs a 3C-bit pseudo-random number with a C-bit input, similarly to the one as described in the article by Noar et al, used in the SD method described earlier.

Then, with the number N of the leaves of the tree and the size |M| of the modulus M as input, the trusted center (TC) defines the modulus M and the function H that maps values of arbitrary sizes to random elements of $Z_M$, and creates a binary Rabin tree having N leaves according to the algorithm described with reference to the flowchart shown in FIG. 8. First, the trusted center (TC) randomly selects the node associated value $NV1 \in Z^*_M$ of the root node, and then defines 2N–1 |M|-bit node associated values $NV_1$, $NV_2$, . . . , $NV_{2N-1}$ of the nodes 1 to 2N–1, and 2N–2 node attached variables $salt_2$, $salt_3$, . . . , $salt_{2N-1}$ of the nodes 2 to 2N–1. Since the salt values are not secret, the trusted center (TC) may make the salt values public. Furthermore, the trusted center makes the modulus M and the mapping function H public. Furthermore, the trusted center (TC) defines a function Hc that maps values of the size |M| to random values of a size C, and makes the function Hc public.

The trusted center (TC) sets the node associated value $NV_1$ defined in the above process as an intermediate label (IL) from which the label $LABEL_{1,\phi}$ of the second special subset $SS_{1,\phi}$ including all the receivers, which is used when no receiver is to be revoked, i.e., $IL_{1,\phi}=NV_1$.

Furthermore, the trusted center (TC) calculates the label $LABEL_{1,\phi}$ of the second special subset $SS_{1,\phi}$ using the function Hc on the intermediate label $IL_{1,\phi}$, i.e., $LABEL_{1,\phi}=Hc(IL_{1,\phi})$.

Furthermore, of all the subsets $S_{i,j}$, the trusted center (TC) defines an intermediate label $IL_{i,j}$ from which labels associated with the first special subset $SS_{i,j}$ of nodes for which a node i and a node j are parent and child (where j=2, 3, . . . , 2N−1). More specifically, $NV_j$ (where j=2, 3, . . . , 2N−1), i.e., a subset obtained by subtracting the node associated value NV1 of the root from the node associated values NV1 to NV2N−1 defined for the nodes 1 to 2N−1 in the Rabin-tree generating process (FIG. 8) described earlier, is set as an intermediate label $IL_{P(j),S(k)}$ associated with the first special subset $SS_{i,j}$ defined by the sibling node and parent node of the node j, i.e., $NV_j = IL_{P(j),S(j)}$. P(j) denotes the parent node of the node j, and S(j) denotes the sibling node of the node j.

Furthermore, the trusted center (TC) calculates $LABEL_{P(j)S(j)}$ based on the intermediate label $IL_{P(j)S(j)}$ (equal to the node associated value $NV_j$ of the node j 551), i.e., $LABEL_{P(j)S(j)} = HC(IL_{P(j)S(j)})$, which is equivalent to $LABEL_{P(j)S(j)} = HC(NV_j)$.

To put the above process in a different way, the association between the node associated values NV and the intermediate labels IL of the Rabin tree is defined as follows:

$IL_{1,\phi} = NV_1$

For j=1, 2, . . . , N−1, $IL_{j,2j} = NV_{2j+1}$ $IL_{j,2j+1} = NV_{2j}$

Furthermore, the trusted center (TC) calculates labels $LABEL_{i,j}$ associated with these special subsets from the intermediate label $IL_{i,j}$ according to $LABEL_{i,j} = HC(IL_{i,j})$, and sets these labels as labels $LABEL_{i,j}$ associated with the respective special subsets.

c. Step 3

The trusted center (TC) inputs the label $LABEL_{i,j}$ of the first special subset $SS_{i,j}$ where the node i and the node j are parent and child to the pseudo-random-number generator G to obtain the labels $LABEL_{i,LC(j)}$ and $LABEL_{i,RC(j)}$ of the child nodes of the node j.

More specifically, $G_L(LABEL_{i,j})$, i.e., high-order C bits of a 3C-bit pseudo-random number generated by inputting a C-bit label $LABEL_{i,j}$ to the pseudo-random-number generator G, is set as the label $LABEL_{i,LC(j)}$ of the (non-special) subset $S_{iLC(j)}$ associated with the left child node LC(j) of the node j with the node i as the starting node, and $G_R(LABEL_{i,j})$, i.e., low-order C bits of the 3C-bit pseudo-random number generated by inputting the C-bit label $LABEL_{i,j}$ to the pseudo-random-number generator G, is set as the label $LABEL_{i,RC(j)}$ of the (non-special) subset $S_{i,RC(j)}$ associated with the right child node RC(j) of the node j with the node i as the starting node. That is, the labels are set so that:

$LABEL_{i,LC(j)} = G_L(LABEL_{i,j})$ $LABEL_{i,RC(j)} = G_R(LABEL_{i,j})$

Furthermore, by iteratively inputting these outputs (labels) to the pseudo-random-number generator G, labels associated with all the descendant nodes of the node j with the node i as the starting node are obtained. This operation is performed for the labels of all the special subsets $SS_{i,j}$ to obtain labels of the subset $S_{i,j}$ defined in step 1.

d. Step 4

Then, the trusted center (TC) determines labels to be provided to the receivers um, i.e., labels to be held by the receivers um.

First, labels to be provided to a receiver um are selected as tentatively selected labels. The labels include the label $LABEL_{i,j}$ of the subset $S_{i,j}$ associated with the node j directly branching from the path m(path-m) from the leaf to which the receiver um is assigned to the root with the intermediate node i on the path m(path-m) as the starting node, and the label $LABEL_{i,\phi}$ associated with the second special subset $SS_{1,\phi}$.

Figure 26:
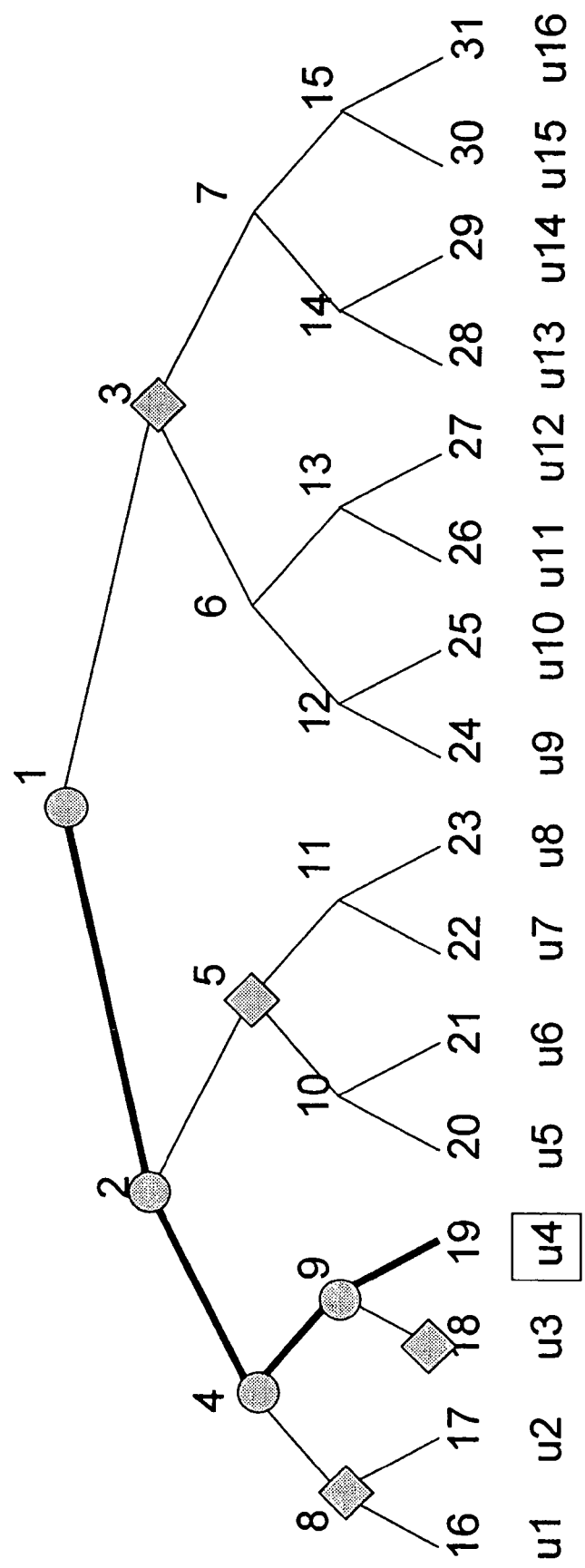
FIG. 26 is a diagram for explaining a process of determining labels to be provided to a receiver.

A process of determining labels to be provided to a receiver will be described with reference to FIG. 26 and subsequent figures. For example, as tentatively selected labels for the receiver u4 associated with the node 19 in FIG. 26, 11 labels, namely, $LABEL_{1,3}$, $LABEL_{1,5}$, $LABEL_{1,8}$, $LABEL_{2,5}$, $LABEL_{2,8}$, $LABEL_{2,18}$, $LABEL_{4,8}$, $LABEL_{4,18}$, $LABEL_{9,18}$, and $LABEL_{1,\phi}$ are selected.

The trusted center (TC) re-selects labels to be provided to the receiver um from the tentatively selected labels. Of the 11 tentatively selected labels listed above, four labels $LABEL_{1,3}$, $LABEL_{2,5}$, $LABEL_{4,8}$, and $LABEL_{9,18}$ belong to the first special subset $SS_{i,j}$ where the node i and the node j are parent and child.

Of the tentatively selected labels, the trusted center (TC) excludes labels associated with the first and second special subsets described above to select final selected labels, i.e., labels to provide.

Furthermore, regarding the leaf node j to which the receiver um is assigned, the trusted center (TC) gives the receiver um the intermediate label $IL_{P(j),S(j)}$ (node associated value $NV_j$) of the special subset $SS_{P(j),S(j)}$ associated with the sibling node S(j) of the node j with the parent node P(j) of the node j as the starting node. In the above example, the trusted center (TC) gives the receiver u4 $IL_{9,18}$ (node associated value $NV_{19}$). The receiver um securely holds the label and intermediate label (node associated value NV) given thereto.

That is, first, as labels that the receiver u4 is to possess, labels $LABEL_{i,j}$ defined by the following combinations of i and j are selected as tentatively selected labels:

For i=1, j=3, 5, 8, 18

For i=2, j=5, 8, 18

For i=4, j=8, 18

For i=9, j=18

One label for the case where no receiver is to be revoked

Then, labels excluding labels associated with the first and second special subsets from the 11 tentatively selected labels listed above, and one intermediate label, are selected as final selected labels, i.e., labels to provide. That is, the labels to provide are the labels $LABEL_{i,j}$ defined by the following combinations of i and j:

For i=1, j=5, 18

For i=2, j=8, 18

For i=4, j=18

One intermediate label $IL_{9,18}$ (node associated value $NV_{19}$)

The six labels and one intermediate label (node associated value NV) listed above are selected as labels to provide.

In the receivers um other than the receiver u4 in the above example, although the combination of labels and intermediate label (node associated value NV) differs, when N=16, six labels and one intermediate label (node associated value NV) are given to each receiver um.

The intermediate label (node associated value NV) included in the labels to be provided to the receiver um is the intermediate label $IL_{i,j}$ (node associated value) associated with the first special subset defined by the ancestor closest to the receiver um in the hierarchical tree, i.e., the first special subset $SS_{i,j}$ where the node i and the node j are parent and child (where j=2, 3, . . . , 2N−1). That is, the intermediate label provided to the receiver associated with a leaf of the hierarchical tree is an intermediate label associated with the lowermost special subset among the subsets $S_{i,j}$ constituting the first special subset.

Figure 27:
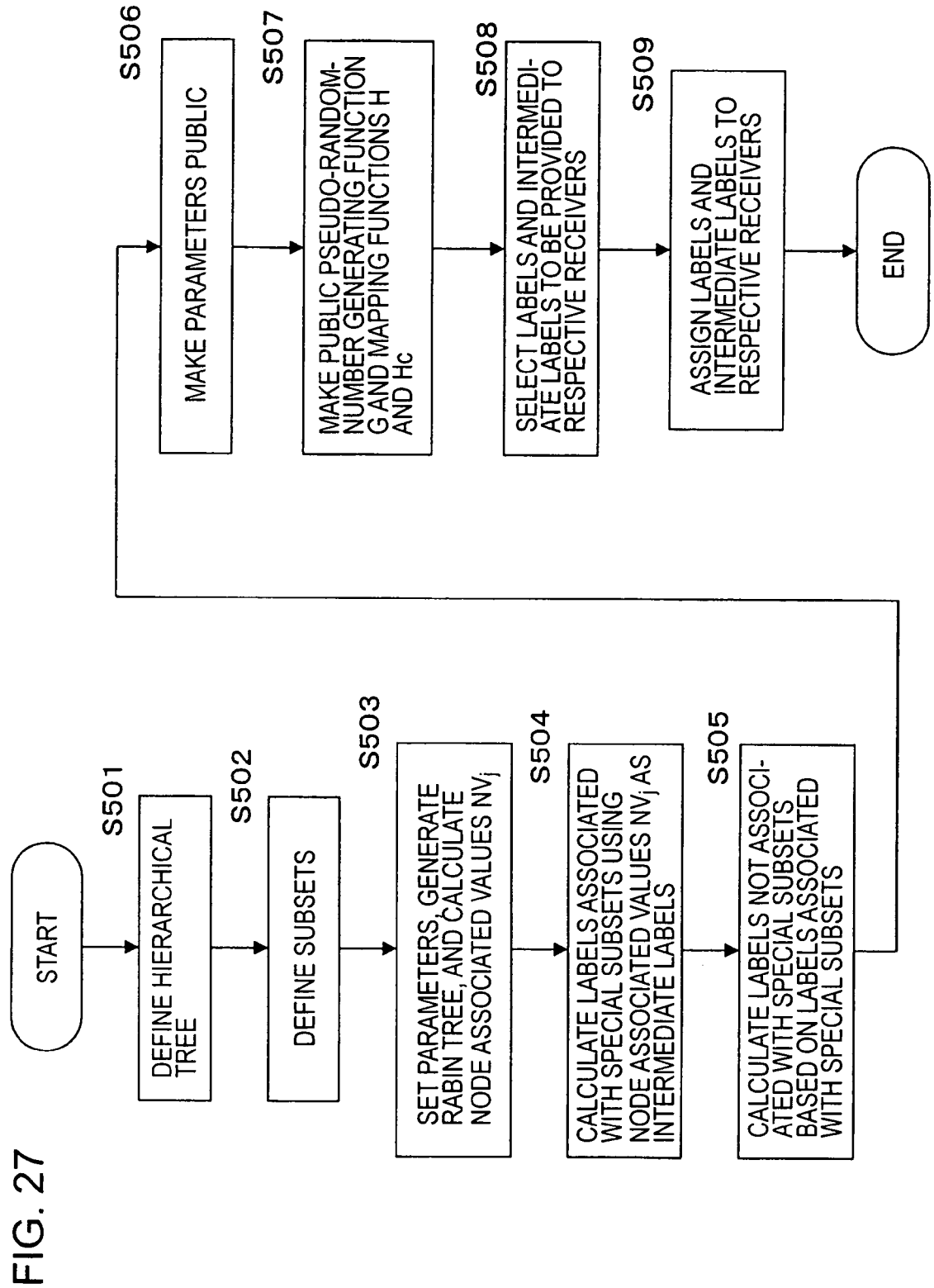
FIG. 27 is a diagram showing the flow of a setup process.

FIG. 27 shows the flow of a process executed by the trusted center (TC) based on the setup described above. In step S501, the structure of a hierarchical tree is defined. In step S502, subsets are defined in relation to the hierarchical tree. The subset definition need not necessarily be such that all the leaves can be revoked individually, and arbitrary setting is possible in accordance with information distributed, for example, subsets may be sets of specific leaves that can be revoked together.

In step S503, parameters are set, and a unidirectional tree is generated. More specifically, the number of leaves N and the size |M| of the modulus M are input as parameters, a binary Rabin tree having N leaves is generated according to the algorithm described with reference to the flow shown in FIG. 8, and the node associated values $NV_j$ of the respective nodes are calculated. The node associated values $NV_j$ of the respective nodes satisfy equation (1) given earlier. During this step, the modulus M, the mapping function H, and the mapping function Hc are defined.

In step S504, the node associated value $NV_j$ is set as the value of the intermediate label, and a label associated with the special subset is calculated based on the intermediate label (IL), as follows:

$IL_{1,\phi} = NV_1$

For y=1, 2, . . . , N−1, $IL_{j,2j} = NV_{2j+1}$ $IL_{j,2j+1} = NV_{2j}$

The intermediate labels obtained are:

(a) Intermediate label associated with the second special subset $SS_{i,\phi}$ including all the receivers, which is used when no receiver is to be revoked (b) Intermediate label associated with the first special subset $SS_{i,j}$ where the node i and the node j are parent and child (where j=2, 3, . . . , 2N−1)

Based on these intermediate labels, labels associated with the special subsets are calculated. That is, $LABEL_{i,j}$ associated with the special subsets are calculated according to $LABEL_{i,j} = Hc(IL_{i,j})$ from the intermediate labels $IL_{i,j}$.

Then, in step S505, labels not associated with the special subset are calculated based on the labels associated with the special subset. For example, the label $LABEL_{i,j}$ of the first special subset $SS_{i,j}$ is input to the pseudo-random-number generator G to obtain the labels $LABEL_{i,LC(j)}$ and $LABEL_{i,RC(j)}$ of the child nodes of the node j with the node i as the starting node, and this operation is iteratively executed to calculate all the labels associated with the subsets defined.

In step S506, parameters are made public. For example, the modulus M is a parameter that is made public. In step S507, the pseudo-random-number generator G, the function H that maps values of arbitrary sizes to random elements of $Z_M$, and the function Hc that maps values of the size |M| to random values of the size C are made public.

In step S508, labels and intermediate labels that are to be provided to each of the receivers associated with the leaves of the hierarchical tree are selected. As described earlier, this operation is executed in two stages, i.e., selection of tentatively selected labels and selection of labels to provide.

More specifically, first, as labels that a receiver um has to possess, labels that are provided in the original SD method, i.e., the labels $LABEL_{i,j}$ of the subset $S_{i,j}$ associated with the nodes j directly branching from the path m (path-m) from the leaf to which the receiver um is assigned to the root with an intermediate node i on the path m (path-m) as the starting node, and the label $LABEL_{1,\phi}$ associated with the second special subset $SS'_{1,\phi}$, are selected as tentatively selected labels. The, labels associated with the first and second special subsets are excluded from the tentatively selected labels, whereby the remaining labels $L_{i,j}$ and one intermediate label (node associated value NV) are selected as labels to provide.

The one intermediate label selected as a label to provide is the intermediate label $IL_{i,j}$ (node associated value NV) associated with the first special subset defined by the parent node and the sibling node of the leave n to which the receiver um is assigned in the hierarchical tree, i.e., the first special subset $SS_{i,j}$ where the node j is the sibling node of the leave n (since j is a leaf, J=N,N+1, . . . , 2N−1). For example, the intermediate label that is provided to the receiver u4 associated with the node 19 shown in FIG. 26 is the intermediate label $IL_{9,18}$ (node associated value $NV_{19}$).

In step S509, labels to be provided to the receiver um, determined in step S508, are provided to the receiver um. Then, the process is exited. The labels can be provided in advance at the time of manufacturing of the receiver um by storing the labels in a tamper-resistant memory, or via a secure communication path or medium without the risk of information leakage. The steps of the flow shown in FIG. 27 need not necessarily be executed in the order described.

8-2. Information Distribution Process

Next, a process of sending secret information after executing the setup process will be described in detail. Distribution of information, i.e., transmission of secret information, is executed by the trusted center (TC) broadcasting one or more ciphertexts. Each of the ciphertexts is generated by encrypting secret information using a subset key. For example, secret information sent by the trusted center is a set of ciphertexts generated by encrypting the same secret information to send using different subset keys.

For example, when secret information to send is a content key Kc for decrypting encrypted content, a set of ciphertexts obtained by encrypting the content key Kc using different subset keys is generated and provided. For example, a set of ciphertexts $E(SK_{a,b}, Kc)$, $E(SK_{c,d}, Kc)$, and $E(SK_{e,f}, Kc)$ is generated and provided by network distribution or as stored on recording media. The ciphertext set in the above example is composed of three ciphertexts generated through encryption using three different subset keys.

Each of the subset key $SK_{a,b}$, $SK_{c,d}$, and $SK_{e,f}$ is a subset key associated with a subset selected by the trusted center (TC) to set specific devices as revoked devices.

Each unrevoked receiver can generate one of the subset keys used for the encryption of the ciphertexts based on labels and intermediate label that the receiver possesses. Thus, only the authorized selected receivers not including revoked devices can obtain the content key Kc by decrypting one of the ciphertexts $E(SK_{a,b}, Kc)$, $E(SK_{c,d}, Kc)$, and $E(SK_{e,f}, Kc)$.

Figure 28:
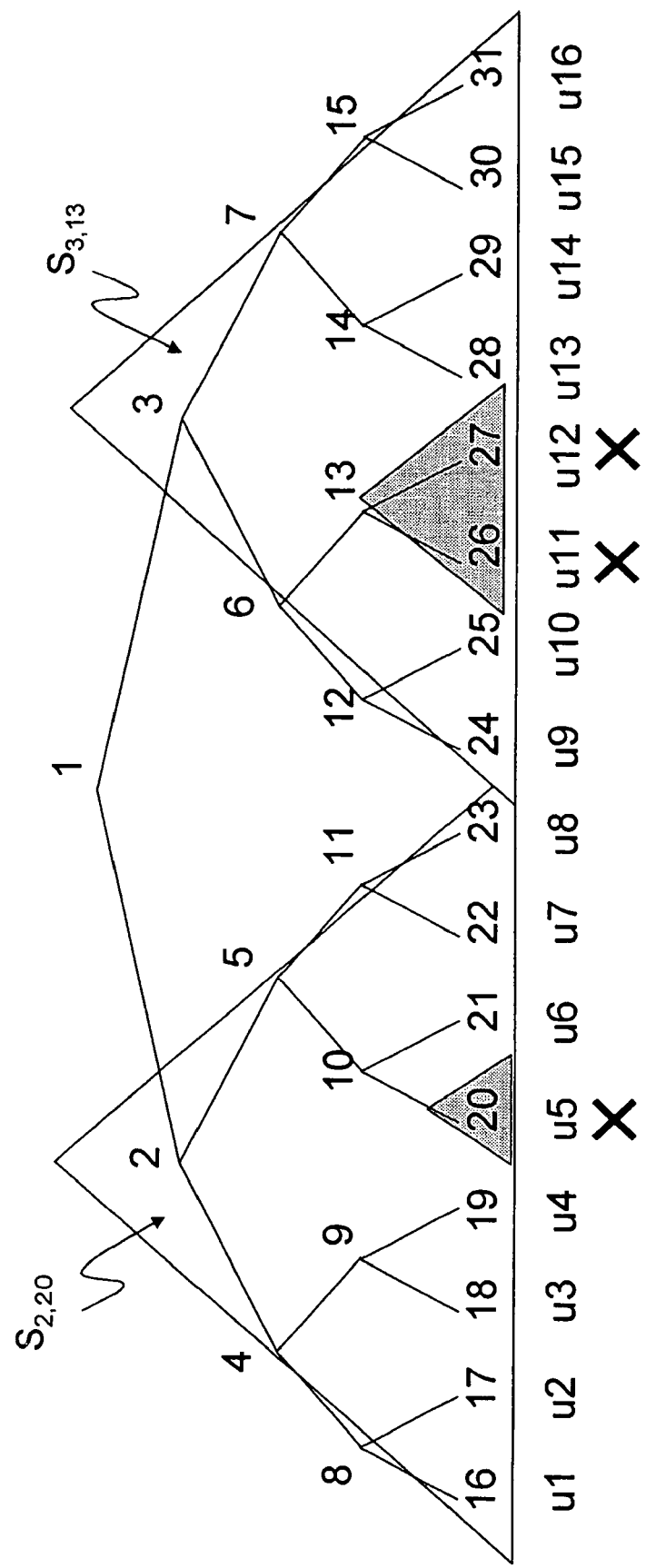
FIG. 28 is a diagram showing subsets that are used to revoke receivers u5, u11, and u12 in the hierarchical tree structure with the total number of receivers N=16.

FIG. 28 shows subsets that are used when the receivers u5, u11, and u12 are to be revoked in the hierarchical tree structure in which the total number of receivers N=16. When the receivers u5, u11, and u12 are to be revoked, two subsets $S_{2,20}$ and $S_{3,13}$ shown in FIG. 28 are used.

Each unrevoked receiver is included in one of the two subsets $S_{2,20}$ and $S_{3,13}$, and each of the revoked receivers u5, u11, and u12 is included in none of the two subsets $S_{2,20}$ and $S_{3,13}$. Thus, by sending secret information encrypted using subset keys $SK_{2,20}$ and $SK_{3,13}$ associated with these subsets, only unrevoked receivers can decrypt ciphertexts to obtain secret information.

Figure 29:
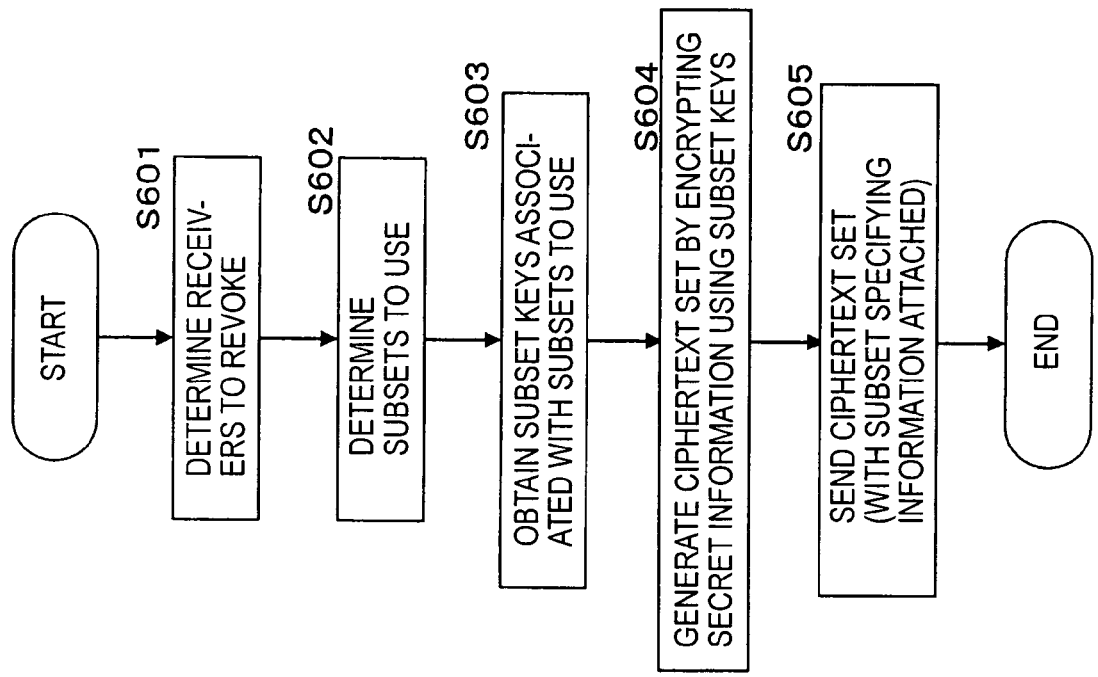
FIG. 29 is a diagram showing the flow of an information distribution process.

The steps of the information distribution process will be described with reference to the flow shown in FIG. 29.

In step S601, the trusted center (TC) selects revoked receivers to which secret information is not to be provided. It is assumed herein that all the receivers are respectively associated with leaves of a hierarchical tree structure.

In step S602, based on positions of the leaves associated with the revoked receivers in the hierarchical tree, subsets that are used for distribution of secret information are determined. In the example shown in FIG. 28, the receivers u5, u11, and u12 are selected as revoked receivers, and two subsets $S_{2,20}$ and $S_{3,13}$ are used.

In step S603, subset keys associated with the subsets are selected. The trusted center (TC) holds in advance subset keys associated with subsets. In the example shown in FIG. 28, subset keys $SK_{2,20}$ and $SK_{3,13}$ associated with the two subsets $S_{2,20}$ and $S_{3,13}$ are selected.

In step S604, a ciphertext set is generated by encrypting secret information using the subset keys selected in step S603. In the example shown in FIG. 28, a ciphertext set is generated by encrypting secret information using the two subset keys $SK_{2,20}$ and $SK_{3,13}$. That is, secret information (e.g., a content key Kc) is encrypted using the two subset keys $SK_{2,20}$ and $SK_{3,13}$ to generate a ciphertext set composed of ciphertexts $E(SK_{2,20}, Kc) E(SK_{3,13}, Kc)$.

In step S605, the ciphertext set generated in step S604 are broadcasted to the receivers. The ciphertext set is composed of ciphertexts that can be decrypted only by unrevoked devices. Thus, decryption by revoked devices is prohibited, so that information is distributed securely.

When sending the ciphertext set, subset specifying information representing the order of ciphertexts associated with the respective subsets may be sent together. Based on the specifying information, each receiver can readily extract a ciphertext generated using a subset key that the receiver can generate. As a specific example, the scheme of using key specifying codes, described in Japanese Unexamined Patent Application Publication No. 2001-352322, can be used.

The subset keys used for encryption may be subset keys generated by the trusted center (TC) in the setup phase, or may be derived by the pseudo-random-number generator G from labels of respective subsets, generated in the setup phase.

When no receiver is to be revoked, secret information is encrypted using the subset key $SK_{1,\phi}=G_M(LABEL_{1,\phi})=G_M(Hc(IL_{1,\phi}))$ of the second special subset $SS_{1,\phi}$.

8-3. Reception and Decryption Process

Each unrevoked receiver belongs to only one of the subsets. Thus, each unrevoked receiver can obtain secret information by decrypting a ciphertext generated using a subset key associated with that subset. The receiver can find the ciphertext to decrypt using the subset specifying information described above. After identifying the ciphertext to decrypt, the receiver derives the subset key from labels or intermediate label that it possesses, and decrypts the ciphertext using the subset key. The method of deriving the subset key will be described below.

The receiver um determines whether the node j of the subset $S_{i,j}$ associated with the subset key $SK_{i,j}$ that is to be used for decryption belongs to case (A) or case (B) below:

(A) The receiver is a direct descendant of a node k having a label LABELi,k (including the case where j=k).

(B) The receiver coincides with a node k that is not on the path from the leaf n to which the receiver is assigned to the root of the child nodes of the node I (i.e., a node k that is the sibling node of one of the child nodes of the node i that is on the path) or a descendant thereof (i.e., whether the node j is a descendant of a node k constituting the first special subset $SS_{i,k}$ of the subsets whose labels are given to the receiver um).

When no receiver is to be revoked and the subset key $SK_{1,\phi}$ of the second special subset $SS_{1,\phi}$ is used for encryption of secret information, case (B) is assumed.

When case (B) applies, the intermediate labels of the special subset $SS_{i,k}$ are derived from the intermediate label $IL_{P(n),S(n)}$ given to the receiver, as described below.

First, when i=P(n) and j=k=S(n), the receiver already has the intermediate label (node associated value NV), so that no particular operation is needed. Otherwise, the receiver sequentially calculates intermediate labels (node associated values NV) associated with upper subsets by applying a public function F on the intermediate label $IL_{P(n),S(n)}$, i.e., according to equation (1) given earlier. In relation to the intermediate label $IL_{P(n),S(n)}$ that the receiver possesses, with the parent node P(P(n)) of the parent node P(n) of the leaf n to which the receiver is assigned as the starting node, the intermediate label $IL_{P(P(n)),S(P(n))}$ of the special subset $SS_{P(P(n)),S(P(n))}$ associated with the sibling node S(P(n)) of the node P(n) can be calculated by an equation in which the node associated value NV in equation (1) given earlier is replaced by the intermediate label, i.e., by equation (3) below:

$$IL_{P(P(n)),S(P(n))}=(IL_{P(n),S(n)})^2+H(n\|salt_n))\bmod M \qquad (3)$$

This is based on equation (1) regarding the relationship of node associated values of a Rabin tree described earlier.

Furthermore, the node associated values NV (intermediate labels) of upper nodes are calculated based on the node associated values NV (intermediate labels) of lower nodes. For example, in the receiver u4 shown in FIG. 26, the node associated values NV (intermediate labels) of upper nodes (with node numbers 1, 2, 4, and 9) are calculated by the following procedure.

(a1) $NV_9$ (i.e., intermediate label $IL_{4,8}$)=$((NV_{19})^2+H(19\|salt_{19}))\bmod M$ (a2) $NV_4$ (i.e., intermediate label $IL_{2,5}$)=$((NV_9)^2+H(9\|salt_9))\bmod M$ (a3) $NV_2$ (i.e., intermediate label $IL_{1,3}$)=$((NV_4)^2+H(4\|salt_4))\bmod M$ (a4) $NV_1$ (i.e., intermediate label $IL_{1,\phi}$)=$((NV_2)^2+H(2\|salt_2))\bmod M$ The node associated values of upper nodes are calculated from the node associated values of lower nodes according to the equations given above. Furthermore, labels can be calculated from the node associated values (intermediate labels) of the respective nodes according to the following equations:

(b1) $LABEL_{9,18}=Hc(IL_{9,18})$ (b2) $LABEL_{4,8}=Hc(IL_{4,8})$ (b3) $LABEL_{1,3}=Hc(IL_{1,3})$ (b4) $LABEL_{2,5}=Hc(IL_{2,5})$ (b5) $LABEL_{1,\phi}=Hc(IL_{1,\phi})$ As described above, with a node y and a parent node (the parent node P(P(y)) of the node P(y) when y exists) as the starting nodes, the intermediate label $IL_{P(P(y)),S(P(y))}$ of the special subset $SS_{P(P(y)),S(P(y))}$ associated with the sibling node S(P(y)) of the node P(y) can be calculated by:

$$IL_{P(P(y)),S(P(y))}=(IL_{P(y),S(y)})^2+H(y\|salt_y))\bmod M$$

The node y is a node that exits on the path from the leaf to which the receiver is assigned to the root.

Furthermore, in relation to the intermediate label IL1,2 or the intermediate label IL1,2, the intermediate label $IL_{1,\phi}=K$ associated with the second special subset $SS_{1,\phi}$ can be calculated by:

$$IL_{1,\phi}=((IL_{1,2})^2+H(3\|salt_3))\bmod M$$

$$IL_{1,\phi}=((IL_{1,3})^2+H(2\|salt_2))\bmod M$$

The process in which a receiver obtains intermediate labels will be described with reference to FIG. 28. The receiver u4 assigned to the leaf 19 possesses the intermediate label $LABEL_{9,18}$. Using the modulus M, the public exponent e, and the node number as public parameters, the intermediate label $IL_{4,8}$ of the subset S4,8 defined by the parent node 4 and the sibling node 8 of the node 9 can be calculated by:

$$IL_{4,8}=((IL_{9,18})2+H(19\|salt_{19}))\bmod M$$

Similarly, the intermediate label IL2,5 of the subset S2,5 defined by the parent node 2 and the sibling node 5 of the node 4 can be calculated by:

$$IL_{2,5}=((IL_{2,5})2+H(9\|salt_9))\bmod M$$

By repeating this operation, the receiver u4 can obtain the upper intermediate labels $IL_{1,3}$ and $IL_{1,\phi}$.

After deriving the intermediate label ILi,k associated with the subset Si,k, the receiver calculates the label LABELi,k by LABELi,k=HC(ILi,k).

Then, as described earlier with reference to FIG. 18, the label $LABEL_{i,j}$ of the subset $S_{i,j}$ needed is calculated using the pseudo-random-number generator G, calculates the subset key $SK_{i,j}$ of the subset is calculated by $SK_{i,j}=GM(LABEL_{i,j})$, and decrypts the ciphertext using the subset key $SK_{i,j}$.

Figure 30:
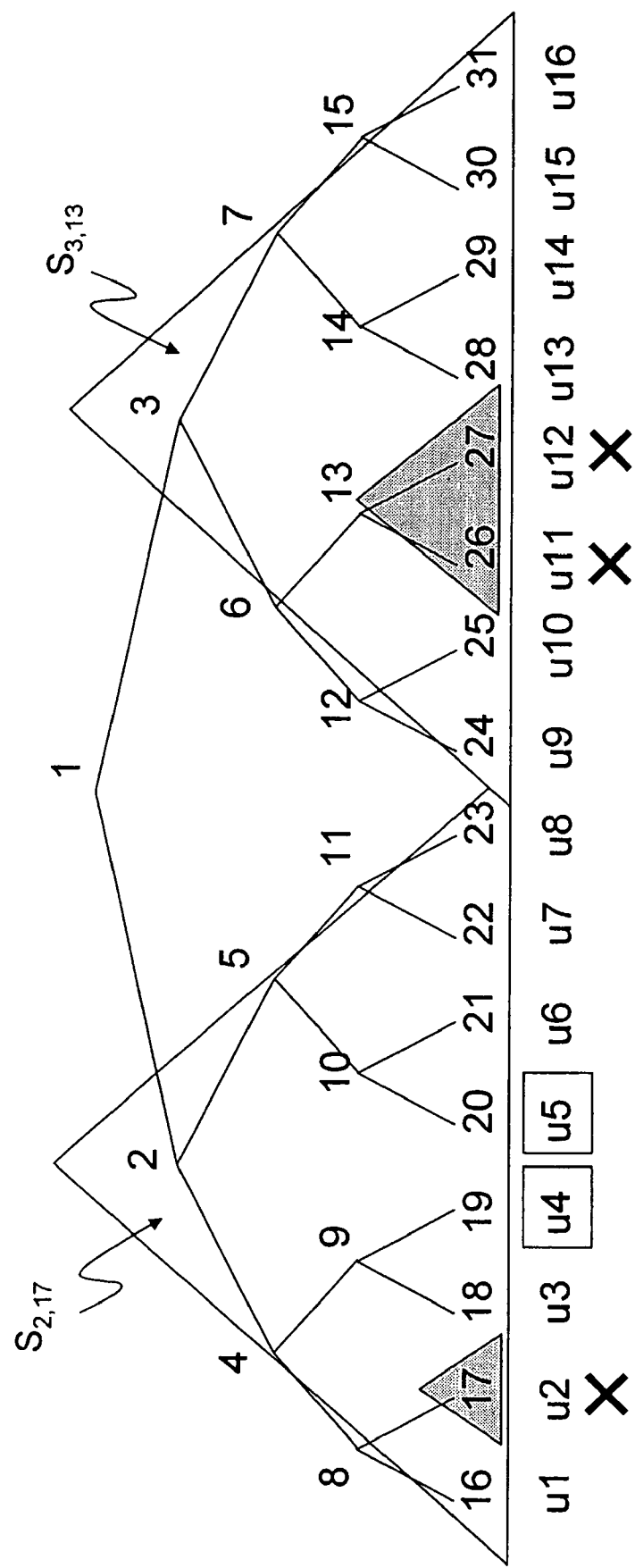
FIG. 30 is a diagram for explaining a specific example of deriving a subset key.

A specific example of deriving a subset key will be described with reference to FIG. 30. Let it be supposed that, as shown in FIG. 30, the receivers u2, u11, and u12 are revoked, and that ciphertexts generated using the subset keys associated with the subsets $S_{2,17}$ and $S_{3,13}$ are broadcasted.

The receiver u4 holds six labels $LABEL_{1,5}$, $LABEL_{1,8}$, $LABEL_{1,18}$, $LABEL_{2,8}$, $LABEL_{2,18}$, and $LABEL_{4,18}$, and an intermediate label $IL_{9,18}$ (node associated value $N_{19}$) that allows $IL_{1,\phi}$, $IL_{1,3}$, $IL_{2,5}$, and $IL_{4,8}$ to be derived. The receiver u4 applies to case (A) described earlier. That is, the receiver u4 directly holds the label $LABEL_{2,8}$ relating to the node 8, which is an ancestor of the node 17. Thus, the receiver u4 can obtain the subset key $SK_{2,17}$ by applying the pseudo-random-number generator G a number of times as needed.

Furthermore, under the same setting, the receiver u5 holds six labels $LABEL_{1,4}$, $LABEL_{1,11}$, $LABEL_{1,21}$, $LABEL_{2,11}$, $LABEL_{2,21}$, and $LABEL_{5,21}$, and an intermediate label $IL_{10,21}$ (node associated value $NV_{20}$) that allows $IL_{1,\phi}$, $IL_{1,3}$, $IL_{2,4}$, and $IL_{5,11}$ to be derived. The receiver u5 applies to case (B) described earlier. That is, the receiver u5 does not directly hold the label LABEL2,k relating to a node k that is an ancestor of the node 17. Thus, the receiver u5 can obtain the subset key $SK_{2,17}$ by first deriving the intermediate label $IL_{2,4}$ (node associated value $NV_5$) associated with the node 4, which is an ancestor of the node 17, and then applying the pseudo-random-number generator G a number of times as needed.

When no receiver is to be revoked and the second special subset $SS'_{1,\phi}$ is used, the receiver um calculates the intermediate label $IL_{1,\phi}$ (node associated value NV1) by the procedure described above, calculates the label $LABEL_{1,\phi}$ by $LABEL_{1,\phi}=HC(IL_{1,\phi})$, and inputs the label $LABEL_{1,\phi}$ to the pseudo-random-number generator G to obtain the middle C bits of the output. That is, the receiver um calculates the subset key $SK_{1,\phi}$ associated with the subset $S_{1,\phi}$ by $SK_{1,\phi}=GM(LABEL_{1,\phi})$, and decrypts the ciphertext using the subset key $SK_{1,\phi}$.

Now, a process in which a receiver receives ciphertexts, obtains a subset key, and decrypts a ciphertext will be described with reference to a flowchart shown in FIG. 31.

In step S701, the receiver receives a ciphertext set. In step S702, the receiver determines a ciphertext to decrypt from the ciphertext set. That is, the receiver extracts a ciphertext that has been encrypted using a subset key that the receiver can generate. When it is not possible for the receiver to determine a ciphertext to decrypt, it is indicated that the receiver is revoked. The selection of a ciphertext is based on, for example, subset specifying information that is transmitted together with the ciphertexts.

When the ciphertext to decrypt has been determined, in step S703, the receiver derives the subset key used for encrypting the ciphertext, by the method described above.

Figure 32:
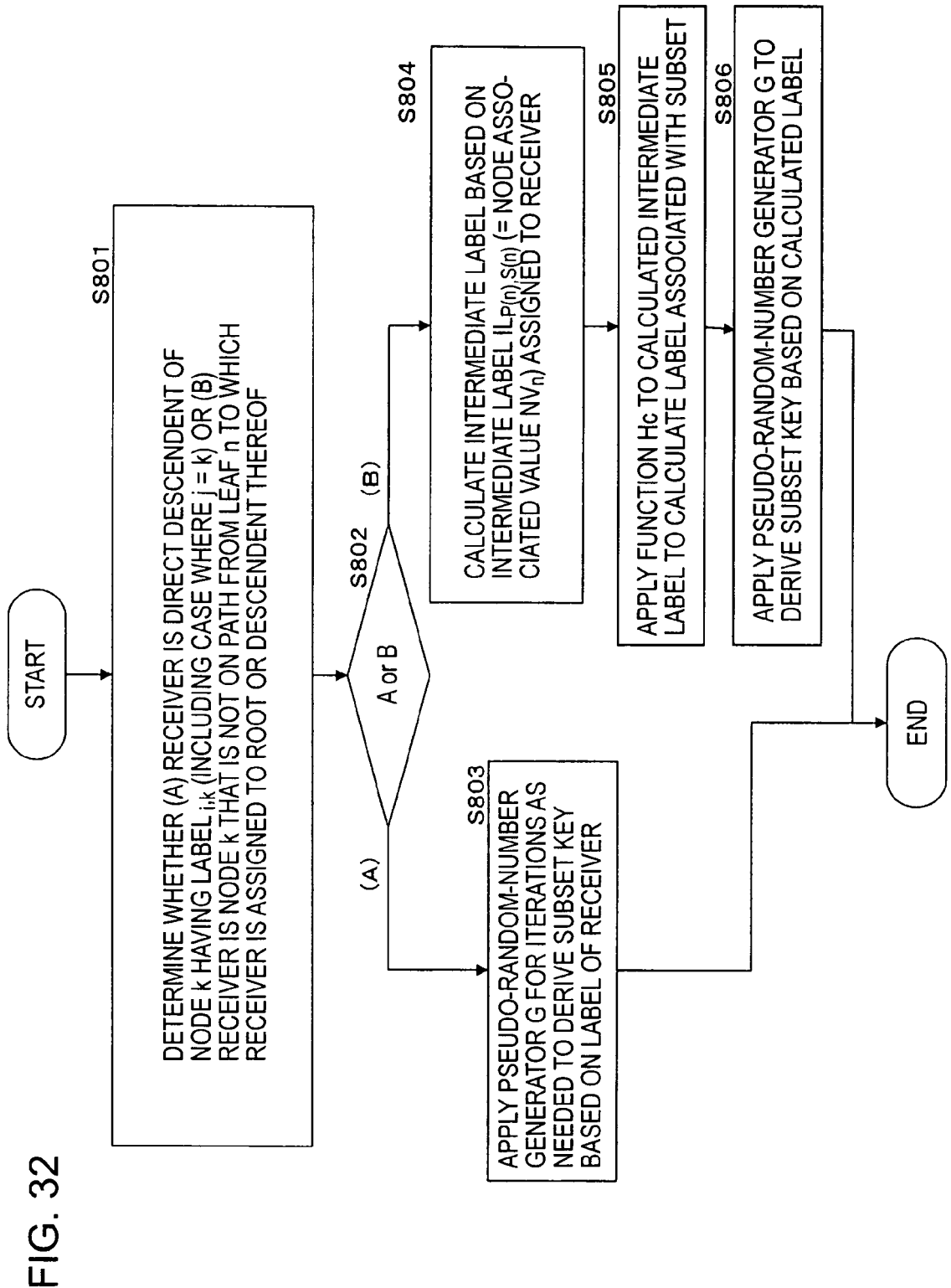
FIG. 32 is a flow diagram showing a process of deriving a subset key at a receiver in the SD method employing a Rabin tree.

The procedure for deriving the subset key will be described in detail with reference to FIG. 32. In step S801, the receiver determines whether the node j of the subset $S_{i,j}$ associated with the subset key $SK_{i,j}$ that is to be used for decryption belongs to case (A) or case (B) below:

(A) The receiver is a direct descendant of a node k having a label $LABEL_{i,k}$ (including the case where j=k).

(B) The receiver coincides with a node k that is not on the path from the leaf n to which the receiver is assigned to the root of the child nodes of the node l (i.e., a node k that is the sibling node of one of the child nodes of the node i that is on the path) or a descendant thereof (i.e., whether the node j is a descendant of a node k constituting the first special subset $SS_{i,k}$ of the subsets whose labels are given to the receiver um).

When no receiver is to be revoked and the subset key $SK_{1,\phi}$ of the second special subset $SS_{1,\phi}$ is used for encryption of secret information, case (B) is assumed.

When case (A) applies, in step S803, the pseudo-random-number generator G is applied a number of times as needed based on the labels that the receiver possesses, thereby deriving the subset key to use.

When case (B) applies, in step S804, based on the intermediate label $IL_{P(n),S(n)}$ (node associated value NVn) given to the receiver, intermediate labels associated with the special subset are calculated according to equation (1) (equivalent to equation (3)) given earlier. In step S805, the function Hc is applied based on the intermediate labels calculated to calculate labels associated with the subset. In step S806, the pseudo-random-number generator G is applied based on the calculated labels to derive the subset key to use.

Referring back to the flow shown in FIG. 31, after deriving the subset key by the procedure described above, in step S704, the receiver decrypts the ciphertext selected from the ciphertext set in step S702 using the subset key derived in step S703, thereby obtaining secret information transmitted. The secret information is, for example, a content key for decrypting encrypted content in a television broadcasting system. In this case, the receiver receives the encrypted content, and decrypts the encrypted content using the content key to output decrypted content.

Figure 33:
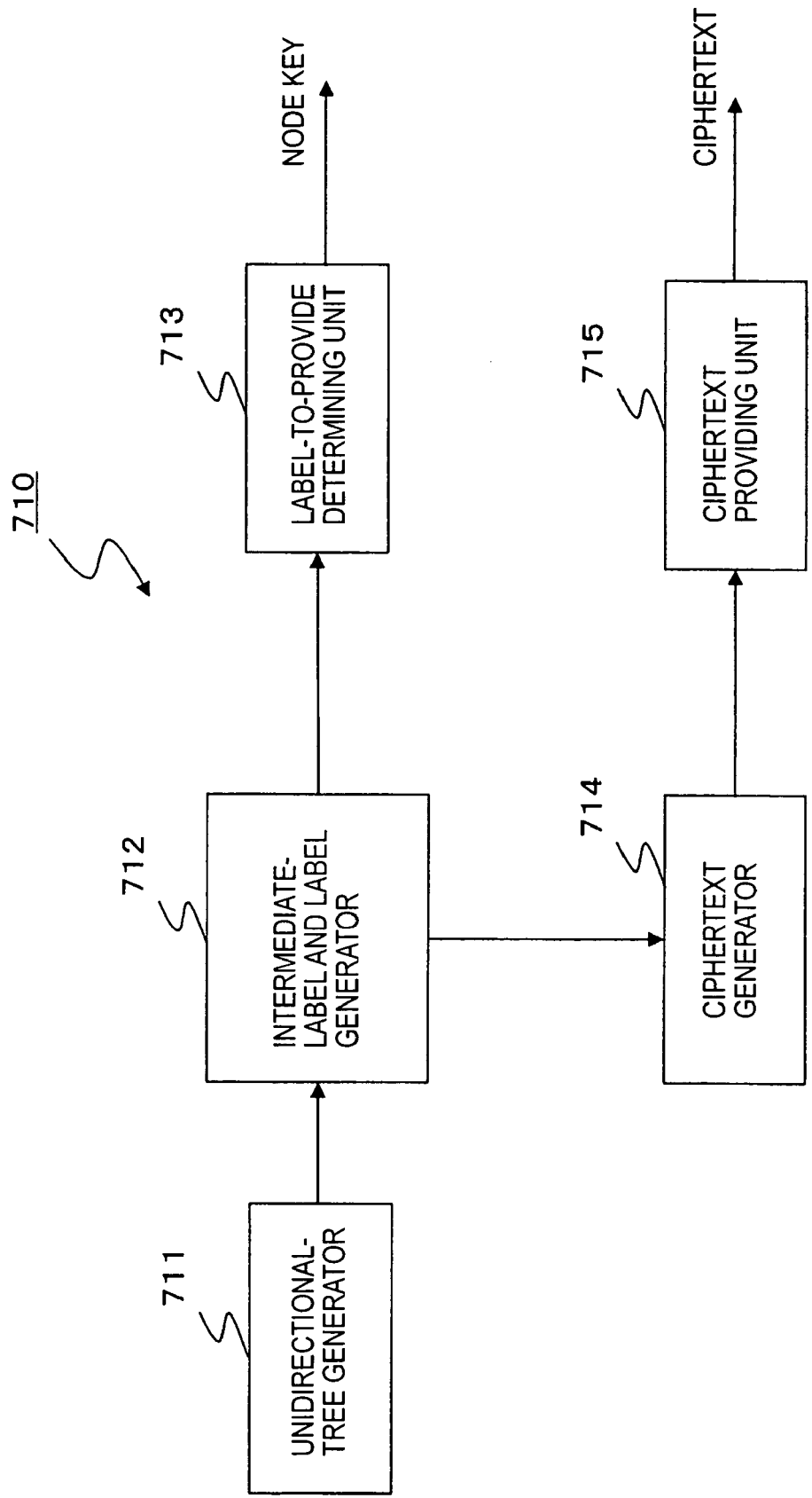
FIG. 33 is a diagram showing the configuration of an information processing apparatus that determines labels and generates ciphertexts in the SD method.
Figure 34:
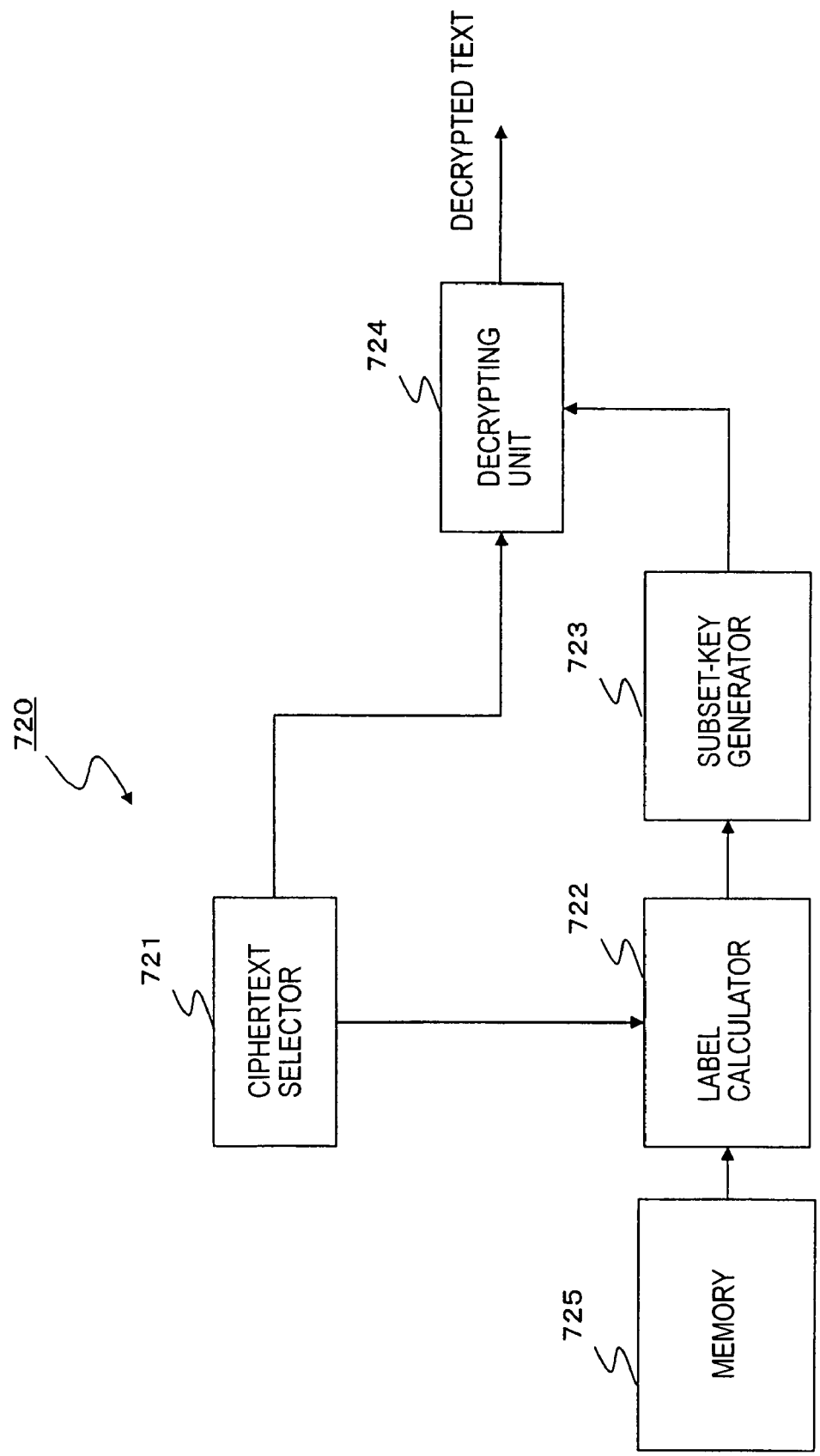
FIG. 34 is a diagram showing the functional configuration of an information processing apparatus that decrypts a ciphertext in the SD method.

Next, the functional configurations of an information processing apparatus that defines labels and generates ciphertexts and an information processing apparatus that acts as a receiver that decrypts a ciphertext will be described with reference to FIGS. 33 and 34.

First, the functional configuration of an information processing apparatus that defines labels and generates ciphertexts will be described with reference to FIG. 33. An information processing apparatus 710 includes a unidirectional-tree (Rabin-tree) generator 711, an intermediate-label and label generator 712, label-to-provide determining unit 713, a ciphertext generator 714, and a ciphertext providing unit 715.

The information processing apparatus 710 employs broadcast encryption based on a hierarchical tree to provide ciphertexts that can be decrypted by specific selected devices not including revoked devices. The unidirectional-tree (Rabin-tree) generator 711 generates a Rabin tree, in which the node associated value NV of each node of the hierarchical tree can be calculated according to equation (1) using the node associated value NV and node attached variable salt of at least one lower node.

The intermediate-label and label generator 712 defines values calculated based on an intermediate label by the mapping function Hc as labels associated with a special subset among labels associated with respective subsets that are defined by the subset difference (SD) method based on a hierarchical tree.

The special subsets selected by the intermediate-label and label generator 712 include at least either:

The first special subset where the node i and the node j are parent and child directly linked in the hierarchical tree among the subsets $S_{i,j}$ defined as sets obtained by subtracting a subtree with the lower node j as the vertex thereof from the subtree with the node i as the vertex thereof.

The second special subset, i.e., the subset $S_{1,\phi}$ defines as the set of the entire tree including all the leaves of the hierarchical tree.

The intermediate-label and label generator 712 generates, as node associated values of the Rabin tree, intermediate labels associated with labels associated with a special subset among the labels associated with the respective subsets defined by the subset difference (SD) method.

More specifically, the unidirectional-tree (Rabin-tree) generator 711 generates a Rabin tree in which node associated values are defined according to the algorithm described earlier with reference to the flow shown in FIG. 8. The intermediate-label and label generator 712 sets the node associated values as intermediate labels associated with special subsets. That is, the node associated values are used as intermediate labels that allows calculation of the labels of the first special subset $SS_{i,j}$ and the second special subset $SS_{1,\phi}$.

Furthermore, the mapping function Hc is applied based on the intermediate labels to calculate the labels of the special subsets. Then, the pseudo-random-number generator G is applied to the labels associated with the special subsets to sequentially calculate labels associated with the respective subsets. This procedure corresponds to the procedure described earlier with reference to FIG. 18.

The label-to-provide determining unit 713 determines labels to be provided to receivers associated with leaves of the hierarchical tree. The label-to-provide determining unit 713 determines, as labels to be provided to the receivers, special-subset-non-associated labels that are not associated with special subsets, and an intermediate label (node associated value) that allows calculation of labels associated with special subsets.

Specific processing executed by the label-to-provide determining unit 713 will be described below. First, with an intermediate node i as the starting node, the node i residing on the path m (path-m) from the leaf to which the receiver um is assigned to the root, the labels $LABEL_{i,j}$ of the subsets $S_{i,j}$ associated with the node j directly branching from the path from the leaf to the node i, and the label $LABEL_{1,\phi}$ associated with the subset $SS_{1,\phi}$ associated with the entire tree including all the receivers, which is used when no receiver is to be revoked, as tentatively selected labels. Then, special-subset-non-associated labels not associated with special subsets are selected from the tentatively selected labels, and an intermediate label (node associated value) that allows calculation of labels associated with special subsets is selected. These are determined as final selected labels to be provided to the receiver um.

The ciphertext generator 714 selectively applies subset keys that can be derived from the labels generated by the intermediate-label and label generator 712 to generate ciphertexts. The ciphertext providing unit 715 provides the ciphertexts generated as described above via a network or as stored on recording media.

Next, the functional configuration of an information processing apparatus that acts as a receiver that decrypts a ciphertext will be described with reference to FIG. 34.

An information processing apparatus 720 that acts as a receiver that decrypts a ciphertext includes a ciphertext selector 721, a label calculator 722, a subset-key generator 723, a decrypting unit 724, and a label memory 725.

The information processing apparatus 720 that acts as a receiver that decrypts a ciphertext is an information processing apparatus that decrypts a ciphertext using a subset key associated with one of the subsets defined based on the subset difference (SD) method, which is a broadcast encryption method based on a hierarchical tree structure. The ciphertext selector 721 selects a ciphertext that has been generated using a subset key that can be derived based on a label that is held in the label memory 725 or a label that can be calculated from an intermediate label that it possesses.

When the subset key used for encryption is not a subset key that can be derived by pseudo-random-number generation based on a label possessed by the receiver, the label calculator 722 calculates intermediate labels associated with a special subset needed by performing calculation based on the intermediate label $IL_{P(n),S(n)}$ given to the receiver.

More specifically, based on the intermediate label $IL_{P(n),S(n)}$ (node associated value $NV_n$) given to the receiver and stored in the memory 725, intermediate labels (node associated values) associated with the special subset needed are calculated according to equation (3) given earlier. Furthermore, by applying the mapping function Hc on the calculated intermediate labels, labels associated with the subset are calculated.

The subset-key generator 723 calculate the subset key to use, by applying the pseudo-random-number generator G based on a label stored in the memory 725 or a label calculated from the intermediate label by the label calculator 722.

The decrypting unit 724 decrypts the ciphertext using the subset key calculated by the subset-key generator 723.

Figure 35:
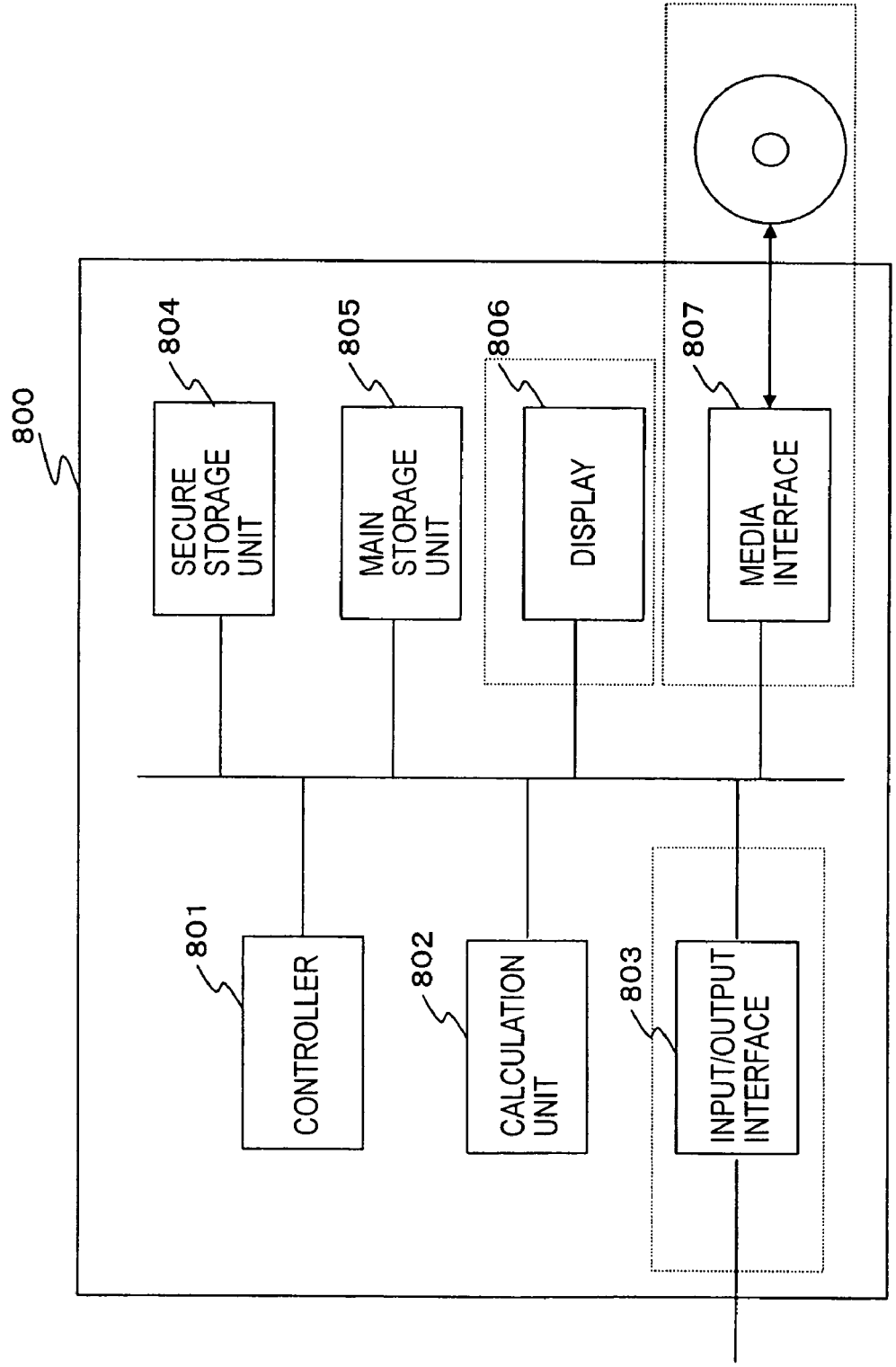
FIG. 35 is a block diagram showing an example hardware configuration of an information processing apparatus.

FIG. 35 shows an example hardware configuration of an information processing apparatus 800 that acts as an information processing apparatus that generates ciphertexts or that acts as a receiver that decrypts a ciphertext. The block indicated by a dotted line in FIG. 35 is optional. For example, a media interface 807 is included when the receiver 800 is an optical disk player or the like. An input/output interface 803 is included when the receiver 800 exchanges information with other devices or receives signals from an antenna. The secure storage unit 804 securely holds data given from the trusted center (TC) in the setup phase, such as node keys, node associated values, or labels.

As shown in FIG. 35, the information processing apparatus 800 includes a controller 801, a calculation unit 802, an input/output interface 803, a secure storage unit 804, a main storage unit 805, a display 806, and a media interface 807.

The controller 801 is implemented, for example, by a CPU that functions as a controller for executing data processing according to computer programs. The calculation unit 802 functions as a special calculator and cryptographic processor for generating an encryption key, generating a random number, executing encryption, and so forth. The calculation unit 802 calculates labels and intermediate labels, and calculates subset keys based on labels. Furthermore, when the information processing apparatus 800 is a receiver, the calculation unit 802 decrypts a ciphertext based on a subset key.

The input/output interface 803 is an interface handles input of data from input devices such as a keyboard and a mouse, output of data to external output devices, and transmission and reception of data via networks.

When the information processing apparatus is an information processing apparatus that generates ciphertexts, the secure storage unit 804, in the case of the CS method, sores data that is to be kept securely or privately, such as node keys or various IDs generated in the setup phase. In the case of the SD method, the secure storage unit 804 stores an intermediate label that allows calculation of labels associated with a special subset and labels not associated with the special subset.

When the information processing apparatus is a receiver, in the case of the CS method, among the node keys of the node included in the path nodes m [PathNodes-m] associated with the receiver um, the secure storage unit 804 only stores node keys that cannot be derived from possessed node keys based on a one-way function F. In the case of the SD method, the secure storage unit 804 stores data that is to be kept securely or privately, such as node associated values (intermediate labels), labels, and various IDs, given from the trusted center (TC). As for intermediate labels, an intermediate label that allows calculation of labels associated with a special subset, and labels not associated with the special subset, are stored.

When the information processing apparatus 800 is a receiver supporting the SD method, labels generated based on an intermediate label stored in the secure storage unit 804 are labels associated with special subsets, i.e.:

(a) The first special subset where the node i and the node j are parent and child directly linked in the hierarchical tree among the subsets $S_{i,j}$ defined as sets obtained by subtracting a subtree with the lower node j as the vertex thereof from the subtree with the node i as the vertex thereof.

(b) The second special subset, i.e., the subset $S_{1,\phi}$ defines as the set of the entire tree including all the leaves of the hierarchical tree.

The main storage unit 805 is a memory area that are used, for example, for data processing programs executed by the controller 801, or as a work area for temporarily storing processing parameters or for program execution. The secure storage unit 804 and the main storage unit 805 are implemented, for example, by RAMs or ROMs. The display 806 is used, for example, to output decrypted content. The media interface 807 is used to read data from or write data to media such as CDs, DVDs, or MDs.

9. Overview of the Basic Layered Subset Difference (Basic LSD) Method

Next, an overview of the basic layered subset difference (basic LSD) method will be described.

In Advances in Cryptography-Crypto 2002, Lecture Notes in Computer Science 2442, Springer, 2002, pp. 47-60, D. Halevy and A. Shamir, "The LSD Broadcast Encryption Scheme", the layered subset difference method, which is an improvement of the SD method, is proposed. The LSD method can be classified into the basic LSD method and the general LSD method. Now, the basic LSD method will be described below.

The LSD method is an extension of the SD method, in which a concept of layers is newly introduced. In a tree structure based on the SD method, specific heights are defined as special levels. In the basic LSD method, only one type of special level is defined. In the general LSD method, a plurality of types of special levels with different degree of significance is used.

Figure 36:
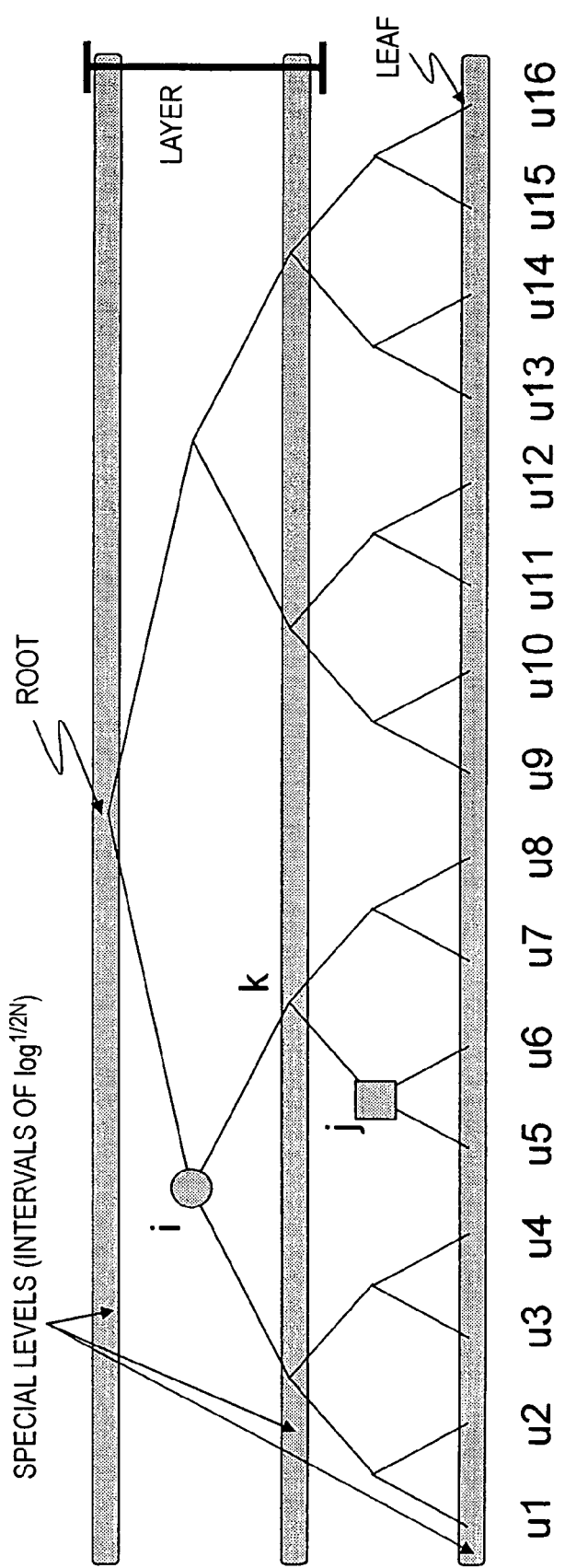
FIG. 36 is a diagram for explaining the basic LSD method.

For simplicity, it is assumed herein that $\log^{1/2} N$ is an integer. In the basic LSD method, as shown in FIG. 36, of the levels from the root to the leaves of the tree, levels at intervals of $\log^{1/2} N$, including the root level and leaf level, are defined as special levels. Levels sandwiched by two adjacent special levels (including the special levels on both ends) are referred to as a layer. In the example shown in FIG. 36, the level of the root, the level including a node k, and the level of the leaves are special levels, and the root level, the level including a node i, and the level including the node k constitute a single layer. Also, the level including the node k, the level including a node j, and the leaf level constitute another layer.

In the basic LSD method, of the subsets $S_{i,j}$ defined in the SD method, only those subsets that satisfy at least one of (1) the node i and the node j are on the same layer, or (2) the node i is on a special level, are defined. Thus, some of the subsets defined in the SD method are not defined in the basic LSD method. However, such a subset can be represented by a union of at most two subsets defined in the basic LSD method. In the example shown in FIG. 36, the subset $S_{i,j}$ is not defined in the basic LSD method, but can be represented as $S_{i,j}=S_{i,k} \cup S_{k,j}$ using the node k on the special level closest to the node i along the path from the node i to the node j.

That is, instead of one ciphertext generated using the subset key $SK_{i,j}$ associated with the subset $S_{i,j}$ in the SD method, according to the basic LSD method, two ciphertexts generated using the subset keys $SK_{i,k}$ and $SK_{k,j}$ associated with the subsets $S_{i,k}$ and $S_{k,j}$ are sent.

This only doubles the number of ciphertexts at most compared with the SD method, while the number of labels held by each receiver can be reduced compared with the SD method.

The number of labels held by each receiver in the SD method has been described earlier with reference to FIG. 20. Now, the number of labels held by each receiver in the basic LSD method under the same setting will be described with reference to FIG. 37. The receiver u4 shown in FIG. 37 has to hold only labels $LABEL_{i,j}$ with i and j on the same layer or i at a special level. That is, the receiver u4 holds $LABEL_{1,3}$, $LABEL_{1,5}$, $LABEL_{1,8}$, $LABEL_{1,18}$, $LABEL_{2,5}$, $LABEL_{4,8}$, $LABEL_{4,18}$, and $LABEL_{9,18}$. Furthermore, similarly to the SD method, the receiver u4 holds a special label that is used when no receiver is to be revoked.

When the total number of receivers is N, the total number of labels held by each receiver can be calculated as follows.

First, since the number of nodes j for a given i corresponds to the height of i in labels, the number of labels for one layer can be calculated as follows:

$$\sum_{i=1}^{\log^{1/2} N} i = \frac{1}{2}(\log N + \log^{1/2} N)$$

Since $\log^{1/2} N$ layers exist in the hierarchical tree, the number of labels in the layers of the entire hierarchical tree can be calculated as follows:

$$\frac{1}{2}(\log^{3/2} N + \log N)$$

Considering the case where the node i is on a special level, the number of node j corresponds to the height of i in the entire hierarchical tree. Thus, the total number of labels in the entire hierarchical tree, including nodes i at special levels, can be calculated as follows:

$$\sum_{i=1}^{\log^{1/2} N} (\log^{1/2} N) i = \frac{1}{2}(\log^{3/2} N + \log N)$$

Since labels associated with nodes i at special levels on nodes j on the same layers are counted twice. The number of such combinations is $\log^{1/2} N$ for each layer and thus $\log N$ for the entire hierarchical tree. Considering this number and adding a special label for the case where no receiver is to be revoked, the total number of labels that is held by each receiver in the basic LSD method can be calculated as follows:

$$\frac{1}{2}(\log^{3/2} N + \log N) + \frac{1}{2}(\log^{3/2} N + \log N) - \log N + 1 = \log^{3/2} N + 1$$

10. Scheme for Reducing the Number of Labels in the Basic LSD method Employing Rabin Tree Next, a scheme for reducing the number of labels in the basic LSD method employing a Rabin tree will be described. In the embodiment based on the SD method, described earlier, an intermediate label that allows calculation of intermediate labels $IL_{i,j}$ for calculating labels $LABEL_{i,j}$ of subsets $S_{i,j}$ where the node i is the parent of the node j is set as a node associated value in a Rabin tree. With only one intermediate label (node associated value), the number of labels held by each receiver is reduced. This can be applied similarly to the basic LSD method.

The specific method is substantially the same as that in the embodiment described earlier. However, when the trusted center (TC) sequentially generates labels $LABEL_{i,j}$ using the pseudo-random-number generator G during setup, if a node i is not on a special level, labels for which j is a node lower than the special level immediately under i is not used, so that generation of labels can be stopped until that special level. Furthermore, since only labels satisfying the conditions described earlier are created, it suffices to simply distribute the labels to receivers.

Figure 37:
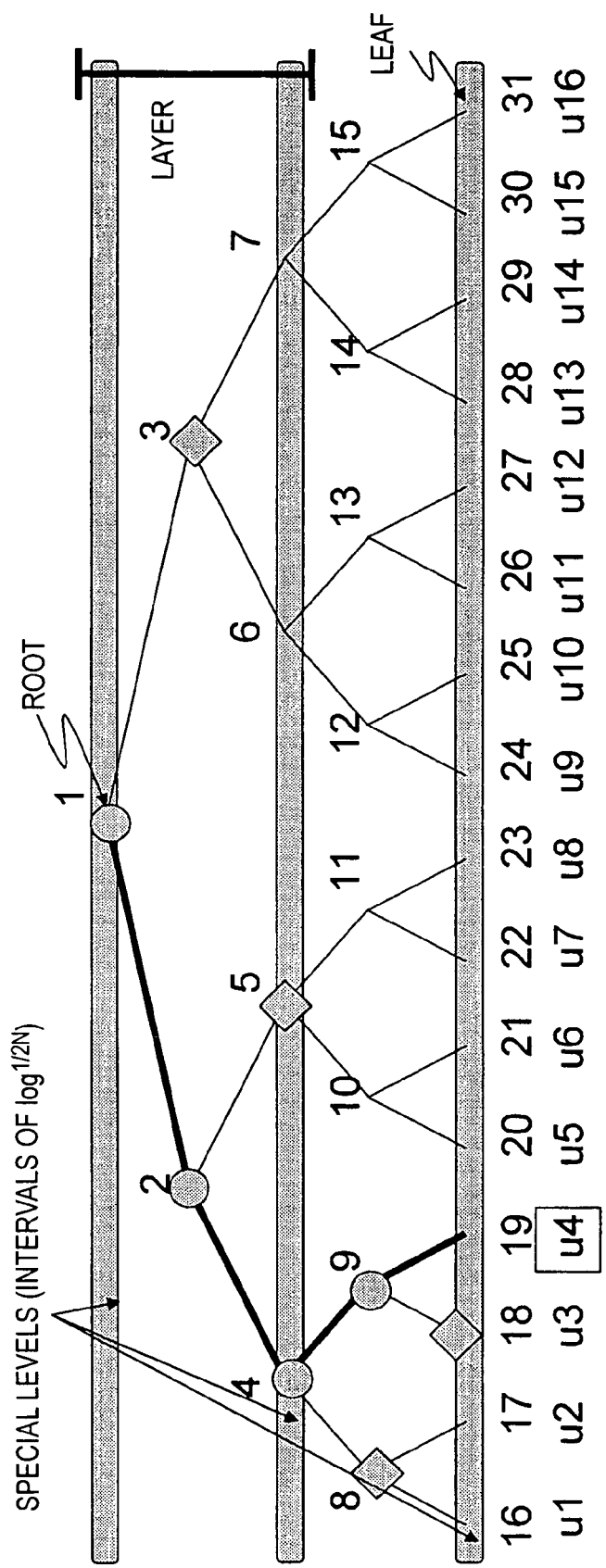
FIG. 37 is a diagram for explaining the number of labels that each receiver holds in the basic LSD method.
Figure 38:
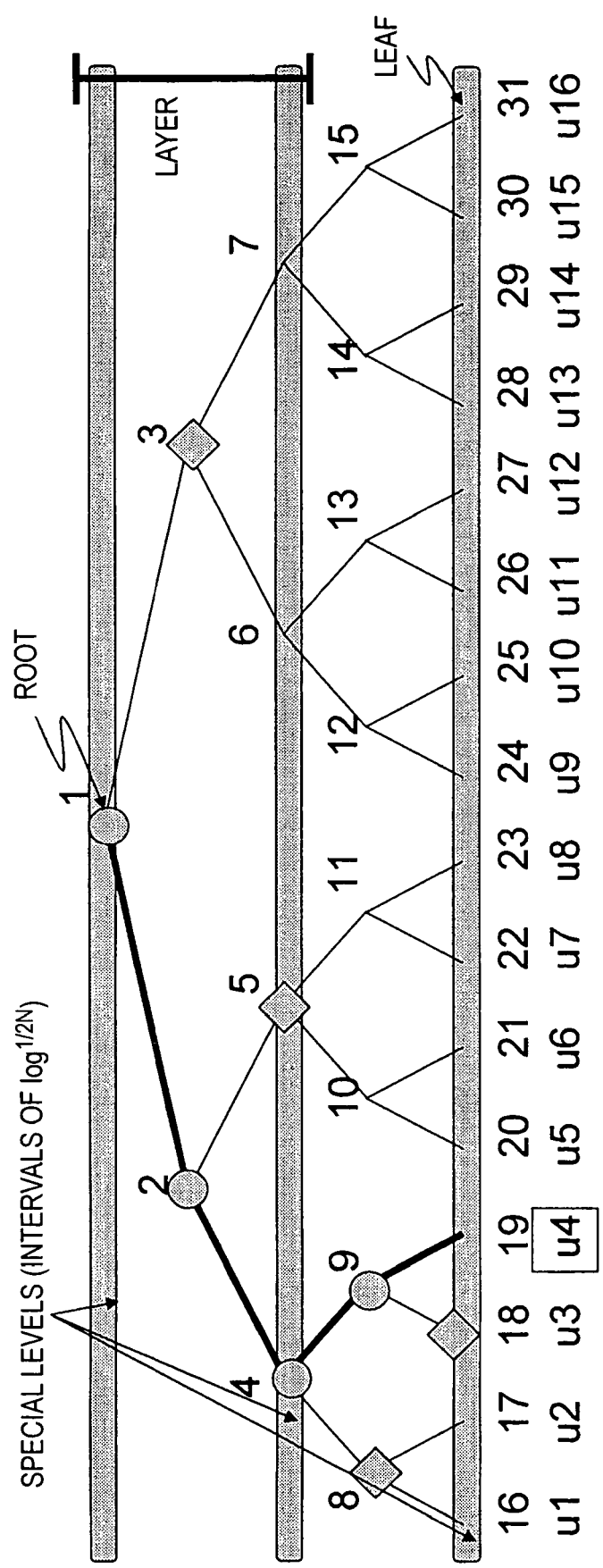
FIG. 38 is a diagram for explaining a scheme for reducing the number of labels in the basic LSD method employing a Rabin tree.

A specific example of scheme for reducing the number of labels in the basic LSD method employing a unidirectional permutation tree under the same setting as in FIG. 37 will be described with reference to FIG. 38. In the LSD method, as described with reference to FIG. 37, the receiver u4 has to hold nine labels, namely, $LABEL_{1,3}$, $LABEL_{1,5}$, $LABEL_{1,8}$, $LABEL_{1,18}$, $LABEL_{2,5}$, $LABEL_{4,8}$, $LABEL_{4,18}$, and $LABEL_{9,18}$, and similarly to the SD method, a special label that is used when no receiver is to be revoked. In contrast, according to this embodiment, the receiver u4 holds labels for which the nodes i and j are parent and child, the intermediate label $IL_{i,j}$ associated with the special subset that is used when no receiver is to be revoked, and the intermediate label $IL_{9,18}$ (node associated value $NV_{19}$) that allows calculation of $IL_{1,\phi}$. Thus, it suffices for the receiver u4 to hold only five labels in total, namely, four labels $LABEL_{1,5}$, $LABEL_{1,8}$, $LABEL_{1,18}$, and $LABEL_{4,18}$, and one intermediate label $IL_{9,18}$.

Now, the number of labels that can be reduced according to this embodiment when the total number of receivers is N will be considered. First, the number of labels $LABEL_{i,j}$ that is to be held by each receiver, where the nodes i and j are parent and child, in the LSD method to which the present invention is not applied will be considered.

When the nodes i and j are parent and child, the following three relationships are possible:
(A) The node i is on a special level.
(B) The node j is on a special level.
(C) None of the nodes i and j is on a special level.

In either case, when the nodes i and j are parent and child (i.e., on adjacent levels), the nodes i and j resides on the same layer. That is, the subset $S_{i,j}$ satisfies the condition for definition in the LSD method. That is, since such subsets are defined and used in the basic LSD method, receivers have to hold labels $LABEL_{i,j}$ associated therewith.

For a given receiver, the number of such combinations of nodes i and j corresponds to the height of i in the tree, i.e., log N (i.e., all the nodes on the path from the leaf to which the receiver is assigned to the root except for the leaf), and j is uniquely determined for a given i (the child of i and not on the path).

By creating these logN labels and one special label from one intermediate label, the number of labels held by each receiver can be reduced by logN+1−1=logN.

As described earlier, in the basic LSD method, the number of labels held by each receiver is $\log^{3/2} N + 1$. According to this embodiment, this number can be reduced to $\log^{3/2} N - \log N + 1$.

11. Overview of the General Layered Subset Difference (General LSD) Method

Next, an overview of the general layered subset difference (General LSD) method will be described.

In the basic LSD method, only one type of special levels is used. In contrast, in the general LSD method, a plurality of types of special levels with difference degrees of significance is used.

Similarly to the article in which LSD method is proposed, a path extending from the root to a node j via a node i will be considered as a graph. The root of the tree and the node j serve as endpoints, nodes of the tree serve as graph nodes, and the node i is one of the nodes other than the endpoints. In this graph, each node is represented by the distance from the root in the form of a d-digit b-ary number, where $b = \log^{1/d} N$. For example, the root is represented as 0 ... 00, and its adjacent node (a child node of the root in the hierarchical tree structure) is represented as 0 ... 01.

The subset $S_{i,j}$ is considered as an ultimate transition from the node i to the node j by a combination of defined transformations (node-to-node transitions). The defined transformations represent defined subsets, and individual transitions for the ultimate transitions represents defined subsets for representing segments of the subset $S_{i,j}$. As described in the original article, when nodes i, $k_1$, $k_2$, ..., $k_{d-1}$, and j exist on a path of the tree in this order, the subset $S_{i,j}$ in the SD method can be represented as follows in the general LSD method:

$$S_{i,j}=S_{i,k_1} \cup S_{k_1,k_2} \cup \ldots \cup S_{k_{d-1},j}$$

That is, the subset $S_{i,j}$ in the SD method can be represented by a union of at most d subsets in the general LSD method.

In the general LSD method, when the node i is represented by the graph as [x] (→) a [0] (→) (where a is the rightmost numeral that is not zero, [x] (→) denotes an arbitrary sequence of numerals, and [0] (→) denotes a sequence of zeros), all the transitions to nodes j represented by [x+1] (→) 0 [0] (→) or [x] (→) a'[y] (→) (where a'>a, and [y] (→) is an arbitrary sequence of numerals having the same length as [0] (→)). That is, all the subsets $S_{i,j}$ represented by such combinations of i and j are defined.

Then, the basic LSD method can be considered as a case of the general LSD method where d=2 and levels represented by two digits with the rightmost digit being 0 are special levels. In the general LSD method, the number of digits of the rightmost zero sequence in the number representing the node is represents the significance of the level, and the node j can be any node (including nodes on both ends) between the node i+1 and the first node with a higher significance than i. Under this setting, for example, when i=825917 and j=864563, the transition from i to j, i.e., the subset $S_{i,j}$ in the SD method, can be expressed by four transitions defined in the general LSD method, i.e., 825917→825920→826000→830000→864563.

That is, with k1=825920, k2=826000, and k3=830000, the subset $S_{i,j}$ can be expressed by:

$$S_{i,j}=S_{i,k_1} \cup S_{k_1,k_2} \cup S_{k_2,k_3} \cup S_{k_3,j}$$

In order to send secret information to a receiver belonging to the subset $S_{i,j}$ in the SD method, in the general LSD method, four ciphertexts generated using subset keys represented by the following expressions are sent:

$$S_{i,k_1}, S_{k_1,k_2}, S_{k_2,k_3}, S_{k_3,j}$$

The number of labels to be held by each receiver in the general LSD method decreases as the parameter d is increased, and finally reaches $O(\log^{1+\in}N)$, where $\in=1/d$. The upper limit of the number of ciphertexts to send is d(2r-1). Please refer to the article mentioned earlier.

12. Scheme for Reducing the Number of Labels in the General LSD Method Employing Rabin Tree Next, a scheme for reducing the number of labels in the general LSD method employing a Rabin tree will be described. The method of reducing the number of labels to be held by each receiver using a Rabin tree in the basic LSD method, described above, can also be applied to the general LSD method. More specifically, the basic LSD method and the general LSD method differ only in the conditions to be satisfied by subsets that are defined, and the use of a Rabin tree does not differ.

Also in the general LSD method, the receiver um has to hold all the labels $LABEL_{i,j}$ associated with the subsets $S_{i,j}$ where the node i and j are parent and child among the labels defined and given to the receiver um in the SD method. This is because whatever the value of the node i, the transition to a child node j (i.e., i+1) satisfies the condition of transition defined. That is, similarly to the basic LSD method, for a given receiver, the number of labels to hold where the nodes i and j are parent and child is logN. By creating these labels and a special label from one intermediate label, logN labels can be reduced. Since the number of labels to be held by each receiver in the general LSD method is originally $O(\log^{1+\in}N)$ (where $\in$ is an arbitrary positive integer), logN labels can be reduced therefrom.

Examination on the Reduction of the Amount of Computation in the Scheme of Ciphertext Distribution in the SD Method Employing Rabin Tree Compared with the method of reducing the number of keys in the SD method according to the related art, the scheme of ciphertext distribution in the SD method according to the embodiment has an advantage that the amount of computation by each receiver is small. This advance will be described based on comparison with the SD method based on the RSA cryptosystem.

In the SD and LSD method based on the RSA cryptosystem, a receiver derives the key of a parent node, expressed below, from the node key $NK_1$ of a node:

$$NK_{\lfloor 1/2 \rfloor}$$

according to the following equation:

$$NK_{\lfloor 1/2 \rfloor}=(NK_1^e \oplus H(l)) \bmod M$$

Since the XOR operation and the hash function H are much less computationally intensive than the modulo exponentiation operation, the modulo exponentiation operation $NK_1^e \bmod M$ is dominant in the equation above.

In the system based on the RSA cryptosystem, in order to reduce the amount of computation, it is desired that the public exponent and the Hamming weight of e are minimized. However, for example, e=3 is too small to ensure security, so that $e=2^{16}+1$ is generally recommended.

When the value $2^{16}+1$ is used as the public exponent e, a given value x to the power of e can be calculated by several methods. When the "square-and-multiply" algorithm (refer to A. J. Menezes, P. C. van Oorschot and S. A. Vanstone, "Handbook of Applied Cryptography", CRC Press, 1996, p. 614) is used, 16 squaring operations and one multiplying operation are needed. Since squaring is a special case of multiplication and the amount of computation can be reduced compared with multiplication, the amount of computation is larger than that for 17 squaring operations.

In contrast, in the scheme of ciphertext distribution in the SD method employing a Rabin tree according to this embodiment, based on the node associated value $NV_1$ and node attached variable salt that it holds, a receiver performs the following calculation:

$$NV_{\lfloor 1/2 \rfloor}=(NV_1^2+H(l\|salt_1)) \bmod M$$

Also in this case, the modulo exponentiation operation is dominant. However, the modulo exponentiation operation in the above equation is $NV_1^2 \bmod M$, so that only one squaring operation suffices. Thus, according to this embodiment, the amount of computation can be reduced to approximately 1/17 compared with the method based on the RSA cryptosystem.

As described above, compared with the method based on the RSA cryptosystem according to the related art, according to this embodiment, the modulo exponentiation operation, which causes a large load in terms of the amount of computation by a receiver, can be executed with one squaring operation, so that the amount of computation can be considerably reduced to approximately 1/17. Furthermore, even when a value of 3 is used as the public exponent e in the method based on the RSA cryptosystem, the calculation of $NK_1^e$ mod M requires one multiplying operation and one squaring operation. Thus, the amount of computation in this embodiment is reduced to less than one half.

In the SD method, basic LSD method, and general LSD method according to the related art, each receiver has to securely hold the following number of labels.

SD: $(\frac{1}{2})\log^2 N + (\frac{1}{2})\log N + 1$
Basic LSD: $\log^{2/3} N + 1$
General LSD: $O(\log^{1+\in} N)$ where N is the total number of receivers and $\in$ is an arbitrary number satisfying $\in > 0$.

In contrast, according to this embodiment employing a Rabin tree, the number of labels to be held by each receiver can be reduced. More specifically, an intermediate label is set associated with node associated values in a Rabin tree for labels $LABEL_{i,j}$ where the nodes i and j are parent and child (with a distance of 1, i.e., on adjacent levels) and for the $label_{1,\phi}$ associated with the special $subset_{1,\phi}$ that is used when no receiver is to be revoked, so that intermediate labels (node associated values) associated with upper special subsets can be calculated based on the intermediate label. Accordingly, the number of labels to be held by each receiver is reduced.

According to this embodiment, node attached variables salt need not be held securely. Furthermore, node attached variables salt are as small as two bits on average, so that the load of storing data at each receiver is small.

As described above, the amount of information that is to be held securely at each receiver is reduced. Furthermore, the amount of computation by each receiver for calculating node keys is reduced. Accordingly, ciphertext distribution and decryption can be implemented efficiently.

The series of processes described herein can be executed by hardware, software, or combination of hardware and software. When the processes are executed by software, programs for the processing sequences are installed in a memory of a computer embedded in special hardware, or installed on a general-purpose computer capable of executing various processes.

For example, the programs can be recorded in advance in hard disks or read-only memories (ROMs) as recording media. Alternatively, the programs can be temporarily or permanently recorded on removable recording media, such as flexible disks, compact disk read-only memories (CD-ROMs), magneto-optical (MO) disks, digital versatile disks (DVDs), magnetic disks, or semiconductor memories. Such recording media can be provided as package software.

Instead of installing the programs from the removable recording media to computers, the programs may be transferred by wireless to computers from downloading sites, or transferred by wire to computers via networks such as local area networks (LANs) or the Internet, so that the computers can receive the programs transferred thereto and install the programs on internal recording media such as hard disks.

The various processes described herein need not necessarily be executed in the orders described, and may be executed in parallel or individually as needed or depending on the processing capability of an apparatus that executes the processes. In this specification, a system refers to a logical combination of a plurality of apparatuses, regardless of whether the apparatuses exist within the same case.

According to these embodiments, in the efficiency of the subset difference (SD) method and the layered subset difference (LSD) method, which are considered as relatively efficient schemes of information distribution by broadcast encryption based on hierarchical tree structures, a Rabin tree constructed as described below is used, which is a unidirectional tree in which node associated values are defined for the respective nodes of the hierarchical tree. Accordingly, the amount of secret information that is to be kept securely by each receiver is reduced, and the amount of computation for calculating a subset key is reduced.

More specifically, it is possible to calculate a node associated value by a function based on a node associated value and a node attached variable of at least one lower node. This node associated value serves as an intermediate label that allows calculation of values of labels associated with a special subset selected from labels associated with respective subsets defined based on the SD method. The information that each receiver has to hold securely is only special-subset non-associated labels not associated with a special subset, and a node associated value and node attached variable corresponding to an intermediate label. Thus, the amount of information that each receiver has to hold securely is reduced. The node attached variable need not be kept securely, and the size thereof can be as small as two bits on average. Thus, the amount of information that each receiver has to hold securely is considerably reduced. Furthermore, compared with the method based on the RSA cryptosystem, since a modulo exponentiation operation, which causes a large load in terms of the amount of computation by a receiver, can be executed with a single squaring operation, so that the amount of computation can be reduced to approximately $\frac{1}{17}$. As described above, according to the embodiments of the present invention, the amount of information that has to be kept securely by each receiver is reduced, and the amount of computation by each receiver for deriving a subset key is reduced. Accordingly, ciphertext distribution and decryption can be implemented efficiently.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing computer implemented method for generating a hierarchical tree that is used to provide a ciphertext that is decryptable only by a specific selected device through broadcast encryption based on a hierarchical-tree structure, the information processing method comprising:

generating a unidirectional hierarchical tree including nodes forming a hierarchical tree, the nodes having respective node associated values, the node associated value of each of the nodes being calculatable by a function using the node associated value and a node attached variable of at least one lower node;

setting an intermediate label as a node associated value, the intermediate label allowing calculation of values of labels associated with a special subset selected from labels respectively associated with subsets that are defined based on a subset difference method based on a hierarchical tree;

generating labels associated with the special subset by a calculation based on the intermediate label, and generating labels not associated with the special subset by a calculation based on the labels generated; and determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

2. The information processing method according to claim 1, wherein the unidirectional-tree generating step generates a unidirectional tree thereby possible to calculate a node associated value of an upper node through encryption according to the Rabin cryptosystem based on a node associated value of a lower node, and thereby possible to generate a node associated value of a lower node through decryption according to the Rabin cryptosystem based on a node associated value of an upper node.

3. The information processing method according to claim 1, further comprising the step of selectively applying subset keys derived from the respective labels associated with the subset, generated in the label generating step, to generate ciphertexts, and providing the ciphertexts to the receiver.

4. The information processing method according to claim 1, wherein the unidirectional-tree generating step generates a unidirectional tree that is a binary hierarchical tree having N terminal nodes, in which node numbers 1 are assigned in a breadth-first order from upper nodes in the binary tree, where 1=2, 3, ..., 2N−1, the node associated value $NV_1$ of each node 1 satisfying:

$$NV_{[1/2]} = (NV_1^2 + H(l\|salt_1)) \bmod M$$

where M is the product of two large prime numbers, and H is a mapping function that outputs an element of $Z_M$.

5. The information processing method according to claim 4, wherein the unidirectional-tree generating step accepts input of the number N of leaves representing the number of terminal nodes in the binary hierarchical tree having N terminal nodes, and the size |M| of the modulus M, and generates a unidirectional tree by:

(1) determining two large prime numbers of a size |M|/2, and calculating the product M thereof;

(2) defining the mapping function H that outputs an element of $Z_M$;

(3) randomly selecting the node associated value $NV_1$ of the root node as the uppermost node of the binary tree so that $NV_1 \in Z^*_M$;

(4) performing (a) and (b) below while incrementing 1 as a counter from 2 by 2N−1;

(a) finding a least positive integer $salt_1$ with which $temp_1$ expressed by an equation below becomes a quadratic residue modulo M;

$$temp_1 = (NV_{[1/2]} - H(l\|salt_1)) \bmod M$$

(b) calculating $temp_1^{1/2} \bmod m$, and determines one of four solutions as the node associated value $NV_1$ of the node 1; and (5) outputting 2N−1 |M|-bit node associated values $NV_1, NV_2, \ldots, NV_{2N-1}$ and 2N−2 node attached variables $salt_2, salt_3, \ldots, salt_{2N-1}$, and setting these values as the node associated values and node attached variables of the respective nodes 1 of the binary tree, where 1=1 to 2N−1.

6. The information processing method according to claim 1, wherein the label generating step includes the step of accepting input of a node associated value corresponding to an intermediate label and calculating values of labels associated with a special subset by applying a function.

7. The information processing method according to claim 1, wherein the label generating step includes the step of generating other labels through random number generation based on the values of the labels associated with the special subset.

8. The information processing method according to claim 1, wherein the special subset selected in the intermediate-label generating step is at least either:

a first special subset in which a node i and a node j are parent and child directly linked in the hierarchical tree among subsets each defined as a set obtained by subtracting a subtree with a lower node j as a vertex thereof from a subtree with a node i as a vertex thereof; or a second special subset defined as a set of an entire tree with the root as a vertex, including all the leaves of the hierarchical tree.

9. The information providing method according to claim 1, wherein the label-to-provide determining step sets an intermediate label that is provided to the receiver associated with the terminal node of the hierarchical tree as a node associated value associated with an intermediate label of a subset at a lowermost layer among subsets constituting the first special subset.

10. The information processing method according to one of claim 1, wherein the intermediate-label generating step sets labels associated with a special subset, selected from labels associated with the respective labels defined by a basic layered subset difference method in which subsets are managed on a basis of individual layers separated by a special level set in the hierarchical tree, as values calculatable from an intermediate label associated with the special subset.

11. The information processing method according to one of claim 1, wherein the intermediate-label generating step sets labels associated with a special subset, selected from labels associated with the respective labels defined by a basic layered subset difference method in which subsets are managed on a basis of individual layers separated by a plurality of special levels set in the hierarchical tree, as values calculatable from an intermediate label associated with the special subset.

12. A decrypting method for decrypting ciphertexts generated using subset keys associated with respective subsets defined based on a subset difference method, which is a broadcast encryption method based on a hierarchical tree structure, the decrypting method comprising the steps of:

selecting a ciphertext generated using a subset key that is derivable by random number generation based on a possessed label or based on a label that is calculatable based on a node associated value and a node attached variable as a possessed intermediate label;

calculating, when the subset key used for encryption is not a subset key derivable by random number generation based on the possessed label, labels associated with a special subset by a calculation based on the node attached value and the node attached variable;

generating a subset key by random number generation based on the possessed label or the calculated label; and decrypting the ciphertext using the subset key generated.

13. The decrypting method according to claim 12, wherein the ciphertext selecting step searches for a node number matching one of node numbers of nodes included in a path from a receiver to a root, from node numbers of node keys used for encryption in a hierarchical tree in which node numbers are assigned to respective nodes in a breadth-first order with node number 1 assigned to the root as an uppermost node of the hierarchical tree.

14. The decrypting method according to claim 12, wherein the label calculating step calculates node associated values of nodes on a path from an own node to a root as an uppermost node among node numbers of respective nodes 1, where 1=2, 3, . . . , 2N−1, in a binary tree in which node numbers 1 are assigned in a breadth-first order from upper nodes, based on a possessed node associated value and node associated variable, according to an equation below:

$$NV_{\lfloor l/2 \rfloor} = (NV_l^2 + H(l\|salt_l)) \bmod M$$

where M is the product of two large prime numbers, and H is a mapping function that outputs an element of $Z_M$.

15. The decrypting method according to claim 12, wherein the label calculating step calculates a label by applying a mapping function on an intermediate label, based on an intermediate label as a possessed node associated value or an intermediate value as a node associated value of a node on a path from an own node to a root as an uppermost node, calculated based on the node associated value.

16. The decrypting method according to claim 12,
wherein, the subset key used for encryption is a subset key calculatable by random number generation based on a label associated with either a first special subset in which a node i and a node j are parent and child directly linked in the hierarchical tree among subsets each defined as set obtained by subtracting a subtree with a lower node j as a vertex thereof from a subtree with a node i as a vertex thereof or a second special subset defined as a set of an entire tree with the root as a vertex, including all the leaves of the hierarchical tree, and
wherein when the label associated with the special subset is not possessed, the label calculating step calculates a node associated value as a new intermediate label by a calculation based on the node associated value and the node attached variable as a possessed intermediate label.

17. An information processing apparatus for generating a hierarchical tree that is used to provide a ciphertext that is decryptable only by a specific selected device through broadcast encryption based on a hierarchical-tree structure, the information processing apparatus comprising:

unidirectional-tree generating means for generating a unidirectional hierarchical tree including nodes forming a hierarchical tree, the nodes having respective node associated values, the node associated value of each of the nodes being calculatable by a function using the node associated value and a node attached variable of at least one lower node;

intermediate-label generating means for setting an intermediate label as a node associated value, the intermediate label allowing calculation of values of labels associated with a special subset selected from labels respectively associated with subsets that are defined based on a subset difference method based on a hierarchical tree;

label generating means for generating labels associated with the special subset by a calculation based on the intermediate label, and generating labels not associated with the special subset by a calculation based on the labels generated; and information-to-provide determining means for determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

18. The information processing method according to claim 1, wherein the unidirectional-tree generating step generates a unidirectional tree thereby possible to calculate a node associated value of an upper node through encryption according to the Rabin cryptosystem based on a node associated value of a lower node, and thereby possible to generate a node associated value of a lower node through decryption according to the Rabin cryptosystem based on a node associated value of an upper node.

19. The information processing apparatus according to claim 17, further comprising ciphertext generating means for selectively applying subset keys derived from the respective labels associated with the subset, generated by the label generating means, to generate ciphertexts, and providing the ciphertexts to the receiver.

20. The information processing apparatus according to claim 17, wherein the unidirectional-tree generating means generates a unidirectional tree that is a binary hierarchical tree having N terminal nodes, in which node numbers 1 are assigned in a breadth-first order from upper nodes in the binary tree, where 1=2, 3, . . . , 2N−1, the node associated value $NV_1$ of each node 1 satisfying:

$$NV_{\lfloor l/2 \rfloor} = (NV_l^2 + H(l\|salt_l)) \bmod M$$

where M is the product of two large prime numbers, and H is a mapping function that outputs an element of $Z_M$.

21. The information processing apparatus according to claim 20, wherein the unidirectional-tree generating means accepts input of the number N of leaves representing the number of terminal nodes in the binary hierarchical tree having N terminal nodes, and the size |M| of the modulus M, and generates a unidirectional tree by:

(1) determining two large prime numbers of a size |M|/2, and calculating the product M thereof;

(2) defining the mapping function H that outputs an element of $Z_M$;

(3) randomly selecting the node associated value $NV_1$ of the root node as the uppermost node of the binary tree so that $NV_1 \in Z^*_M$;

(4) performing (a) and (b) below while incrementing 1 as a counter from 2 by 2N−1;

(a) finding a least positive integer $salt_l$ with which $temp_l$ expressed by an equation below becomes a quadratic residue modulo M;

$$temp_l = (NV_{\lfloor l/2 \rfloor} - H(l\|salt_l)) \bmod M$$

(b) calculating $temp_l^{1/2} \bmod m$, and determines one of four solutions as the node associated value $NV_1$ of the node 1; and (5) outputting 2N−1 |M|-bit node associated values $NV_1$, $NV_2$, . . . , $NV_{2N-1}$ and 2N−2 node attached variables $salt_2, salt_3, \ldots, salt_{2N-1}$, and setting these values as the node associated values and node attached variables of the respective nodes 1 of the binary tree, where 1=1 to 2N−1.

22. The information processing apparatus according to claim 17, wherein the label generating means is configured to accept input of a node associated value corresponding to an intermediate label and calculate values of labels associated with a special subset by applying a function.

23. The information processing apparatus according to claim 17, wherein the label generating means is configured to generate other labels through random number generation based on the values of the labels associated with the special subset.

24. The information processing apparatus according to claim 17, wherein the special subset selected by the intermediate-label generating means is selected from the group consisting of:
a first special subset in which a node i and a node j are parent and child directly linked in the hierarchical tree among subsets each defined as set obtained by subtracting a subtree with a lower node j as a vertex thereof from a subtree with a node i as a vertex thereof; and
a second special subset defined as a set of an entire tree with the root as a vertex, including all the leaves of the hierarchical tree.

25. The information providing apparatus according to claim 17, wherein the label-to-provide determining means is configured to set an intermediate label that is provided to the receiver associated with the terminal node of the hierarchical tree as a node associated value associated with an intermediate label of a subset at a lowermost layer among subsets constituting the first special subset.

26. The information processing apparatus according to one of claim 17, wherein the intermediate-label generating means is configured to set labels associated with a special subset, selected from labels associated with the respective labels defined by a basic layered subset difference method in which subsets are managed on a basis of individual layers separated by a special level set in the hierarchical tree, as values calculatable from an intermediate label associated with the special subset.

27. The information processing apparatus according to one of claim 17, wherein the intermediate-label generating means is configured to set labels associated with a special subset, selected from labels associated with the respective labels defined by a basic layered subset difference method in which subsets are managed on a basis of individual layers separated by a plurality of special levels set in the hierarchical tree, as values calculatable from an intermediate label associated with the special subset.

28. An information processing apparatus for decrypting ciphertexts generated using subset keys associated with respective subsets defined based on a subset difference method, which is a broadcast encryption method based on a hierarchical tree structure, the information processing apparatus comprising:
ciphertext selecting means for selecting a ciphertext generated using a subset key that is derivable by random number generation based on a possessed label or based on a label that is calculatable based on a node associated value and a node attached variable as a possessed intermediate label;
label calculating means for calculating, when the subset key used for encryption is not a subset key derivable by random number generation based on the possessed label, labels associated with a special subset by a calculation based on the node attached value and the node attached variable;
subset-key generating means for generating a subset key by random number generation based on the possessed label or the calculated label; and
decrypting means for decrypting the ciphertext using the subset key generated.

29. The information processing apparatus according to claim 28, wherein the ciphertext selecting means is configured to search for a node number matching one of node numbers of nodes included in a path from a receiver to a root, from node numbers of node keys used for encryption in a hierarchical tree in which node numbers are assigned to respective nodes in a breadth-first order with node number 1 assigned to the root as an uppermost node of the hierarchical tree.

30. The information processing apparatus according to claim 28, wherein the label calculating means is configured to calculate node associated values of nodes on a path from an own node to a root as an uppermost node among node numbers of respective nodes 1, where 1=2, 3,..., 2N−1, in a binary tree in which node numbers 1 are assigned in a breadth-first order from upper nodes, based on a possessed node associated value and node associated variable, according to an equation below:

$$NV_{[1/2]} = (NV_1^2 + H(l\|salt_1)) \bmod M$$

where M is the product of two large prime numbers, and H is a mapping function that outputs an element of $Z_M$.

31. The information processing apparatus according to claim 28, wherein the label calculating means is configured to calculate a label by applying a mapping function on an intermediate label, based on an intermediate label as a possessed node associated value or an intermediate value as a node associated value of a node on a path from an own node to a root as an uppermost node, calculated based on the node associated value.

32. The information processing apparatus according to claim 28,
wherein, the subset key used for encryption is a subset key calculatable by random number generation based on a label associated with either a first special subset in which a node i and a node j are parent and child directly linked in the hierarchical tree among subsets each defined as a set obtained by subtracting a subtree with a lower node j as a vertex thereof from a subtree with a node i as a vertex thereof or a second special subset defined as a set of an entire tree with the root as a vertex, including all the leaves of the hierarchical tree, and
wherein the label calculating means is configured to calculate, when the label associated with the special subset is not possessed, a node associated value as a new intermediate label by a calculation based on the node associated value and the node attached variable as a possessed intermediate label.

33. A computer program for generating a hierarchical tree that is used to provide a ciphertext that is decryptable only by a specific selected device through broadcast encryption based on a hierarchical-tree structure, the computer program comprising the steps of:
generating a unidirectional hierarchical tree including nodes forming a hierarchical tree, the nodes having respective node associated values, the node associated value of each of the nodes being calculatable by a function using the node associated value and a node attached variable of at least one lower node;
setting an intermediate label as a node associated value, the intermediate label allowing calculation of values of labels associated with a special subset selected from labels respectively associated with subsets that are defined based on a subset difference method based on a hierarchical tree;

generating labels associated with the special subset by a calculation based on the intermediate label, and generating labels not associated with the special subset by a calculation based on the labels generated; and determining labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

34. A computer program for decrypting ciphertexts generated using subset keys associated with respective subsets defined based on a subset difference method, which is a broadcast encryption method based on a hierarchical tree structure, the computer program comprising the steps of:

selecting a ciphertext generated using a subset key that is derivable by random number generation based on a possessed label or based on a label that is calculatable based on a node associated value and a node attached variable as a possessed intermediate label;

calculating, when the subset key used for encryption is not a subset key derivable by random number generation based on the possessed label, labels associated with a special subset by a calculation based on the node attached value and the node attached variable;

generating a subset key by random number generation based on the possessed label or the calculated label; and decrypting the ciphertext using the subset key generated.

35. An information processing apparatus for generating a hierarchical tree that is used to provide a ciphertext that is decryptable only by a specific selected device through broadcast encryption based on a hierarchical-tree structure, the information processing apparatus comprising:

a unidirectional-tree generator configured to generate a unidirectional hierarchical tree including nodes forming a hierarchical tree, the nodes having respective node associated values, the node associated value of each of the nodes being calculatable by a function using the node associated value and a node attached variable of at least one lower node;

an intermediate-label generator configured to set an intermediate label as a node associated value, the intermediate label allowing calculation of values of labels associated with a special subset selected from labels respectively associated with subsets that are defined based on a subset difference method based on a hierarchical tree;

a label generator configured to generate labels associated with the special subset by a calculation based on the intermediate label, and to generate labels not associated with the special subset by a calculation based on the labels generated; and an information-to-provide determining unit configured to determine labels to be provided to a receiver associated with a terminal node of the hierarchical tree, so that special-subset non-associated labels that are not associated with the special subset are selected, and as information to be provided to the receiver associated with the terminal node of the unidirectional tree, a node associated value and a node attached variable are selected as a minimum intermediate label for calculating node associated values of nodes included in a path from the node associated with the receiver to a root as an uppermost node.

36. An information processing apparatus for decrypting ciphertexts generated using subset keys associated with respective subsets defined based on a subset difference method, which is a broadcast encryption method based on a hierarchical tree structure, the information processing apparatus comprising:

a ciphertext selector configured to select a ciphertext generated using a subset key that is derivable by random number generation based on a possessed label or based on a label that is calculatable based on a node associated value and a node attached variable as a possessed intermediate label;

a label calculator configured to calculate, when the subset key used for encryption is not a subset key derivable by random number generation based on the possessed label, labels associated with a special subset by a calculation based on the node attached value and the node attached variable;

a subset-key generator configured to generate a subset key by random number generation based on the possessed label or the calculated label; and a decrypting unit configured to decrypt the ciphertext using the subset key generated.

* * * * *